(12) United States Patent
Shirai et al.

(10) Patent No.: US 8,787,563 B2
(45) Date of Patent: Jul. 22, 2014

(54) DATA CONVERTER, DATA CONVERSION METHOD AND PROGRAM

(75) Inventors: Taizo Shirai, Kanagawa (JP); Kyoji Shibutani, Tokyo (JP); Shiho Moriai, Kanagawa (JP); Toru Akishita, Tokyo (JP); Tetsu Iwata, Aichi (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 13/059,641

(22) PCT Filed: Aug. 25, 2009

(86) PCT No.: PCT/JP2009/064783
§ 371 (c)(1),
(2), (4) Date: May 2, 2011

(87) PCT Pub. No.: WO2010/024248
PCT Pub. Date: Mar. 4, 2010

(65) Prior Publication Data
US 2011/0211688 A1    Sep. 1, 2011

(30) Foreign Application Priority Data
Aug. 25, 2008    (JP) ................ P2008-214811

(51) Int. Cl.
*H04K 1/00*     (2006.01)
*H04L 9/00*     (2006.01)
*H04L 9/28*     (2006.01)
*H04L 9/06*     (2006.01)

(52) U.S. Cl.
CPC .................... *H04L 9/0643* (2013.01)
USPC ............................................. 380/28

(58) Field of Classification Search
CPC ........................ H04L 9/06–9/0693
USPC ............................. 380/28, 37, 42
See application file for complete search history.

(56) References Cited

U.S. PATENT DOCUMENTS 5,664,016 A * 9/1997 Preneel et al. ............... 380/28
5,673,318 A * 9/1997 Bellare et al. ............. 713/170
(Continued)

FOREIGN PATENT DOCUMENTS

JP    59-220777    12/1984
JP    2007-316614    12/2007

OTHER PUBLICATIONS

Design Principles for Iterated Hash Functions e-print (Sep. 29, 2004) Stefan Lucks University of Mannheim, Germany http://th.informatik.uni-mannheim.de/people/lucks/.*

(Continued)

*Primary Examiner* — Christopher Revak
*Assistant Examiner* — Vadim Savenkov
(74) *Attorney, Agent, or Firm* — Finnegan, Henderson, Farabow, Garrett & Dunner, L.L.P.

(57) ABSTRACT

A data converter for generating a hash value for message data is disclosed. The data converter executes a data conversion process, which includes compression-function execution sections and process sequences in which divided data blocks constituting message data are processed in parallel. Each compression-function execution section performs a process, using a message scheduling section and a chaining variable processing section. The message scheduling section receives a corresponding divided data block of the message data and performs a message scheduling process. The chaining variable processing section receives an output from the message scheduling section and an intermediate value output from a preceding processing section, and generates output data, which has the same number of bits as in the intermediate value. The compression-function execution sections may use one or more message scheduling sections and chaining variable processing sections.

14 Claims, 37 Drawing Sheets

(56) References Cited

U.S. PATENT DOCUMENTS

| | | | | |
|---|---|---|---|---|
| 6,122,375 | A * | 9/2000 | Takaragi et al. | 380/28 |
| 6,804,355 | B1 * | 10/2004 | Graunke | 380/37 |
| 7,949,129 | B2 * | 5/2011 | Rogaway | 380/28 |
| 2001/0033656 | A1 * | 10/2001 | Gligor et al. | 380/28 |
| 2005/0094805 | A1 * | 5/2005 | Kitani et al. | 380/28 |
| 2008/0010463 | A1 * | 1/2008 | Eastlake | 713/181 |

OTHER PUBLICATIONS

Multi-mode operator for SHA-2 hash functions Journal of Systems Architecture 53 (2007) 127-138 Ryan Glabb, Laurent Imbert, Graham Jullien, Arnaud Tisserand, Nicolas Veyrat-Charvillon.*

Collision Free Hash Function Based on Miyaguchi-Preneel and Enhanced Merkie-Damgard Scheme Research and Development, 2007. SCOReD 2007. 5th Student Conference on Author(s): Mirvaziri, H.*

On the impossibility of efficiently combining collision resistant hash functions Authors: D. Boneh and X. Boyen In proceedings of Crypto '06, LNCS 4117, pp. 570-583, 2006.*

Design and Analysis of Hash Functions by Murali Krishna Reddy Danda 2007.*

New Integrated proof Method on Iterated Hash Structure and New Structures Duo Lei Department of Science, National University of Defense Technology 2006.*

A Double-Piped iterated hash function based on a hybrid of chaotic maps Jun Peng; Du Zhang ; Yongguo Liu ; Xiaofeng Liao Date of Conference: Aug. 14-16, 2008.*

On Feistel Structures Using a Diffusion Switching Mechanism Taizo Shirai and Kyoji Shibutani 2006.*

S. Hirose, Collision Resistance of Double-Block-Length Hash Function Against Free-Start Attack, IEICE Transactions on Fundamentals, Jan. 2008, vol. E91-A, No. 1, p. 74-82.

J-S Coron, et al., "Merkle-Damgard Revisited: How to construct a Hash Function, Lecture Notes in Computer Science", vol. 3621, 2005, p. 21-39.

Aura: Acryptographic Hash Algorithm Family, online, Oct. 31, 2008, The internet, www.sony.net/Products/cryptography/aurora/download/AURORA_full.zip.

Japanese Office Action for Japanese Application No. 2008-2141811. (5 pgs).

Shoichi Hirose, "Collision Resistance of Double-Block-Length Hash Function against Free-Start Attack," IEICE Transactions on Fundamentals of Electronics, Communications, and Computer Sciences, The Institute of Electronics, Information and Communication Engineers, 2008, pp. 1-12.

* cited by examiner

DATA CONVERTER, DATA CONVERSION METHOD AND PROGRAM

TECHNICAL FIELD

The present invention relates to a data converter, a data conversion method and a program. More specifically, the present invention relates to a data converter, a data conversion method and a program performing a hash value generation process on, for example, input message data.

BACKGROUND ART

In a data conversion process such as an encryption process, a hash function executing a hashing process on input data is frequently used. The hash function is a function for computing a fixed-length compressed value (a digest) from a supplied message. Known hash functions include MD5 with a 128-bit output value, SHA-1 with a 160-bit output value, SHA-256 with a 256-bit output value and the like.

For example, based on a request to increase analysis resistance, the hash function needs the following resistances.

Preimage resistance
2nd preimage resistance
Collision resistance

These resistances will be briefly described below.

In a hash function generating $y=h(x)$ as an output where an input is x and the hash function is h, the preimage resistance corresponds to difficulty of computing the input x such that $h(x)=y$ for the output y.

The 2nd preimage resistance corresponds to difficulty of finding another input value x' satisfying $h(x')=h(x)$ in the case where one input value x is known.

The collision resistance corresponds to difficulty of finding two different input values x and x' satisfying $h(x')=h(x)$.

It is considered that the higher these resistances are, the higher security properties the hash function has.

In previously used hash functions, vulnerability of the above-described resistances is discovered by recent developments in analysis methods. For example, it has become clear that in MD5, SHA-1 or the like which has been frequently used as a hash function, the collision resistance does not satisfy a large number of system request levels. Moreover, as an existing hash function, SHA-256 with a relatively long output length is included; however, concerns about security properties remain, because SHA-256 follows the design principle of SHA-1, and a hash function with higher security properties based on other design principle is thereby desired.

DISCLOSURE OF THE INVENTION

The present invention is made to solve the above-described issue, and it is an object of the invention to provide a data converter, a data conversion method and a program achieving a hash function with high security properties and high processing efficiency.

A first aspect of the invention provides a data converter including a data conversion section which receives message data to generate a hash value, the data conversion section being configured to execute a data conversion process with use of a plurality of compression-function execution sections and through a plurality of respective process sequences in which a plurality of divided data blocks constituting the message data are processed in parallel, in which each of the plurality of compression-function execution sections is configured to perform: a process with use of a message scheduling section which receives a corresponding divided data block of the message data to perform a message scheduling process; and a process with use of a chaining variable processing section which receives both of an output from the message scheduling section and an intermediate value as an output from a preceding processing section to generate output data whose number of bits is same as that of the intermediate value through compression of received data, and the plurality of compression-function execution sections, respectively performing parallel processing in the plurality of process sequences, are configured to commonly use one or both of the message scheduling section and the chaining variable processing section, and to allow a single message scheduling section or a single chaining variable processing section to be utilized.

Moreover, in an embodiment of the data converter of the invention, the plurality of compression-function execution sections, respectively performing parallel processing in the plurality of process sequences, include a single common message scheduling section which is commonly used by the plurality of compression-function execution sections, the common message scheduling section is configured to receive the divided data blocks constituting the message data, to generate output data through performing the message scheduling process on the divided data blocks, and to output the generated output data to a plurality of chaining variable processing sections, and each of the plurality of chaining variable processing sections are configured to execute processes in parallel, in each of which the corresponding chaining variable processing section receives both of an output from the common message scheduling section and an intermediate value as an output from a preceding compression-function executing section to perform a compression thereof, thereby to generate output data whose number of bits is same as that of the intermediate value.

Further, in an embodiment of the data converter of the invention, the plurality of compression-function execution sections, respectively performing parallel processing in the plurality of process sequences, include a single common chaining variable processing section which is commonly used by the plurality of compression-function execution sections, a plurality of message scheduling sections provided in each of the plurality of compression-function execution sections performing parallel processing are configured to receive the same divided data block of the message data, to generate output data through message scheduling processes, and to output the generated output data to the common chaining variable processing section, and the common chaining variable processing section is configured to receive both of outputs of the plurality of message scheduling sections and an intermediate value as an output from a preceding compression-function execution section to perform a compression thereof, thereby to generate output data whose number of bits is same as that of the intermediate value.

Moreover, in an embodiment of the data converter of the invention, the plurality of message scheduling sections provided in each of the plurality of compression-function execution sections performing parallel processing are configured to receive the same divided data block of the message data, to generate output data through message scheduling processes, and to output an exclusive-OR operation of the generated output data to the common chaining variable processing section.

Further, in an embodiment of the data converter of the invention, the message scheduling section is configured of a transposition-function executing section with intermediate output, which repeatedly executes a transposition process to output an intermediate value which is a result of each of the transposition processes, and the chaining variable processing section is configured to have a transposition-function executing section with additional input, which repeatedly executes a transposition process with use of the intermediate value as an additional input outputted from the transposition-function executing section with intermediate output.

Moreover, in an embodiment of the data converter of the invention, the chaining variable processing section is configured to utilize an XOR result as input data for the transposition process in a following state, the XOR result being a logical value of an exclusive-OR operation between the intermediate value outputted from the transposition-function executing section with intermediate output and a result of a transposition process in a preceding stage.

Further in an embodiment of the data converter of the invention, each of the transposition processes executed by the transposition-function executing sections includes a nonlinear conversion process performed on a part or a whole of input data and a swap process which is a data interchanging process.

Moreover, in an embodiment of the data converter of the invention, the nonlinear conversion process is a process including an exclusive-OR operation using a constant, a nonlinear conversion, and a linear conversion using a linear conversion matrix.

Further in an embodiment of the data converter of the invention, a linear conversion process performed in each of the transposition processes executed by the transposition-function executing sections is a process executed according to a DSM (Diffusion Switching Mechanism) with use of a plurality of different matrices.

Moreover, in an embodiment of the data converter of the invention, the transposition processes executed by the transposition-function executing sections are configured to perform data processes with use of a plurality of constants groups different from one another, respectively, and the plurality of constants groups different from one another, which are generated through data conversion processes performed on a fundamental group, are used in the transposition processes, respectively, the fundamental group being defined as a constants group to be used in one transposition process.

Further, in an embodiment of the data converter of the invention, the constants group to be utilized as the fundamental group is configured of a plurality of constants generated through application of a conversion rule to a plurality of initial values S and T which are different from each other, and the conversion rule is configured to include an update process performed on the initial values, the update process being represented by the following expression;

$$S \leftarrow S \cdot x^a, T \leftarrow T \cdot x^b$$

where a≠b.

Moreover, in an embodiment of the data converter of the invention, the data conversion process performed on the fundamental group is a process which allows a bit rotation operation on each of constants constituting the fundamental group, or a process which allows a logical operation between each of constants constituting the fundamental group and predetermined mask data.

Further, in an embodiment of the data converter of the invention, the data conversion section is configured to perform a reduction process which allows an ultimately outputted hash value to be reduced in number of bits, and the number of bits to be reduced, in output bits of each of a plurality of output-data series which constitute an output of the data conversion section, is calculated according to a predetermined expression for calculation, and then the reduction process is executed according to a result of the calculation.

Moreover, in an embodiment of the data converter of the invention, the data conversion section further includes a scramble-process section executing a data scramble process on input data, the plurality of compression-function execution sections are configured as multi-stage compression sections which are allowed to receive all divided data blocks of the message data, some of the multi-stage compression sections are configured to receive both of an output of the scramble-process section and the divided data blocks of the message data to execute the data compression process based on data received, some of the multi-stage compression sections are configured to receive both of an output of preceding-stage compression section and the divided data blocks of the message data to execute the data compression process based on data received, and a compression section located in a final stage of the multi-stage compression sections is configured to output a hash value of the message data.

Moreover, a second aspect of the invention provides a data conversion method being a data conversion process method executed by a data converter, the data conversion method including: a data conversion step of receiving message data to generate a hash value by a data conversion section, the data conversion step being a step of executing a data conversion process with use of a plurality of compression-function execution sections and through a plurality of respective process sequences in which a plurality of divided data blocks constituting the message data are processed in parallel, in which each of the plurality of compression-function execution sections perform: a process with use of a message scheduling section which receives a corresponding divided data block of the message data to perform a message scheduling process; and a process with use of a chaining variable processing section which receives both of an output from the message scheduling section and an intermediate value as an output from a preceding processing section to generate output data whose number of bits is same as that of the intermediate value through compression of received data, and the plurality of compression-function execution sections, respectively performing parallel processing in the plurality of process sequences, commonly use one or both of the message scheduling section and the chaining variable processing section, and perform a process with use of a single message scheduling section or a single chaining variable processing section.

Further, a third aspect of the invention provides a program executing a data conversion process in a data converter, the program including: a data conversion step of receiving message data to generate a hash value by a data conversion section, the data conversion step being a step of executing a data conversion process with use of a plurality of compression-function execution sections and through a plurality of process sequences in which a plurality of divided data blocks constituting the message data are processed in parallel, in which the program allows each of the plurality of compression-function execution sections to execute: a process with use of a message scheduling section which receives a corresponding divided data block of the message data to perform a message scheduling process; and a process with use of a chaining variable processing section which receives both of an output from the message scheduling section and an intermediate value as an output from a preceding processing section to generate output data whose number of bits is same as that of the intermediate value through compression of received data, and the program allows the plurality of compression-function execution sections, respectively performing parallel processing in the plurality of process sequences, to commonly use one or both of the message scheduling section and the chaining variable processing section, and to perform a process with use of a single message scheduling section or a single chaining variable processing section.

In addition, the program of the present invention is, for example, a program allowed to be provided to a general-purpose system capable of executing various program codes by a storage medium or a communication medium in a computer-readable format. The program is provided in a computer-readable format; therefore, a process according to the program is implemented on a computer system.

Further objects, features, or advantages of the present invention will become apparent from the following description of an exemplary embodiment of the present invention or more detailed description based on the accompanying drawings. In addition, in this description, "system" refers to a logical set configuration of a plurality of devices regardless of whether the individual constituent devices are contained in one enclosure.

An exemplary embodiment of the invention has a construction in which a data conversion process with use of a plurality of compression-function execution sections and through a plurality of process sequences in which divided data blocks constituting message data are processed in parallel is executed. Each of the plurality of compression-function execution sections performs a process with use of a message scheduling section which receives a corresponding divided data block of the message data to perform a message scheduling process, and a process with use of a chaining variable processing section which receives both of an output from the message scheduling sections and an intermediate value as an output from a preceding processing section to generate output data whose number of bits is same as that of the intermediate value through compression of received data. The plurality of compression-function execution sections, respectively performing parallel processing in the plurality of process sequences, are configured to commonly use one or both of the message scheduling section and the chaining variable processing section, and to allow a single message scheduling section or a single chaining variable processing section to be utilized. Downsizing of a hardware configuration and simplification of processing steps are achieved by such a construction.

BEST MODE(S) FOR CARRYING OUT THE INVENTION

Figure 1:
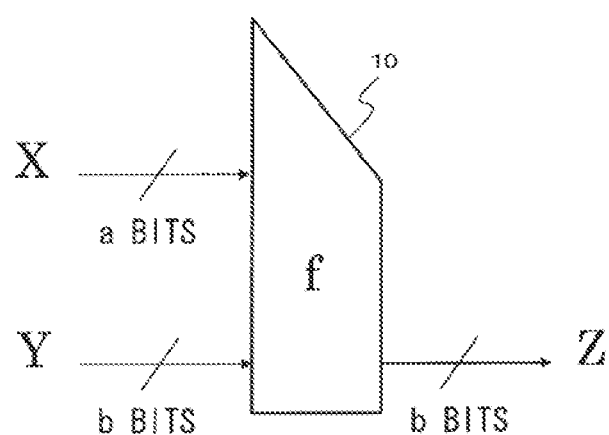
FIG. 1 is an illustration describing a compression function (f) as a data compression section.

A data converter, a data conversion method and a program of the present invention will be described in detail below referring to the accompanying drawings.

Description will be given in the following order.
1. Domain Extension Method
2. Novel Domain Extension Method for Extending Output Size
3. Method of Improving Processing Efficiency of Novel Domain Extension Method
4. Method of Achieving Scrambling Function F
5. Generalization of Domain Extension Method
6. Generalization of Construction of Scrambling Function F
7. Use of Different Compression Functions
8. Efficient Method of Achieving Internal Process of Compression Function
9. Method of Extending Input Message Length
10. Method of Achieving Hash Function Using Repeated Transposition in CV Processing Section and MS Section
11. Method of Extending Size of MS Section
12. Method of Extending Size of CV Processing Section
13. Method of Extending Sizes of CV Processing Section and MS Section
14. Method of Constructing Scrambling Function F for Domain Extension Method
15. Method of Achieving Transposition Process with High Diffusion Capability
16. Method of Generating Transposition Function with Highly Independent Output
17. Process of Generating Constant Applied to Transposition Function
18. Method of Generating Constant for a Plurality of Total Transpositions
19. Technique of Reducing Output Value of Hash Function
20. Configuration Example of Data Converter

[1. Domain Extension Method]

As described above, it is desirable for a hash function execution section to have the above-described various resistances, that is, preimage resistance, 2nd preimage resistance and collision resistance.

Note that a data converter of the invention includes various function execution sections such as a hash function execution section and a compression-function execution section which will be described below. In the following description, a term "function" simply expressed herein is executed in a function execution section executing each function in the data converter of the invention. Note that the function execution section is achieved with use of hardware or software, or both of them.

A hash function uses a compression function for computing a fixed-length compressed value (a digest) from an applied message. When a hashing section configured of hardware or software executing the hash function is constructed, it is necessary for the hashing section to have a construction with consideration given to the above-described various resistances. The construction of the hashing section is allowed to be broadly divided into two following hierarchical levels:

(1) a domain extension section as a first hierarchical level, and (2) an internal construction of a compression function as a second hierarchical level.

A domain is a maximum allowable bit size (input size) as an input value of the hash function. One compression-function execution section performs a process of converting a fixed-length input value into a fixed-length output value; however, in general, one compression-function execution section has a small maximum allowable input bit size, and is not allowed to process an input value with a large bit size; therefore, the domain is extended by connecting a plurality of compression functions so that a message input with an arbitrary length is handled. Hashing on input data with a long bit length is allowed by such a process. Such a process is performed as a domain extension process.

The levels of the above-described resistances depend on a domain extension construction as the first hierarchical level or the internal construction of the compression function as the second hierarchical level.

First, a novel scheme of the former, i.e., the domain extension process will be described below. The compression function is a function for converting a bit string as an input value into a shorter bit string than an input bit length. FIG. 1 illustrates a compression function (f) as a compression section.

A compression function 10 illustrated in FIG. 1 is a function for receiving an input value X with a bits and an initial value Y with b bits, that is, a+b bits in total to generate an output Z with b bits. A maximum allowable bit size as the input value of the compression function is called domain (input size). A long input message is not allowed to be handled by one compression function 10 only; therefore, compression functions are appropriately connected to extend the domain (input size), so that an input message size is allowed to be extended. In other words, the input of data with a long bit length is allowed.

Figure 2:
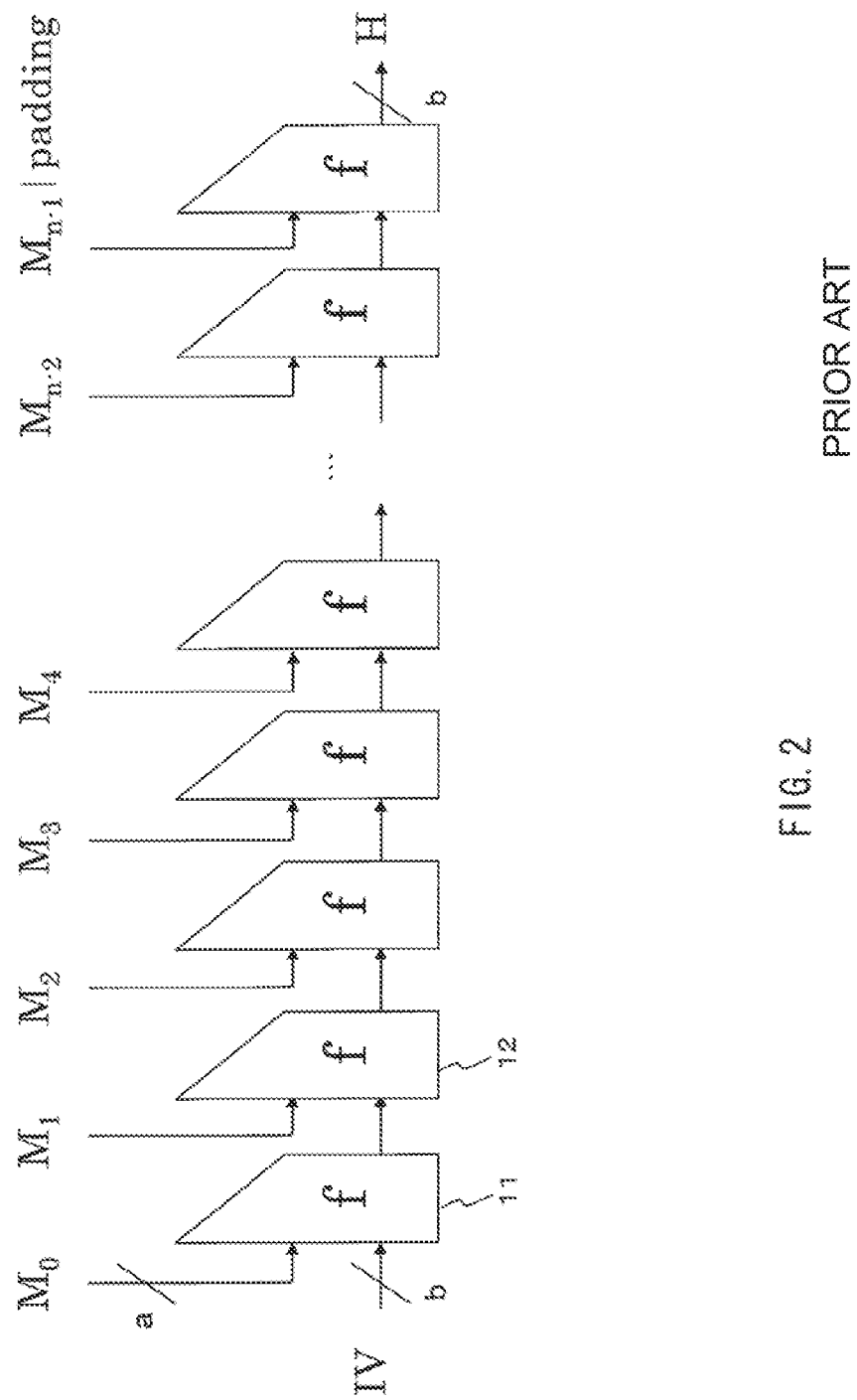
FIG. 2 is an illustration describing an MD (Merkle-Damgard) construction with message padding which is a typical domain extension method.

FIG. 2 illustrates an MD (Merkle-Damgard) construction with message padding which is a typical domain extension method. Note that the construction is described in, for example, R. Merkle, "One way hash functions and des." in Proceedings of Crypto'89 (G. Brassard, ed.), no.435 in LNCS, pp. 428-446, Springer-Verlag, 1989 and I. Damgard, "A design principle for hash functions." in Proceedings of Crypto'89 (G. Brassard, ed.), no.435 in LNCS, pp. 417-427, Springer-Verlag, 1989.

As illustrated in FIG. 2, the MD construction is a construction allowing an input size to be extended by arranging compression functions (f) in series. An input message is corrected by padding, which is performed as a bit data adding process for bit length adjustment, to be a value with an integral multiple of a bits which is a message input section size of the compression function. $M_0, M_1, M_2, \ldots, M_{n-2}\mu M_{n-1}|Padding$ are a-bit blocks into which an input message subjected to padding is divided. $[M_{n-1}|Padding]$ is data with an input bit size of a bits by adding padding data as an additional bit block to data $[M_{n-1}]$ as a final block of the input message.

To generate a digest of a message, in the MD construction, an operation in which a predetermined initial value IV with b bits and a first division message $M_0$ are applied to and compressed in a compression function 11 to generate a value with b bits as an intermediate value, and then the intermediate value and a following message are applied to and compressed in a compression function 12 is repeated with use of a plurality of compression functions to ultimately obtain a hash value (H). The intermediate value at this time is called chaining variable.

It is known that as long as each compression function has collision resistance, the MD construction is allowed to show that the whole hash function has collision resistance, and the MD construction is frequently used for actual hash functions. Typical hash functions using the MD construction include MD5 and SHA-1.

[2. Novel Domain Extension Method for Extending Output Size]

In the above-described construction, the case of a b-bit output is described, and now, a construction of a hash function generating a hash value with a long bit length of 2b bits will be considered below.

In the case where the above-described MD construction is used as it is, it is necessary to prepare a compression function with a 2b-bit output. However, in general, it is difficult to newly construct a compression function with a large-sized output and high security properties. It is necessary to design a novel compression function and evaluate security properties of the compression function, and the larger the output size is, the more difficult it is to design and evaluate the compression function. Therefore, it is desirable to construct a hash function with a 2b-bit output with use of compression functions with a b-bit output which have been already evaluated.

As a related-art technique of achieving a hash value with a large output bit size with use of compression functions with a small output bit size, a cascading hash construction is known. The cascading hash construction will be described referring to FIG. 3.

Figure 3:
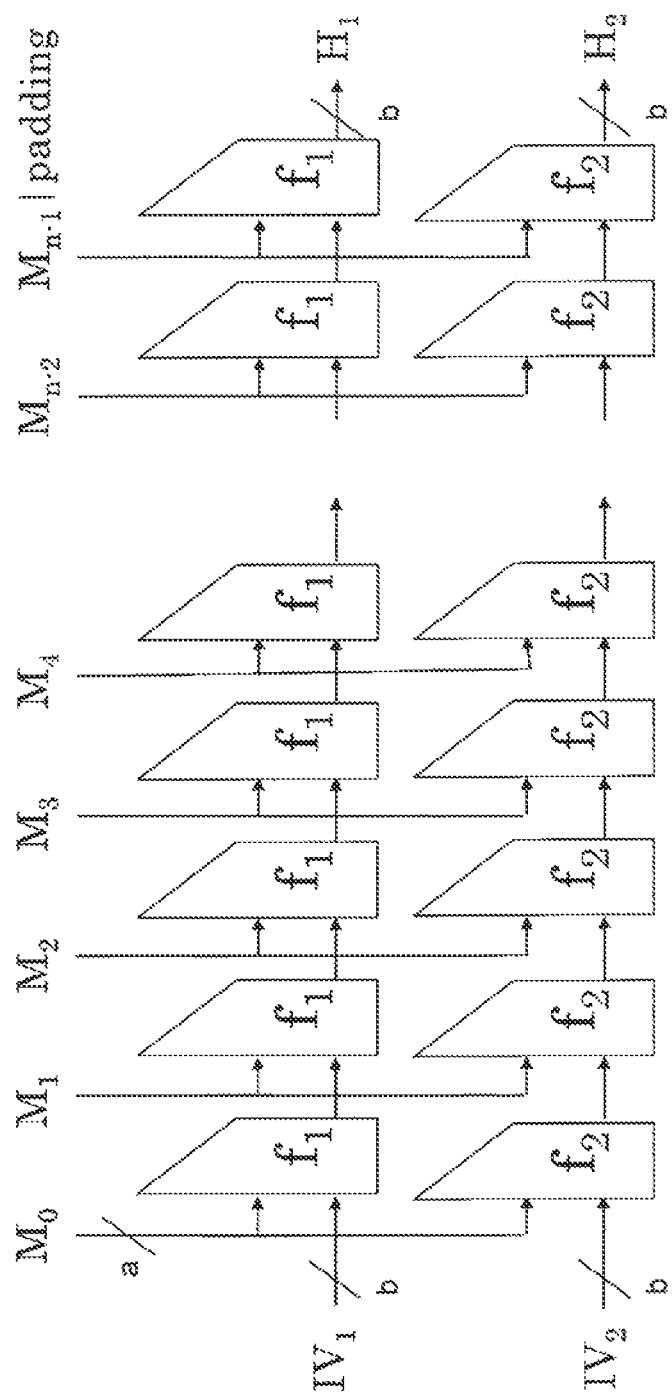
FIG. 3 is an illustration describing a cascading hash construction achieving a hash value with a large output bit size with use of a compression function with a small output bit size.

The cascading hash construction is a construction allowed to generate a hash value with a large output size with use of two compression functions arranged in parallel. As illustrated in FIG. 3, the cascading hash construction is constructed by simply arranging two compression functions $f_1$ and $f_2$ in parallel. A hash function with a 2b-bit output is allowed to be constructed by the construction.

However, the security properties of the hash function executing output of 2b bits by arranging such two compression functions with a b-bit output do not reach a desired level for a hash function with an output size of 2b bits. It is known that the hash function has security properties approximately equal to a hash function with an output size of b bits. This is described in, for example, A. Joux, "Multicollisions in iterated hash functions. Application to cascaded constructions." in Proceedings of Crypto'04 (M.Franklin, ed.), no. 3152 in LNCS, p.306-316, Springer-Verlag, 2004.

Figure 4:
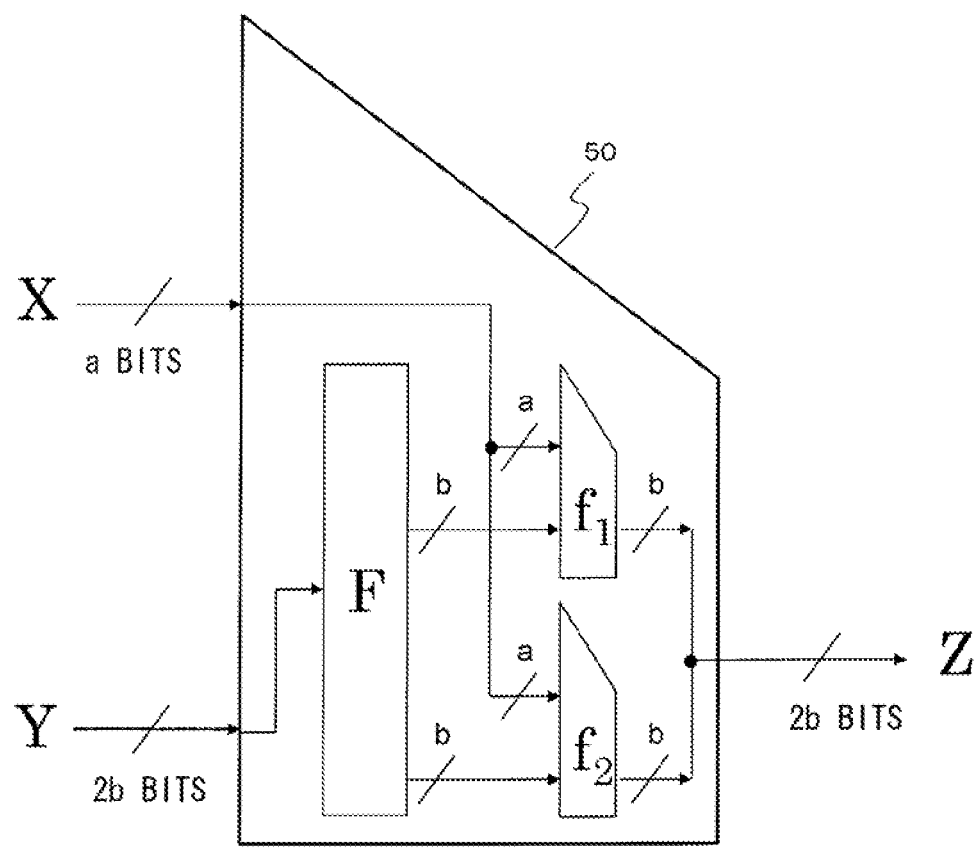
FIG. 4 is an illustration describing a construction of a compression section (a compression function) with enhanced security properties.

Next, a construction of a compression section (a compression function) with enhanced security properties according to an exemplary embodiment of the invention will be described below referring to FIG. 4. FIG. 4 illustrates a compression function unit 50 which is a compression section with an a-bit input and a 2b-bit output. The compression function unit 50 illustrated in FIG. 4 includes compression functions f1 and f2 which are two independent data compression sections with an a+b-bit input and a b-bit output and a scrambling function F as a data scrambling section with a 2b-bit input/output. In other words, the compression function unit 50 includes one scrambling function F and a sequence of two compression functions f1 and f2.

The compression function unit 50 receives a-bit data [X] and 2b-bit data [Y] as inputs, that is, an input of 2b+a bits in total. In the input, the 2b-bit data [Y] passes through the scrambling function F with a 2b-bit input/output and is scrambled. Next, a 2b-bit output from the scrambling function F is divided into b-bit data blocks, and one of the b-bit data blocks and the a-bit data X which is the other input of the compression function unit 50 are processed by the compression function f1 in the unit. The other b-bit data block and the a-bit data X are simultaneously processed by the compression function f2 in the unit. Finally, 2b bits generated by combining outputs of f1 and f2 are an output of the compression function 50. Note that the scrambling function F is a function for scrambling received 2b-bit data and outputting the 2b-bit data, and is a different compression function from the two compression functions f1 and f2.

Figure 5:
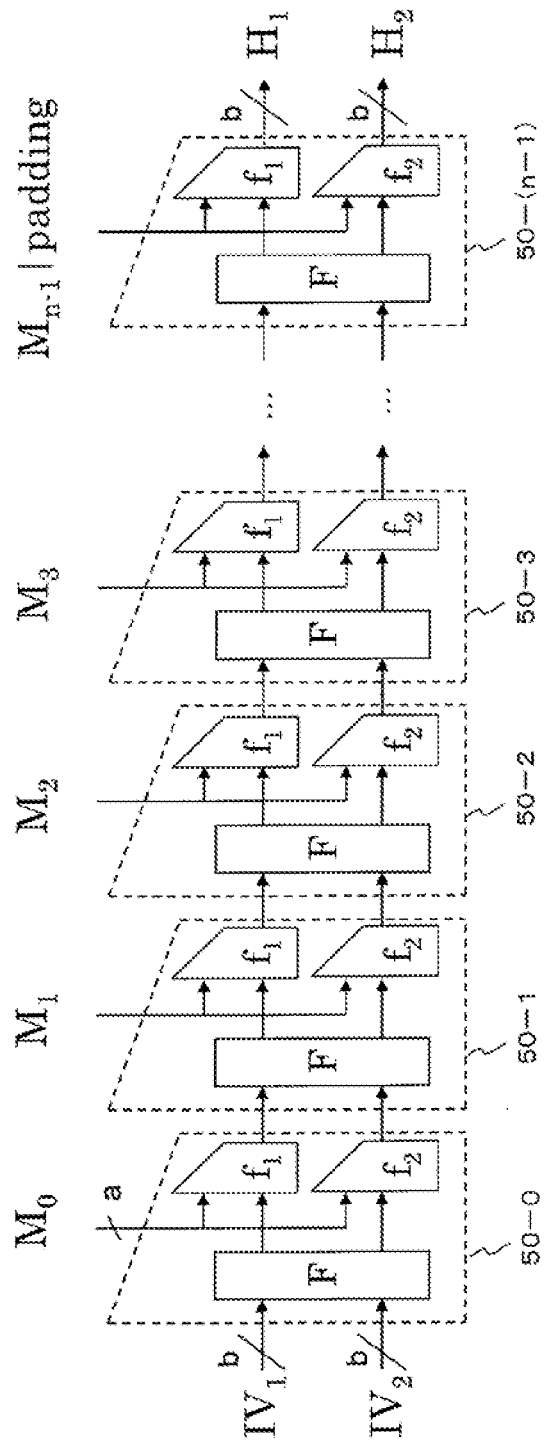
FIG. 5 is an illustration describing a hash function construction example in which compression function units 50 illustrated in FIG. 4 are connected as the MD constructions.

FIG. 5 illustrates a hash function construction example in which the compression function units 50 illustrated in FIG. 4 are connected as the MD constructions for domain extension allowing an input with a long bit length to be processed. A data converter illustrated in FIG. 5 includes a data conversion section configured of the MD construction. The construction illustrated in FIG. 5 is a construction configured of a data conversion section including a number n of the compression function units 50 described referring to FIG. 4. In other words, the data converter is a data converter as a hash function execution section configured of the number n of compression function units 50 including one scrambling function F with a 2b-bit input/output and a sequence of two compression functions f1 and f2 with an a+b-bit input and a b-bit output.

In the hash function illustrated in FIG. 5, the compression function units 50-0 to 50-(n−1) are used as a sequence of n stages, and a 2b-bit hash value $(H_1|H_2)$ is generated from the compression function unit 50-(n−1) in a final stage.

The compression function unit 50-0 in a first stage receives a first a-bit input $M_0$ of bit inputs $M_0$ to $M_{n-1}$, and two b-bit initial values $IV_1$ and $IV_2$, and the compression functions f1 and f2 generates b-bit outputs, respectively, that is, an output of 2b bits in total. The compression function unit in a following stage receives 2b bits applied from the compression functions f1 and f2 in the compression function unit in a preceding stage and a bits which are constituent bits of each of $M_0$ to $M_{n-1}$, to generate an output of 2b bits. The same process is repeatedly executed in the compression function units in later stages, and the compression function unit in a final stage receives an output of 2b bits applied from the compression function unit in a preceding stage and a bits from $M_{n-1}$ and padding data to generate b-bit outputs $H_1$ and $H_2$, that is, a hash value $(H_1|H_2)$ with 2b bits in total.

If the compression functions f1 and f2 and the scrambling function F configuring the compression function unit 50 satisfy a property called random oracle, it is shown that this construction has sufficient security properties. The random oracle is a function generating a random number therein when an input is applied thereto, and generating a random number generated in the past again when an input which has been applied before is applied thereto. In practice, the construction is achieved by designing a function for computing an output by a decisive procedure not needing random number generation approximating a behavior of the random oracle and transposing a function to the designed function. A part having easily evaluated security properties and light load process is allowed to be used in the compression function by the construction; therefore, a hash function which is easily designed and has high efficiency is achievable.

In the exemplary embodiment, a scramble process is executed at least at fixed intervals in a compression process round configured of a plurality of rounds, so a data converter generating a hash value with enhanced analysis resistance and high security properties is achieved.

Figure 6:
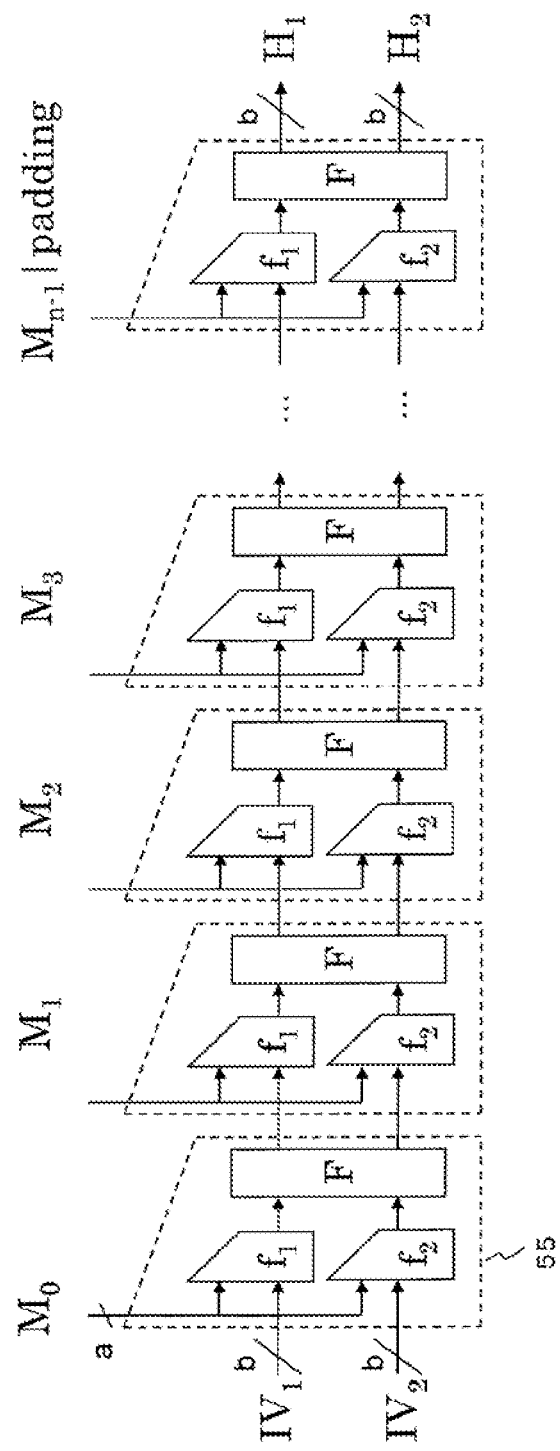
FIG. 6 is an illustration describing a hash function construction example as a modification example of a construction illustrated in FIG. 5 using compression function units 55 in which the order of a scrambling function F and compression functions f1 and f2 in each compression function is changed.

Moreover, as a modification example of the construction illustrated in FIG. 5, as illustrated in FIG. 6, also in the case where compression function units 55 in which the order of the scrambling function F and the compression functions f1 and f2 is changed are used, the construction is allowed to be used as a hash function having the same effects.

Figure 7:
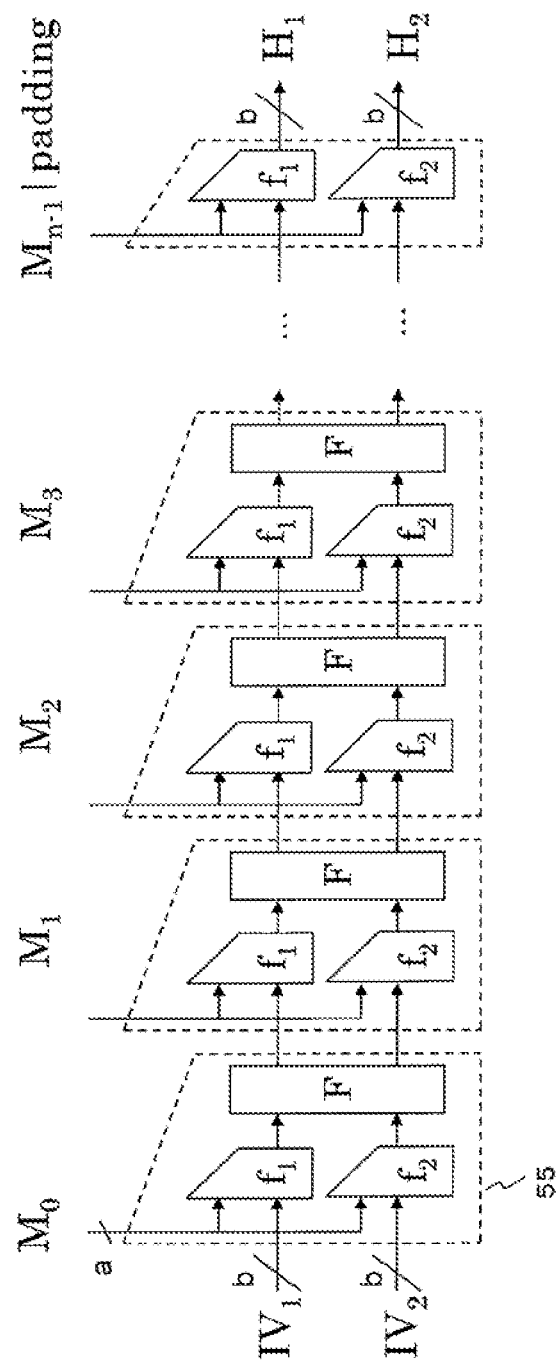
FIG. 7 is an illustration describing a construction example configured by removing the scrambling function F in a final compression function unit from a construction illustrated in FIG. 6

Moreover, as a modification example of the constructions illustrated in FIGS. 5 and 6, as illustrated in FIG. 7, even a construction formed by removing the scrambling function F in the final stage from the construction illustrated in FIG. 6 is allowed to be used as a hash function having the same effects in security properties. As this construction is obtained by redefining outputs of a first scrambling function F as $IV_1$ and $IV_2$ in the construction illustrated in FIG. 5, the same is derived.

Thus, a hash function with a 2b-bit output and high security properties is allowed to be constructed with compression functions with a smaller b-bit output and the scrambling function F without constructing a compression function for 2b-bit output only.

Moreover, in the constructions illustrated in FIGS. 5, 6 and 7, the number of output bits of each of the compression functions f1 and f2 in the compression function unit is b bits, and the intermediate values, that is, the chaining variables in the internal compression functions f1 and f2 is equal to each other.

However, it is not necessary for the bit sizes of the chaining variables (CVs) of the internal compression functions f1 and f2 to be equal to each other. For example, a total chaining variable (CV) may have b+c bits by setting the internal compression function f1 and the internal compression function f2 to generate a b-bit chaining variable (CV) and a c-bit chaining variable (CV), respectively. Even in such a construction, the compression function unit is achievable by the construction of a smaller function, so a compression function for a small bit size with confirmed security properties is applicable as an internal compression function.

[3. Method of Improving Processing Efficiency of Novel Domain Extension Method]

Figure 8:
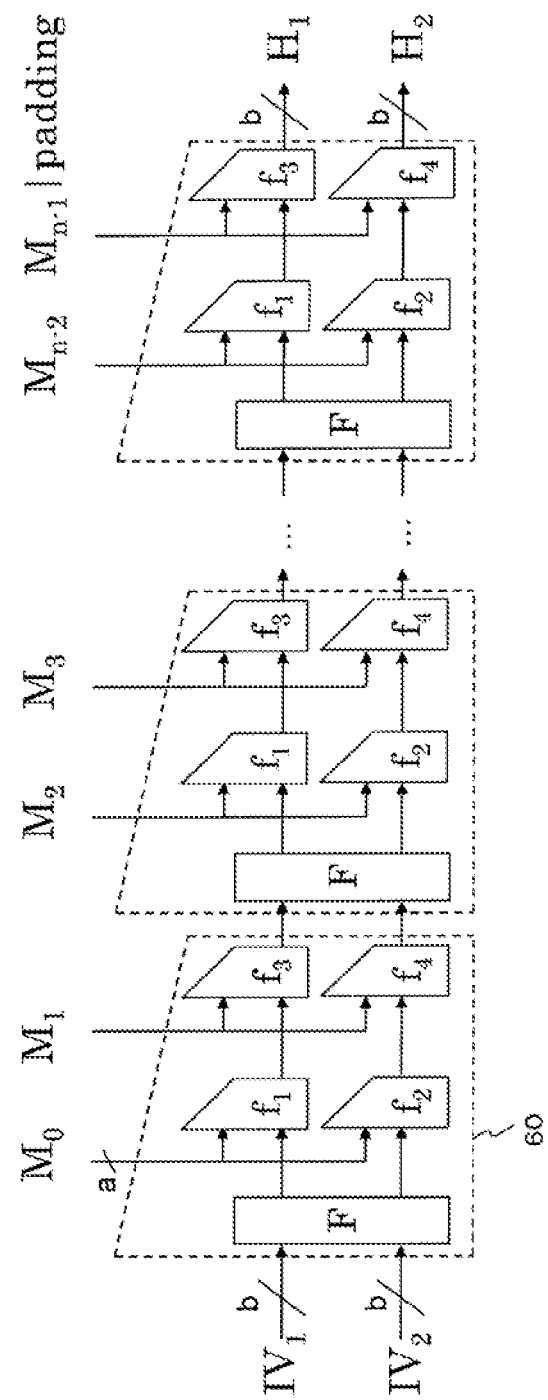
FIG. 8 is an illustration describing a construction example in which the scrambling function F is set to be inserted every two compression function processes.

Next, a construction example of a hash function with improved processing efficiency of the domain extension method described referring to FIGS. 5 and 6 will be described referring to FIG. 8. FIG. 8 is a hash function construction example in which the scrambling function F is inserted every two compression function processes.

A compression function unit 60 is configured of the scrambling function F, a sequence of two internal compression functions f1 and f3 and a sequence of two internal compression functions f2 and f4. The four internal compression functions included in the compression function unit 60 are different and independent compression functions. In other words, four compression functions included in a region sandwiched between two scrambling functions F are independent compression functions.

The compression function unit 60 in a first stage receives two b-bit initial values $IV_1$ and $IV_2$, and the scrambling function F scrambles the received 2b-bit data to apply b bits to each of the compression functions f1 and f2. The compression functions f1 and f2 receive a first a-bit input $M_0$ of bit inputs $M_0$ to $M_{n-1}$ and an output of b bits from the scrambling function F to generate b-bit outputs, and then apply the b-bit outputs to the compression functions f3 and f4 in a following sequence, respectively.

The compression functions f3 and f4 receive an a-bit input $M_1$ of the bit inputs $M_0$ to $M_{n-1}$ and the b-bit outputs from the compression functions f1 and f2 in the preceding sequence, respectively, to generate b-bit outputs and then apply the b-bit outputs to the scrambling function F of the compression function unit in a following stage.

The compression function unit in a following stage receives 2b bits applied from the compression functions of the compression function unit in a preceding stage and 2a bits which are constituent bits of $M_0$ to $M_{n-1}$ to generate an output of 2b bits. The same process is repeatedly executed in the compression function units in later stages, and the compression function unit in a final stage receives 2b bits applied from the compression function unit in a preceding stage, a bits of $M_{n-2}$, and a bits of $M_{n-1}$ and padding data, and generates b-bit outputs $H_1$ and $H_2$, that is, a hash value ($H_1|H_2$) with 2b bits in total.

In the construction, compared to the construction illustrated in FIG. 5, the number of calls for the scrambling function F at the time of processing a message with the same length is reduced, so processing efficiency is improved. More specifically, in the construction illustrated in FIG. 5, two scrambling functions F and four compression functions are necessary to process two a-bit messages, and in a scheme illustrated in FIG. 8, the messages are processed by only one scrambling function F and four compression functions, so one scrambling function F is allowed to be removed, thereby achieving higher processing efficiency.

Figure 9:
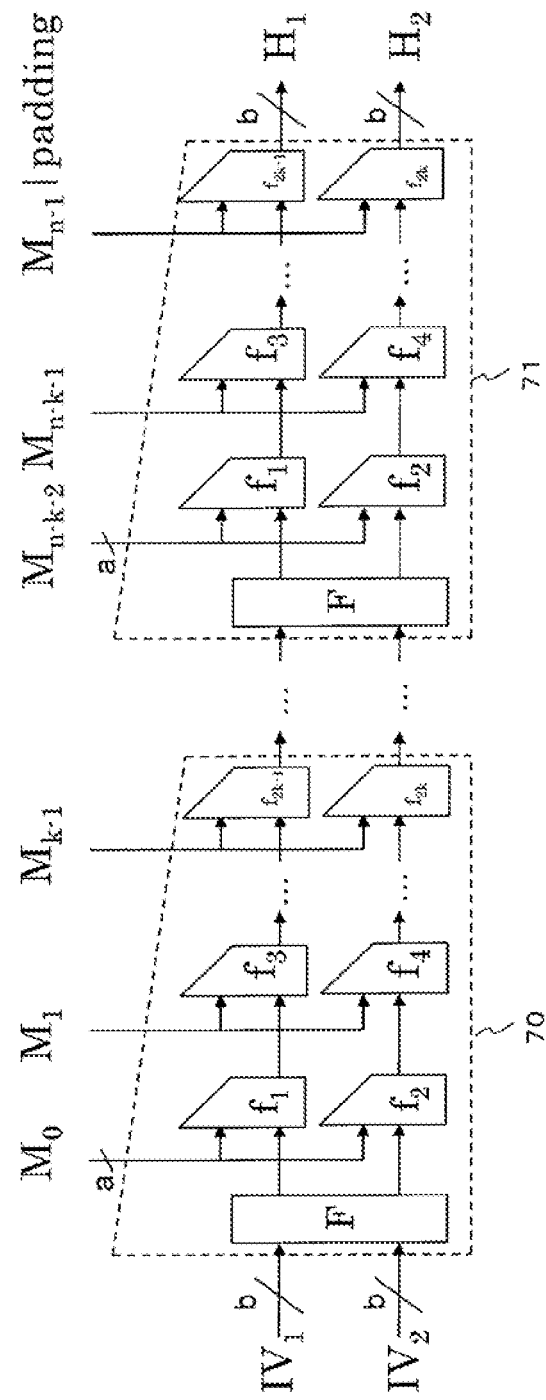
FIG. 9 is an illustration describing a construction example of a generalized hash function execution section in which the scrambling function F are set to be inserted every number k of compression functions.

A construction illustrated in FIG. 8 is set to repeatedly execute the scrambling function F and two sequences of compression functions. A construction in which the number of scrambling functions is further reduced and the scrambling function F is inserted every three or more sequences of compression functions may be applied. A construction example of a generalized hash function execution section in which the scrambling function F is inserted every k compression functions is illustrated in FIG. 9. In the construction illustrated in FIG. 9, a compression function unit 70 includes one scrambling function F with a 2b-bit input/output and a number k of sequences each including two compression functions with an a+b-bit input and a b-bit output.

The compression function unit 70 in a first stage receives two b-bit initial values $IV_1$ and $IV_2$, and the scrambling function F scrambles received 2b-bit data to generate an output of b bits to each of the compression functions f1 and f2 in one sequence. The compression functions f1 and f2 receive a first a-bit input $M_o$ of bit inputs $M_0$ to $M_{n-1}$ and an output of b bits from the scrambling function F to generate b-bit outputs, and then apply the b-bit outputs to the compression functions f3 and f4 in a following sequence, respectively.

The compression functions f3 and f4 receive an a-bit input $M_1$ of the bit inputs $M_0$ to $M_{n-1}$ and the b-bit outputs from the compression functions f1 and f2 in the preceding sequence, respectively, to generate b-bit outputs and then apply the b-bit outputs to compression functions in a following sequence, respectively. A process in which an output from each compression function in a preceding sequence and a bits configuring each of bit inputs $M_0$ to $M_{n-1}$ are applied to each compression function in a following sequence and the compression functions each generate a b-bit output is repeated k times, and outputs from two compression functions in a k-th sequence are applied to the scrambling function F of a following compression function unit 71.

The process by the compression function unit 71 is the same as the process by the compression function unit 70. However, bit data of the latter half of the bit inputs $M_0$ to $M_{n-1}$ and padding data are applied to the compression function unit 71. The two compression functions in a final sequence of the compression function unit 71 generate b-bit outputs $H_1$ and $H_2$, respectively, that is, a hash value ($H_1|H_2$) with 2b bits in total.

Note that the scrambling function F is inserted at intervals which is determined according to an output length of 2b bits of a hash value within a range of not impairing security properties. For example, in the case of b=256, the value k is 8. The larger the value k is, the more the processing efficiency is improved.

The construction illustrated in FIG. 9 is a construction in which the scrambling function F receives an initial value, and sequences each including two compression functions are followed by the scrambling function F as in the case of the construction illustrated in FIG. 5, but a compression function unit in which two compression functions in a sequence described referring to FIG. 6 or the like receive an initial value, and a plurality of sequences each including two compression functions are executed, and then the scrambling function F is executed in the end may be used.

[4. Method of Achieving Scrambling Function F]

Figure 10:
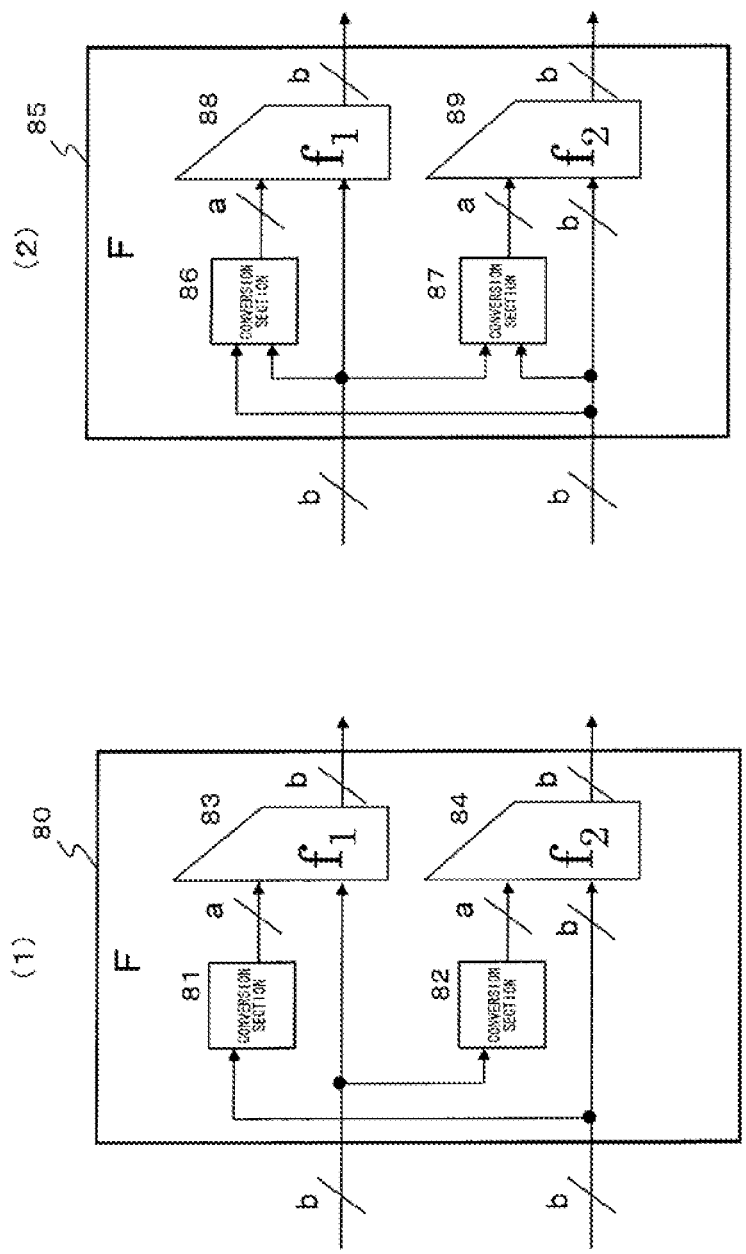
FIG. 10 is an illustration describing a construction example achieving the scrambling function F with use of two compression functions.

The scrambling function F is a function for scrambling input bits to generate data whose number of bits is same as the input bits. A specific construction for achieving the scrambling function will be described below referring to FIG. 10. FIG. 10 is a construction in which the scrambling function F is achieved with use of two compression functions.

A scrambling function F80 illustrated in FIG. 10(1) is an example in which the scrambling function F80 with a 2b-bit input/output is achieved with use of two conversion sections 81 and 82 with a b-bit input and an a-bit output and two compression functions 83 and 84 with an a+b-bit input and a b-bit output. Two divided b-bit data blocks to be applied to the scrambling function F80 are supplied as b-bit inputs for the compression functions 83 and 84, respectively.

Moreover, the two b-bit data blocks are simultaneously applied to the conversion sections 81 and 82, respectively, to be converted into a-bit data, and then the a-bit data are supplied as a-bit input data for the compression functions 83 and 84, respectively. It is only necessary for the conversion sections 81 and 82 to perform a simple process for adjusting a bit length, and, for example, the conversion sections 81 and 82 are achievable with a simple logical operation such as extension by duplicating bits or XOR.

The conversion sections 81 and 82 are preferably set to satisfy the following condition. More specifically, the conversion sections 81 and 82 are set so that all 2b bits of an input for the scrambling function F80 have an influence on inputs of a+b bits for the compression functions 83 and 84. The scrambling function F is allowed to be constructed by the construction illustrated in FIG. 10, and as a result, the scrambling function F is achievable by only a process corresponding to two compression functions.

A scrambling function F85 illustrated in FIG. 10(2) is an example in which inputs for the conversion sections 86 and 87 each have 2b bits. In the case where, for example, a>b, the conversion sections 86 and 87 are constructed with a function for connecting two b-bit data and then reducing the number of bits to generate a bits by a simple operation such as XOR. The conversion sections 86 and 87 are preferably set to satisfy the following condition. More specifically, the conversion sections 86 and 87 are set so that all 2b bits of an input for the scrambling function F85 have an influence on inputs of a+b bits for the compression functions 88 and 89. Also in this construction, the scrambling function F is achievable by only a process corresponding to two compression functions.

The constructions of the scrambling functions F illustrated in FIG. 10 are allowed to be used as the scrambling function F in the constructions of the hash functions referring to FIGS. 5 to 9. When such constructions are used, the scrambling function F is achievable by reusing compression functions originally provided for the compression function units illustrated in FIGS. 5 to 9. Sharing of such a component is effective in a reduction in gate scale at the time of hardware implementation, and downsizing of a device and cost reduction are allowed.

[5. Generalization of Domain Extension Method]

The hash function with the MD construction described referring to FIGS. 5 to 9 has a construction in which an output from one scrambling function F is applied to a sequence including two compression functions, or a construction in which outputs from a sequence including two compression functions are applied to one scrambling function F. In other words, the hash function is set to use a sequence including two compression functions.

The number of compression functions in a sequence is not limited to two, and a construction in which three or more compression functions are included in a sequence may be used. A generalized construction example of a hash function with a number m of compression functions in a sequence where m is an integer of 2 or larger is illustrated in FIG. 11.

Figure 11:
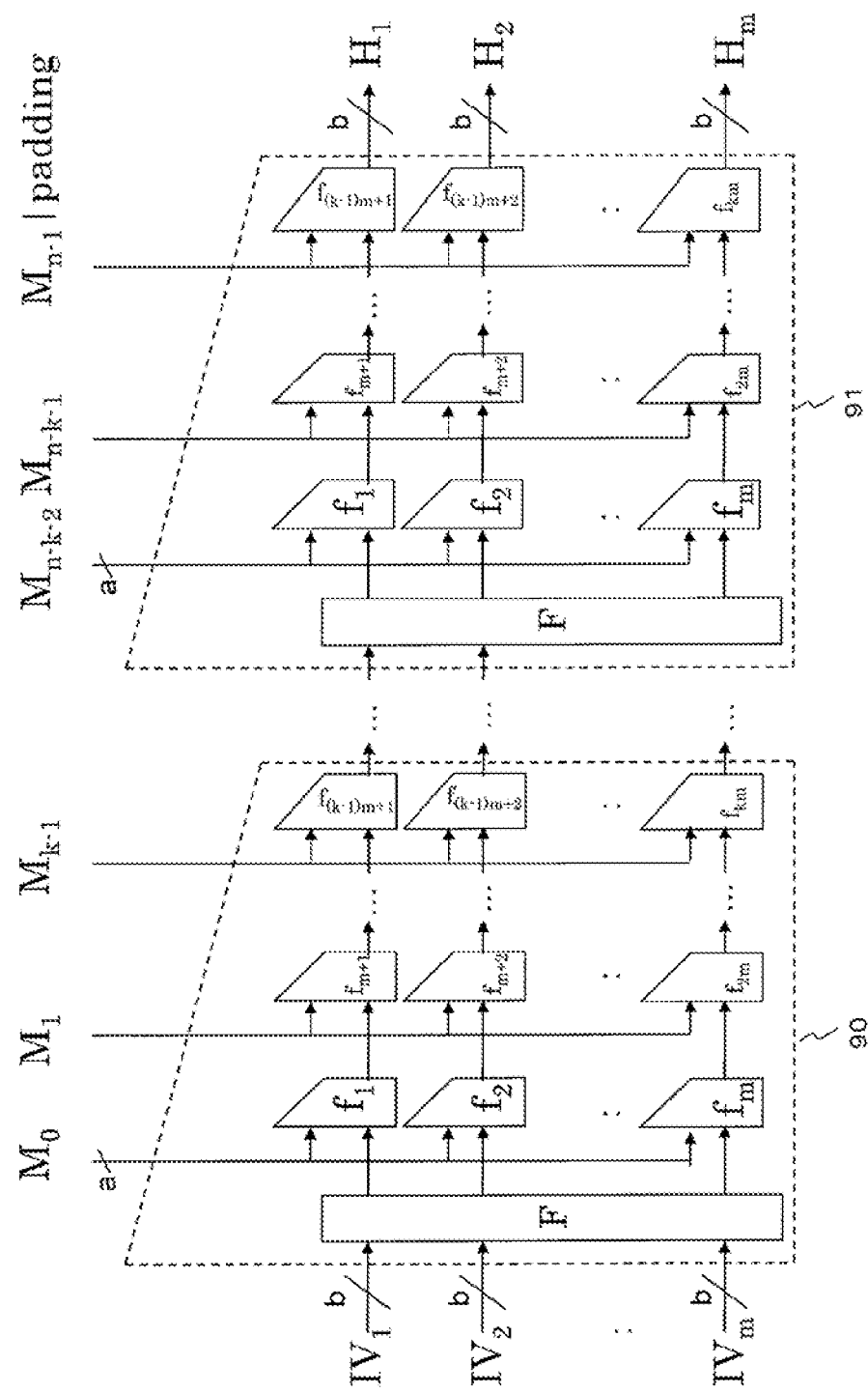
FIG. 11 is an illustration describing a generalized construction example of a hash function with a number m of compression functions in a sequence, where m is an integer of 2 or larger.

The construction in FIG. 11 is based on the construction illustrated in FIG. 9, and includes the number m of compression functions in a sequence instead of two compression functions. A compression function unit 90 includes the scrambling function F with an mb-bit input/output and a plurality of sequences each including the number m of compression functions. The number m of compression functions f1 to fm in a first sequence receive b bits from bit data of mb bits from an F-function and a first a-bit input $M_0$ of bit inputs $M_0$ to $M_{n-1}$ to generate outputs of b bits and apply the outputs of b bits to compression functions in a following sequence, respectively. The number m of compression functions in a k-th sequence receive outputs from the compression functions in a preceding sequence, respectively, and a bits of the bit inputs $M_0$ to $M_{n-1}$ to generate outputs of b bits. After a process by the compression functions in the k-th sequence, an output of mb bits from the compression functions in a final sequence of the compression function unit 90 is applied to the scrambling function F of a following compression function unit.

Outputs $H_1$ to $H_m$ of b bits from the number m of compression functions in a final sequence of the compression function unit 91 in a final stage, that is, 2 mb bits in total are generated as a hash value ($H_1|H_2|...|H_m$). The obtained hash values $H_1$, $H_2, \ldots, H_m$ have mb bits at maximum. A hash function with an output with a longer length is easily achieved by this technique.

[6. Generalization of Construction of Scrambling Function F]

Next, a generalized construction of the scrambling function F will be described below. A specific construction of the scrambling function F is described above referring to FIG. 10. The scrambling function F described referring to FIG. 10 has a construction using a sequence including two compression functions.

Figure 12:
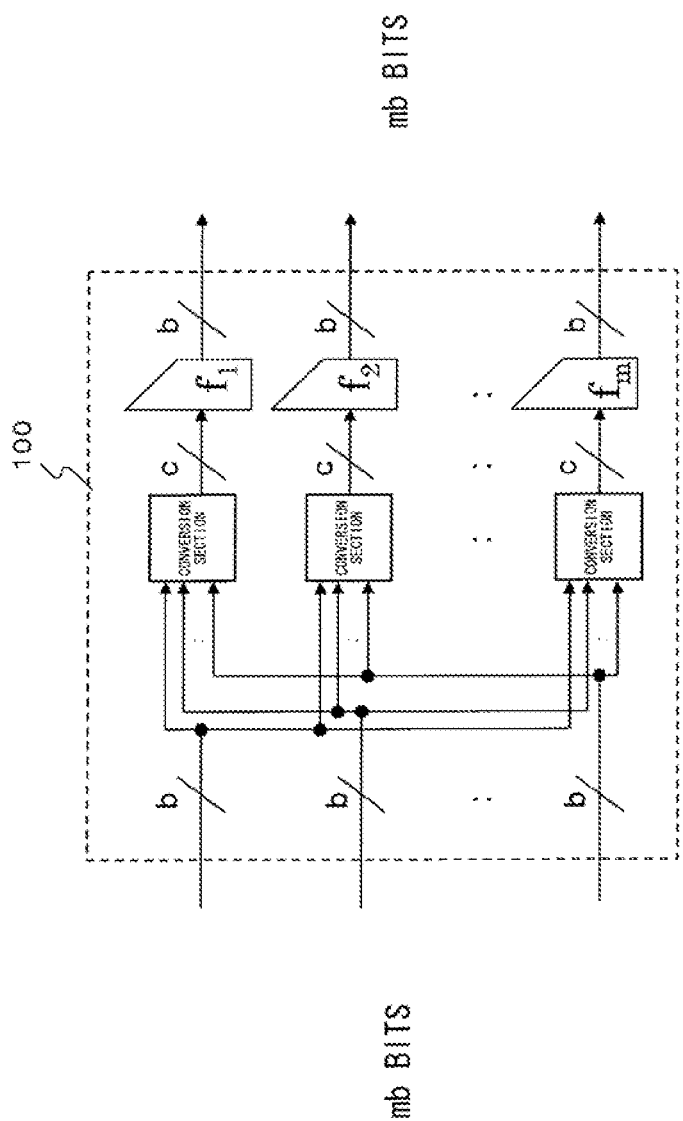
FIG. 12 is an illustration describing a construction example of a scrambling function F with an mb-bit input/output.

A construction example of a scrambling function F with an mb-bit input/output formed by generalizing the scrambling function F described referring to FIG. 10 is illustrated in FIG. 12. A scrambling function F100 illustrated in FIG. 12 is configured of a sequence including a number m of compression functions f1 to fm with a c-bit input and a b-bit output and a number m of conversion sections arranged in front of the compression functions f1 to fm, respectively.

In the example illustrated in FIG. 12, m kinds of different and independent compression functions f1 to fm each have an input size of c bits. All of mb bits are temporarily applied to each of the conversion sections so that an influence of all input bits is exerted on the compression functions f1 to fm, and an input size is reduced so as to correspond to the input size of each of the compression functions. In the conversion sections, c-bit outputs are generated from the mb-bit input by, for example, exclusive OR (XOR) or a bit size extension process.

A condition necessary for the conversion sections is that all of mb bits which are input bits for the scrambling function F100 exert an influence on any bit of the c-bit outputs. This condition is achievable by a simple operation. For example, in the case of c=mb, each of the conversion sections may connect inputs without change and generate the connected inputs.

[7. Use of Different Compression Functions]

In the above description, in the compression function unit including a plurality of compression functions f1, f2, . . . , fm which are divided into a plurality of sequences, the compression functions f1 to fm in the compression function unit have different constructions. This construction objectively shows highest security properties, and even if a single compression function is used, the security properties are not impaired immediately. In some cases, a construction in which a single compression function is repeatedly used has a merit in implementation; therefore, as a different embodiment, a construction in which all compression functions are the same may be used. Likewise, a construction in which compression functions of a fewer kinds instead of the same kind are repeatedly used may be applied.

[8. Efficient Method of Achieving Internal Process of Compression Function]

Figure 13:
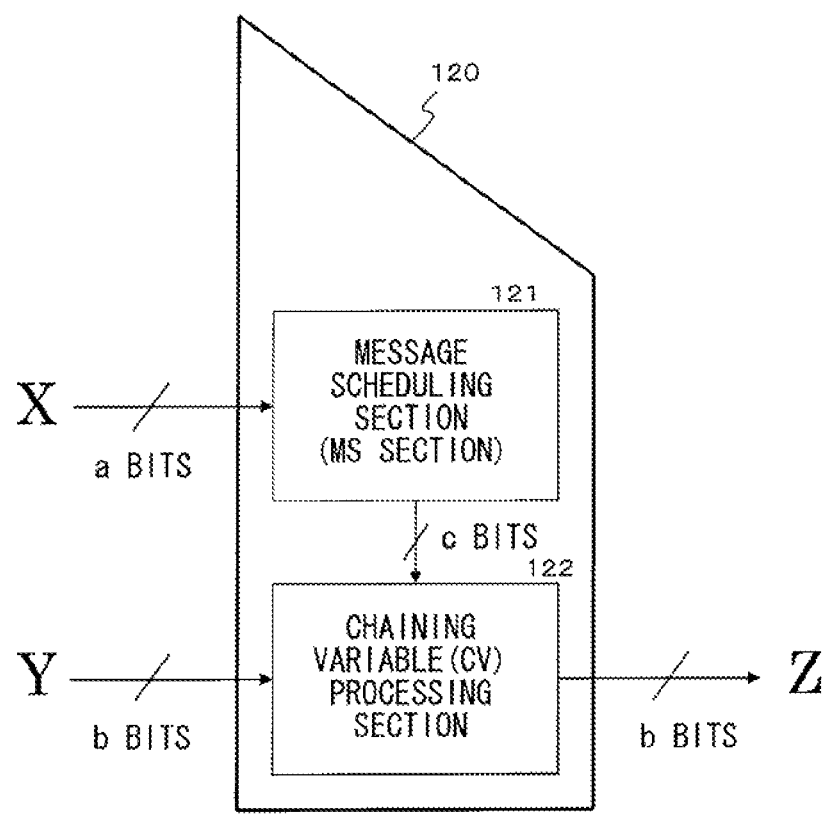
FIG. 13 is an illustration describing an internal construction example of a compression function f.

A specific construction example of a compression function f1 provided for the compression function units described above will be described below. An internal construction example of a compression function f is illustrated in FIG. 13. FIG. 13 is a construction example of the compression function f1 which is allowed to be used as the compression function fi provided for the compression function units described referring to FIGS. 5 to 12 and also as a constituent element of the scrambling function F.

As illustrated in FIG. 13, a compression function 120 includes a message scheduling section (MS section) 121 and a chaining variable (CV) processing section 122. In a+b bits which are applied to the compression function 120, a bits as [X] are applied to the message scheduling section (MS section) 121, and the remaining b bits as [Y] are applied to the chaining variable (CV) processing section 122.

The message scheduling section (MS section) 121 generates a c-bit output and applies the c-bit output to the chaining variable (CV) processing section 122 by a message scheduling process based on the a-bit input. The chaining variable (CV) processing section 122 receives an input of b bits for the compression function 120 and an input of c bits applied from the message scheduling section (MS section) 121, that is, b+c bits to generate a b-bit output [Z] as an output from the compression function 120.

Figure 14:
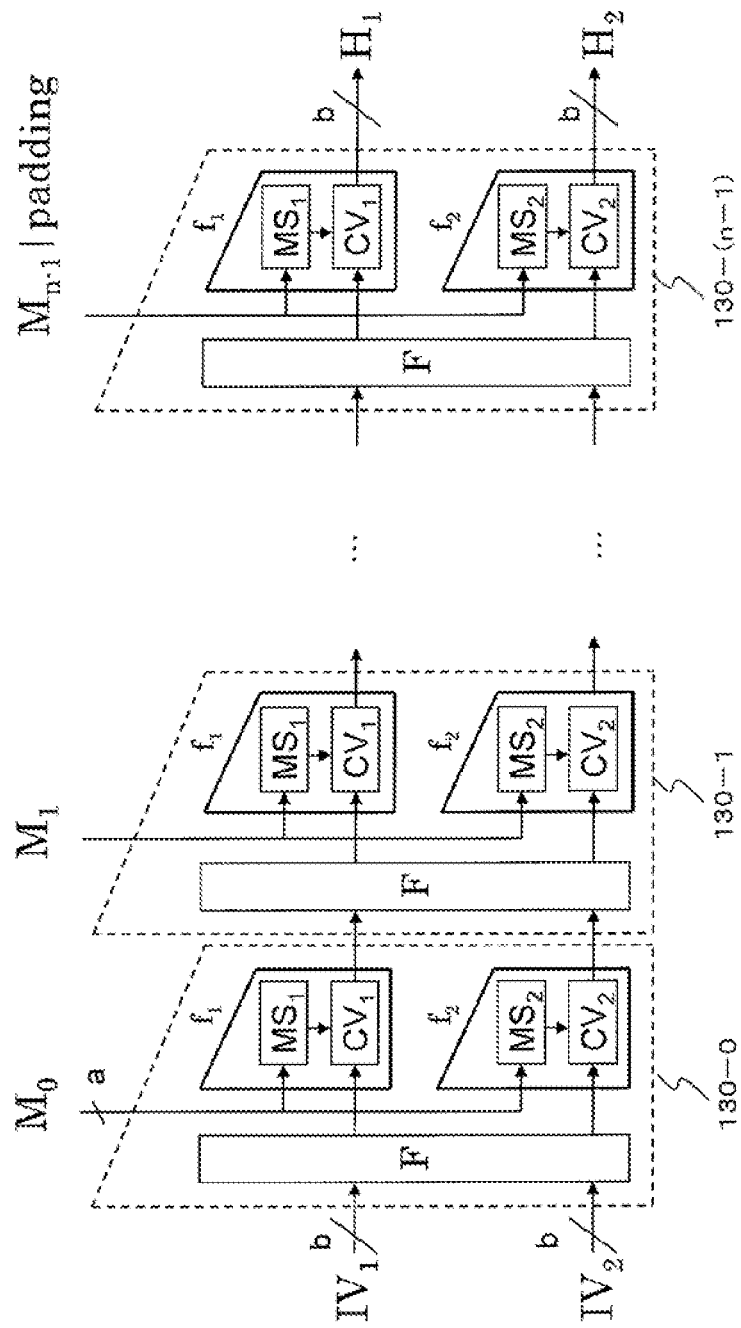
FIG. 14 is an illustration describing a construction example in which a compression function configured of a message scheduling section (MS section) and a chaining variable (CV) processing section is provided for a hash function with the MD construction.

FIG. 14 illustrates a construction example in which the compression function illustrated in FIG. 13, that is, a compression function configured of the message scheduling section (MS section) and the chaining variable (CV) processing section is provided for a hash function with the MD construction described above referring to FIG. 5.

A compression function unit 130 illustrated in FIG. 14 is configured of the scrambling function F and a sequence of two compression functions f1 and f2 as in the case described above referring to FIG. 5. Each of the compression functions f1 and f2 has the construction described referring to FIG. 13. In other words, each of the compression functions f1 and f2 is a compression function configured of the message scheduling section (MS section) and the chaining variable (CV) processing section.

In the example illustrated in FIG. 14, the message scheduling sections (MS sections) in two kinds of compression functions f1 and f2 are represented by MS1 and MS2, respectively, and the chaining variable (CV) processing sections are represented by CV1 and CV2, respectively. The hash function is achievable by this construction. A construction achieving a further improvement in processing efficiency will be described below.

In each of compression function units 130-0 to 130-(n−1) illustrated in FIG. 14, a message Mi is simultaneously applied to the message scheduling sections MS1 and MS2 in the two compression functions. Therefore, when two compression functions arranged one above the other commonly use the message scheduling section, processes are allowed to be reduced.

Figure 15:
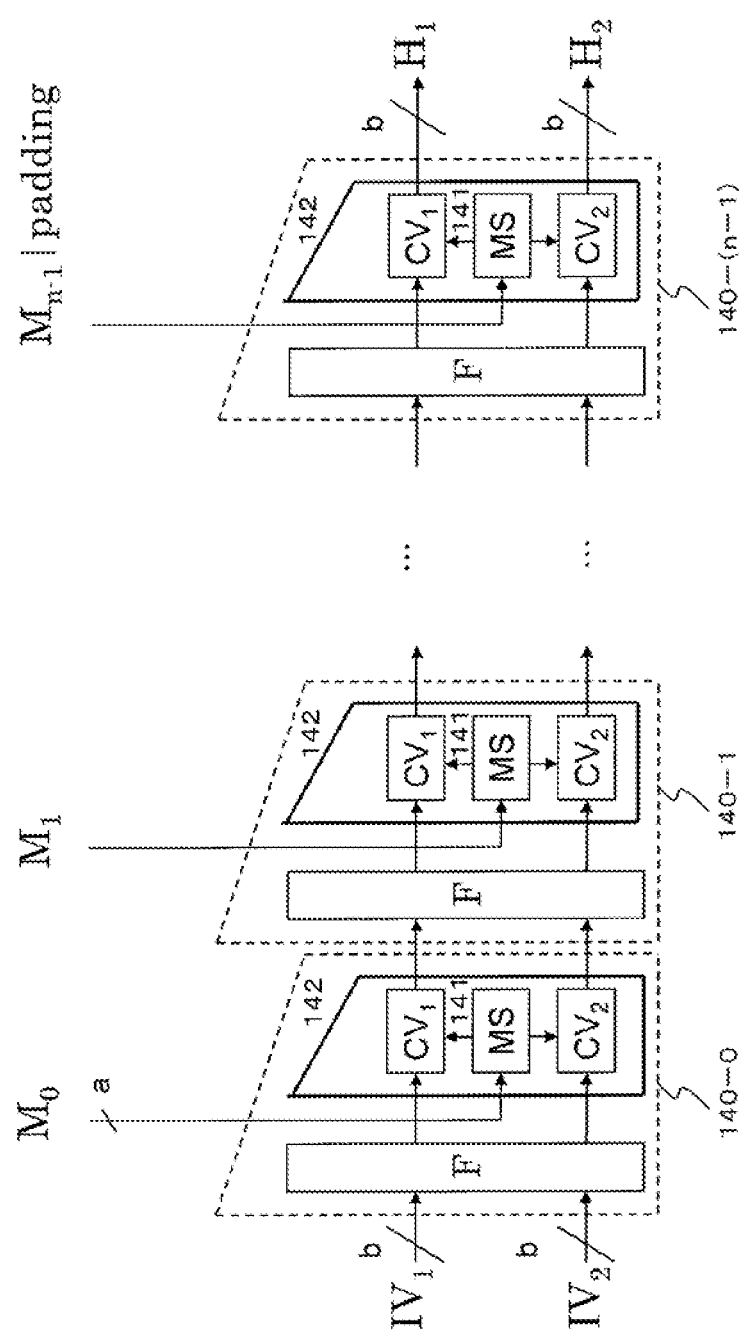
FIG. 15 is an illustration describing a construction example of a hash function in which the message scheduling section is commonly used.

FIG. 15 illustrates a construction example of a hash function in which the message scheduling section is commonly used. There is provided a compression function 142 in which the chaining variable (CV) processing sections CV1 and CV2 commonly use one message scheduling section (MS section) 141 instead of the message scheduling sections in two compression functions, which are arranged one above the other and included in each of the compression function units 130-0 to 130-(n−1). When the construction of the compression function 142 including one message scheduling section (MS section) 141 is applied, it is only necessary to execute an logical operation by the message scheduling section (MS section) only once in one compression function unit 140, and the number of necessary logical operations is allowed to be reduced. For example, downsizing of a hardware configuration and simplification of processing steps are achieved.

The construction described referring to FIG. 15 in which a plurality of compression functions commonly use the message scheduling section is applicable to the above-described plurality of hash constructions. In other words, the construction is applicable to the compression function unit including a sequence of a plurality of compression functions and the compression function in the scrambling function F which are described referring to FIGS. 5 to 12.

[9. Method of Extending Input Message Length]

Figure 16:
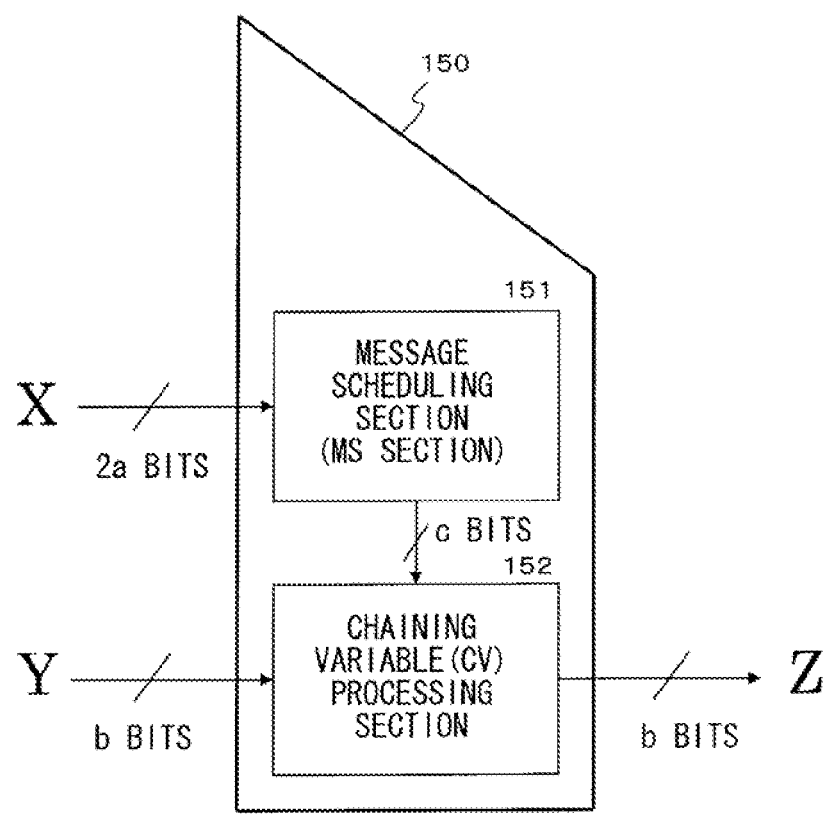
FIG. 16 is an illustration describing a construction example of a compression function extending an input message size in a compression function.

Next, a method of extending an input message length in the compression function will be studied. A compression function 150 illustrated in FIG. 16 is configured of a message scheduling section (MS section) 151 and a chaining variable (CV) processing section 152 as in the case of the compression function 120 described referring to FIG. 13. In the above-described compression function 120 illustrated in FIG. 13, a message input for the message scheduling section (MS) section 121 has a bits. On the other hand, the compression function 150 illustrated in FIG. 16 includes the message scheduling section 151 responding to a 2a-bit input.

In general, a function responding to an a-bit input and a function responding to a 2a-bit input are different from each other, and it is necessary to evaluate them based on different security evaluation criteria. Therefore, if possible, it is desirable to construct a message scheduling section responding to a 2a-bit input by combining functions responding to an a-bit input of which security properties and performance have been already evaluated. Moreover, by doing so, another existing function responding to an a-bit input is allowed to be reused. A specific construction example of the function will be described later, and a method of constructing a compression function responding to a 2a-bit input or a larger-bit input with use of the function responding to an a-bit input will be described now.

Figure 17:
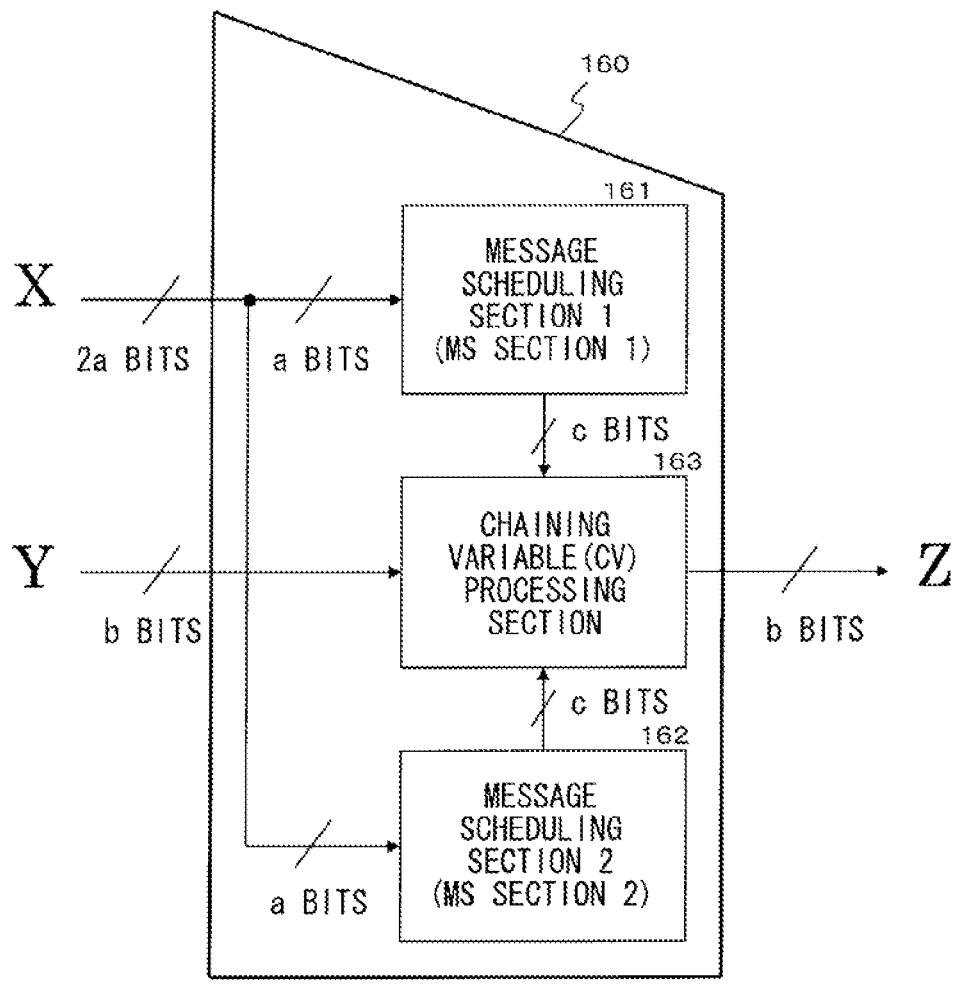
FIG. 17 is an illustration describing a construction example of a compression function having a construction in which a message scheduling section is divided into two parts.

FIG. 17 illustrates a construction example of a compression function 160 with a construction in which the message scheduling section is divided into two parts. A message input, i.e., 2a-bit data for the compression function 160 is divided into two a-bit data blocks, and then the message scheduling sections 161 and 162 perform a process of generating c-bit outputs from the a-bit data blocks, respectively. The c-bit outputs from two message scheduling sections 161 and 162 are supplied to one chaining variable (CV) processing section 163.

The chaining variable (CV) processing section 163 receives the c-bit outputs from the two message scheduling sections 161 and 162 and a b-bit input for the compression function 160, and generates a b-bit output [Z] as an output of the compression function. A merit of the construction is that the compression function achieving a 2a-bit message input with use of functions (the message scheduling sections) responding to an a-bit input which has a shorter length than 2a bits is allowed to be constructed.

Figure 18:
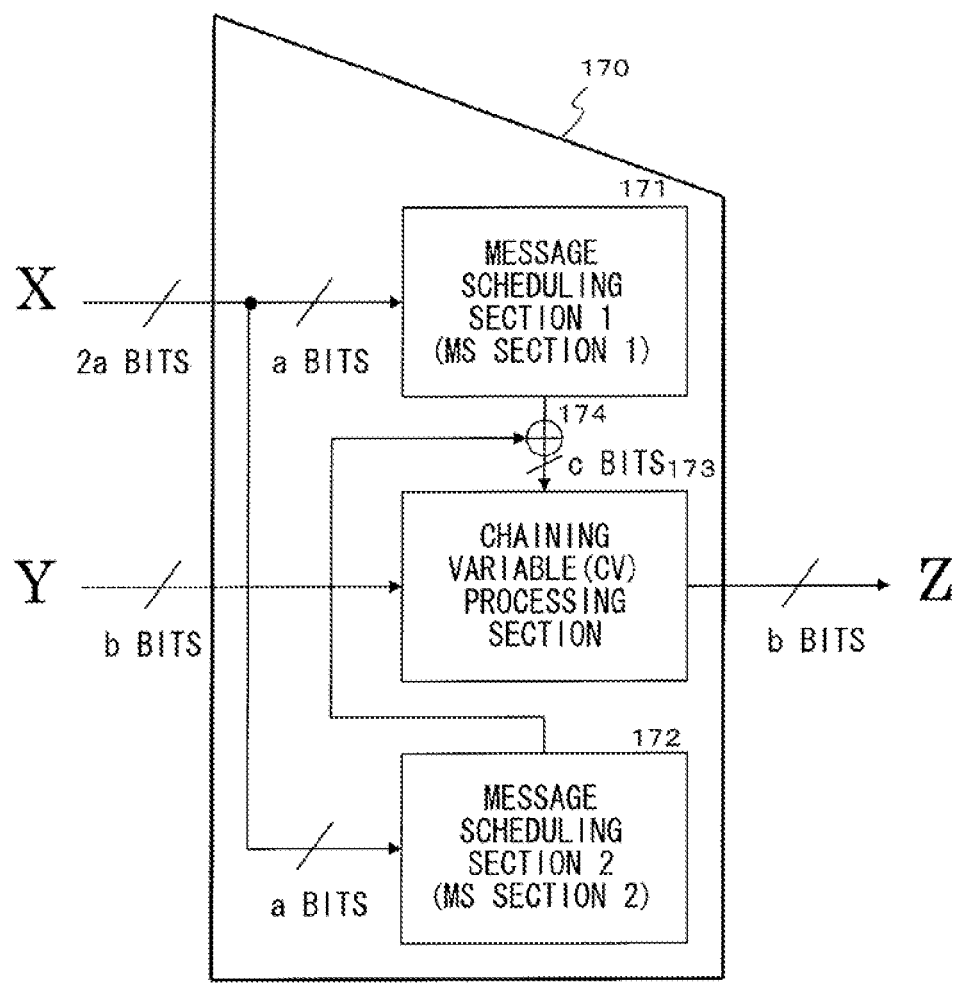
FIG. 18 is an illustration describing a construction example of a compression function having a construction in which a message scheduling section is divided into two parts and an Exclusive-OR operation (XOR) section is included.

A compression function 170 illustrated in FIG. 18 is a construction example of the compression function 170 with a construction in which the message scheduling section is divided into two parts as in the case of the compression function 160 illustrated in FIG. 17. The compression function 170 includes an exclusive-OR operation (XOR) section 174.

A message input, i.e., 2a-bit data for the compression function 170 is divided into two a-bit data blocks, and then message scheduling sections 171 and 172 perform a process of generating c-bit outputs from the a-bit data blocks, respectively. The exclusive OR operation (XOR) section 174 performs an exclusive-OR operation between the c-bit outputs from the two message scheduling sections 171 and 172, and then a c-bit output is applied to one chaining variable (CV) processing section 173.

The compression function 170 has a construction in which outputs from the two message scheduling sections are temporarily processed by the exclusive-OR operation section 174, and then the output is applied to the chaining variable (CV) processing section 173. A merit of this construction is that as the size of the message received by the chaining variable (CV) processing section 173 is not increased, an internal construction of the changing variable (CV) processing section 173 is allowed to be simplified. Note that the exclusive-OR operation may be replaced with a modulo addition process.

Figure 19:
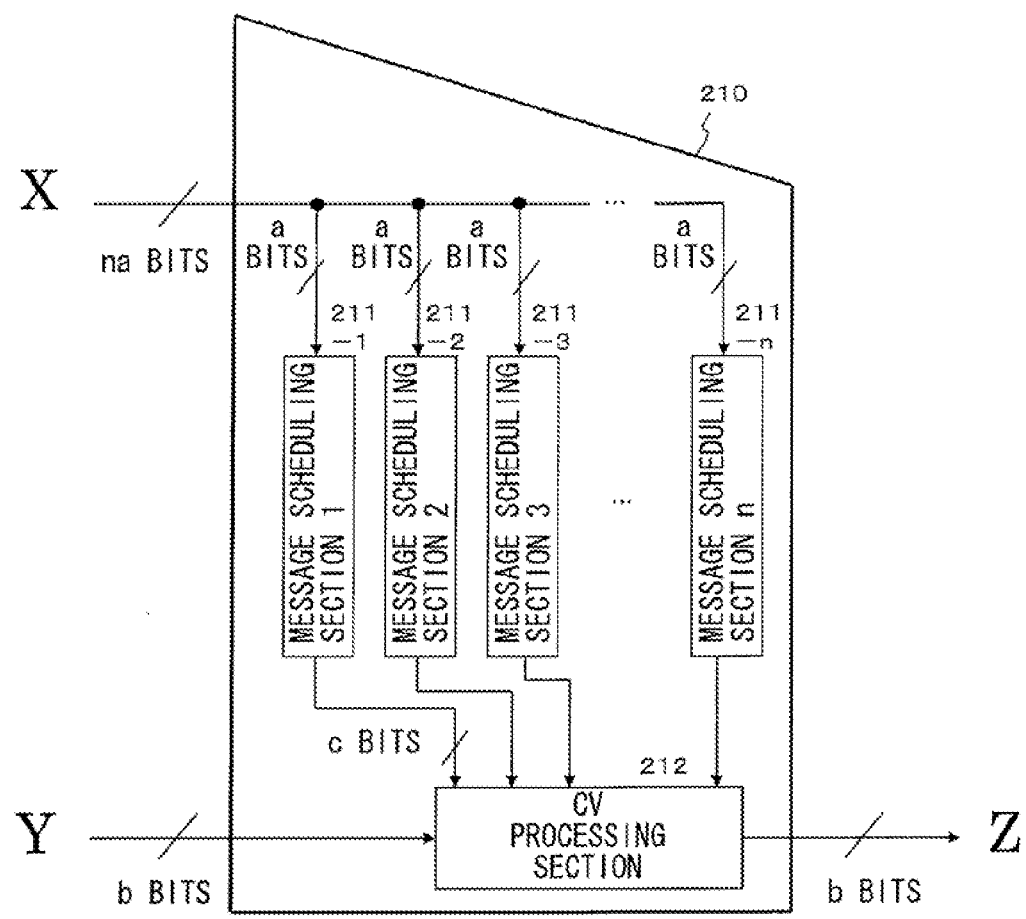
FIG. 19 is an illustration describing a construction example of a compression function set to respond to an na-bit input by generalizing the construction of the compression function illustrated in FIG. 17.

FIG. 19 illustrates a construction example of a compression function 210 set to respond to an na-bit input by generalizing the construction of the compression function 160 illustrated in FIG. 17. An na-bit message applied to the compression function 210 is divided into a number n of a-bit messages, and the a-bit messages are independently processed by message scheduling sections (MS sections) 211-1 to 211-$n$, respectively, and the message scheduling sections (MS sections) 211-1 to 211-$n$ generate c-bit outputs, respectively.

The c-bit outputs from the message scheduling sections (MS sections) 211-1 to 211-$n$ are applied to a chaining variable (CV) processing section 212. The chaining variable (CV) processing section 212 receives nc bits applied from a number n of message scheduling sections (MS sections) 211-1 to 211-$n$ and an b-bit input for the compression function 210, and generates a b-bit output [Z] as an output of the compression function.

This construction also has the same merit as that described above referring to FIG. 17. In other words, the compression function achieving an na-bit message input with use of functions (the message scheduling sections) responding to an a-bit input which has a shorter length than na bits is allowed to be constructed.

Figure 20:
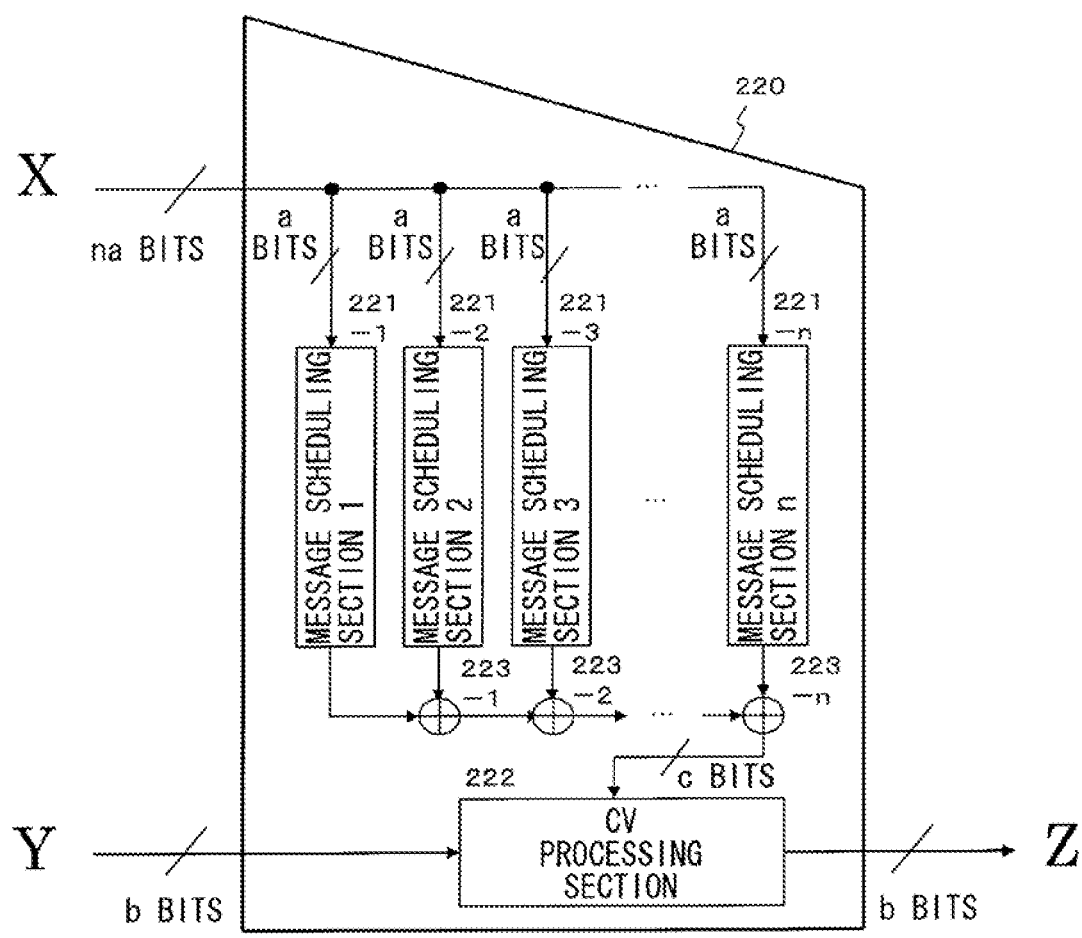
FIG. 20 is an illustration describing a construction example of a compression function set to respond to an na-bit input by generalizing the construction of the compression function illustrated in FIG. 18.

FIG. 20 illustrates a construction example of a compression function 220 set to respond to an na-bit input by generalizing the construction of the compression function 170 illustrated in FIG. 18. An na-bit message applied to the compression function 220 is divided into a number n of a-bit messages, and the a-bit messages are independently processed by message scheduling sections (MS sections) 221-1 to 221-$n$ responding to an a-bit input, respectively, and the message scheduling sections (MS sections) 221-1 to 221-$n$ generate c-bit outputs, respectively.

Exclusive-OR operation sections (XOR) 223-1 to 223-$n$ perform an exclusive-OR operation between the c-bit outputs from the message scheduling sections (MS sections) 221-1 to 221-$n$, respectively, and then a c-bit output is applied to one chaining variable (CV) processing section 222. The chaining variable (CV) processing section 222 receives an c-bit output from the exclusive-OR operation section (XOR) 223-$n$ and $b$ bits as an input for the compression function 220 to generate an b-bit output [Z] as an output of the compression function. Also in this construction, the compression function achieving an na-bit message input with use of functions (the message scheduling sections) responding to an a-bit input which has a shorter length than na bits is allowed to be constructed. Note that a construction formed by replacing the exclusive-OR operation section with a modulo addition processing section may be used.

Thus, the data converter according to the exemplary embodiment of the invention includes a plurality of processing sequences to which the divided data blocks of the message data are applied simultaneously, and is configured to execute a data conversion process with use of a plurality of compression-function execution sections (f).

Each of the plurality of compression-function execution sections (f) is configured to perform a process with use of the message scheduling section (MS section), which receives divided data blocks of the message data to perform a message scheduling process on the data blocks, and a process with use of the changing variable (CV) processing section, which receives both of an output from the message scheduling section (MS section) and an intermediate value (a chaining variable) which is an output from a preceding processing section to generate output data whose number of bits is same as that of the intermediate value through compression of received data.

The plurality of compression-function execution sections, respectively performing parallel processing in the plurality of process sequences, commonly use one or both of the message scheduling section (MS section) and the chaining variable (CV) processing section, and perform a process with use of a single message scheduling section or a single chaining variable processing section. Downsizing of a hardware configuration and simplification of processing steps are achieved by such a construction.

[10. Method of Achieving Hash Function Using Repeated Transposition in CV Processing Section and MS Section]

As described above, the compression function is achievable with use of the message scheduling section (MS section) and the chaining variable (CV) processing section as constituent elements. Specific construction examples of the message scheduling section (MS section) and the chaining variable (CV) processing section will be described below.

A message scheduling section (MS section) or a chaining variable (CV) processing section based on a transposition function is generally known. For example, SHA-1 or Whirlpool, known as a hash function, has a construction based on the transposition function.

The transposition function applied to the message scheduling section (MS section) or the chaining variable (CV) processing section is preferably a transposition function with high scrambling capability.

A construction example of a transposition function with scrambling capability enhanced by repeatedly using a relatively simple transposition function will be described below. In the following description, a relatively simple transposition repeated in the transposition function is called "internal transposition" and a transposition thereby achieved is called "total transposition".

Note that the transposition function is a function for generating an output value based on an input value so that an input size and an output size are the same as each other and one input value corresponds to one output value. In addition, the transposition function has an inverse function because of its properties.

In the total transposition, data may be added to intermediate data between two internal transposition processes from outside or the intermediate data may be applied to outside of the function. In the compression function, with use of the intermediate data, input of data or output of additional data may be applied to a part except for an original input part and an original output part of the total transposition. Data applied to the part except for the original input part is called additional input and the intermediate data applied to a part except for the original output is called intermediate output.

Figure 21:
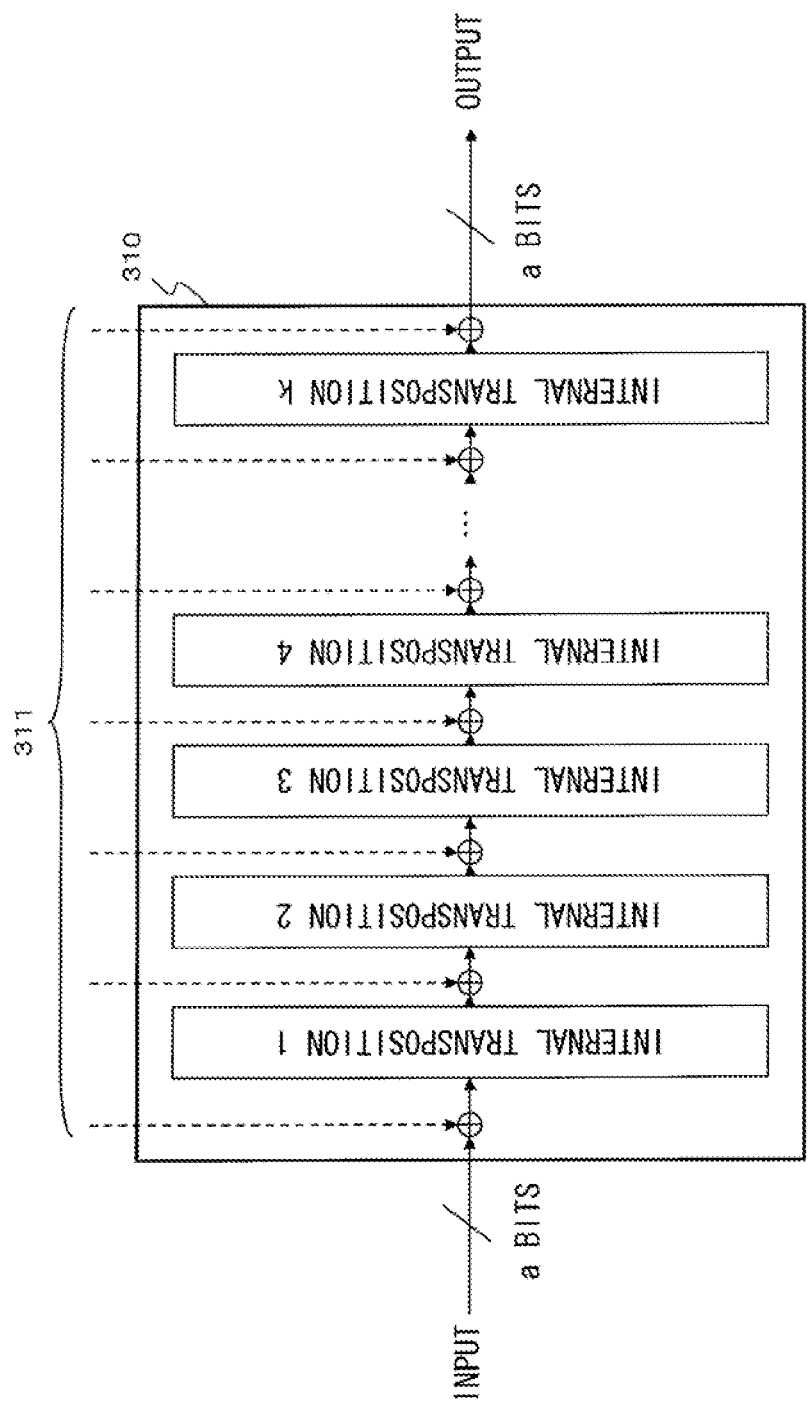
FIG. 21 is an illustration describing an example of a transposition function with an additional input.

A transposition function (transposition section) 310 illustrated in FIG. 21 is an example of a transposition function with an additional input 311. Moreover, a transposition function (transposition section) 320 illustrated in FIG. 22 is an example of a transposition function with an intermediate output 321.

Figure 22:
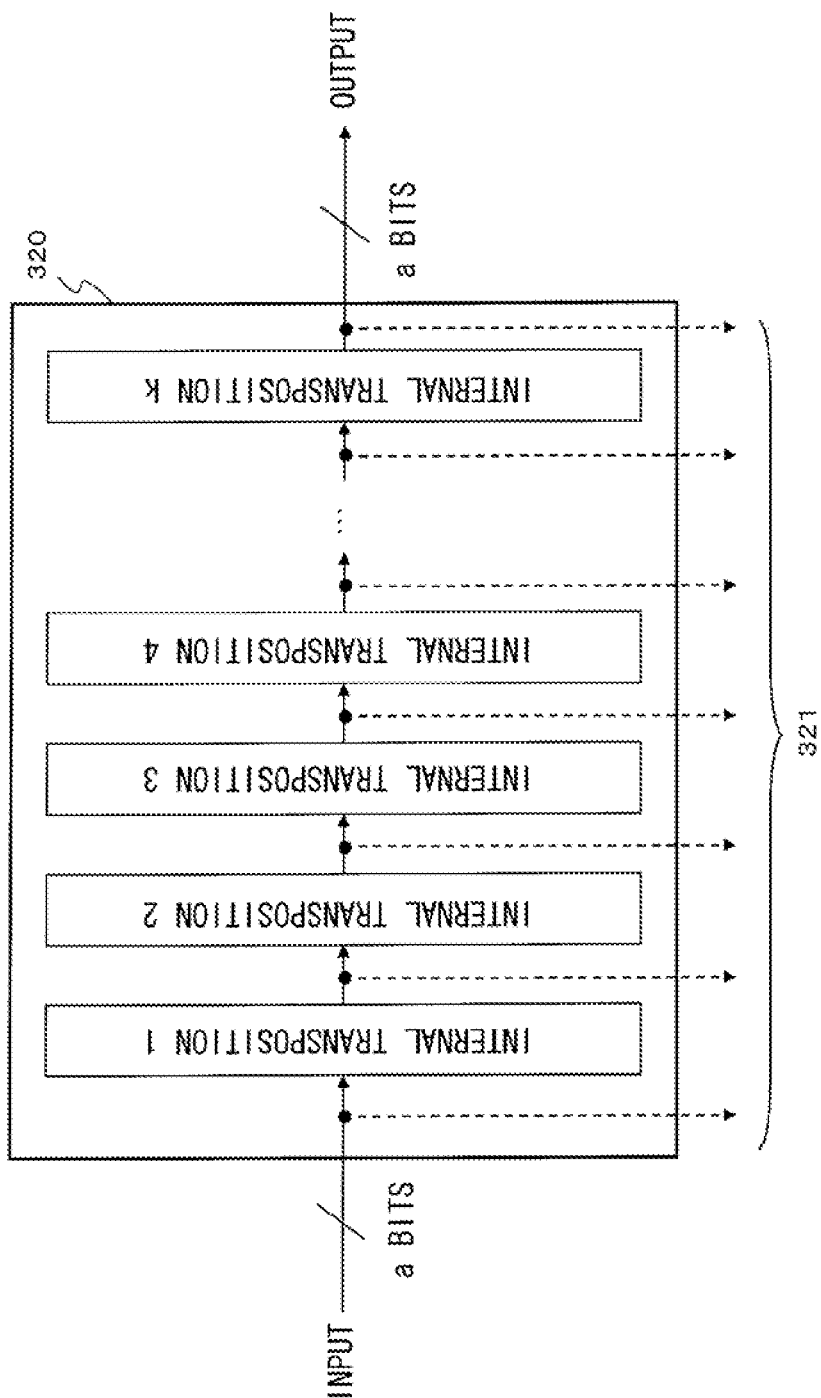
FIG. 22 is an illustration describing an example of a transposition function with an intermediate output.

The transposition functions illustrated in FIGS. 21 and 22 are based on a total transposition responding to an a-bit input/output. In the transposition functions, internal transpositions 1 to k are sequentially applied. The transposition function 310 illustrated in FIG. 21 has a construction in which the additional input 311 is exclusive-ORed with intermediate data which is an output value of an internal transposition to be applied to a following internal transposition section or outside. In the transposition function 320 illustrated in FIG. 22, intermediate data which is an output value of an internal transposition is applied to outside as an intermediate output 321. Hereinafter, to discriminate a total transposition of this type from a general total transposition, the transposition function of a type illustrated in FIG. 21 is called transposition function with an additional input, and the transposition function of a type illustrated in FIG. 22 is called transposition function with an intermediate output.

Note that the transposition function with an additional input inherits the following intrinsic property of a transposition.

When an additional input is fixed, one input corresponds to one output.

Moreover, the transposition function with an intermediate output has the following property derived from a transposition function.

One input corresponds to one intermediate output.

The compression function forming a hash function is configured of the message scheduling section (MS section) and the chaining variable (CV) processing section as described above referring to FIGS. 13 to 20. It has been already known that the transposition function with an additional input is used for the chaining variable (CV) processing section, and the transposition function with an intermediate output is used for the message scheduling section (MS section), and they are connected to each other to construct the compression function (Whirlpool).

Figure 23:
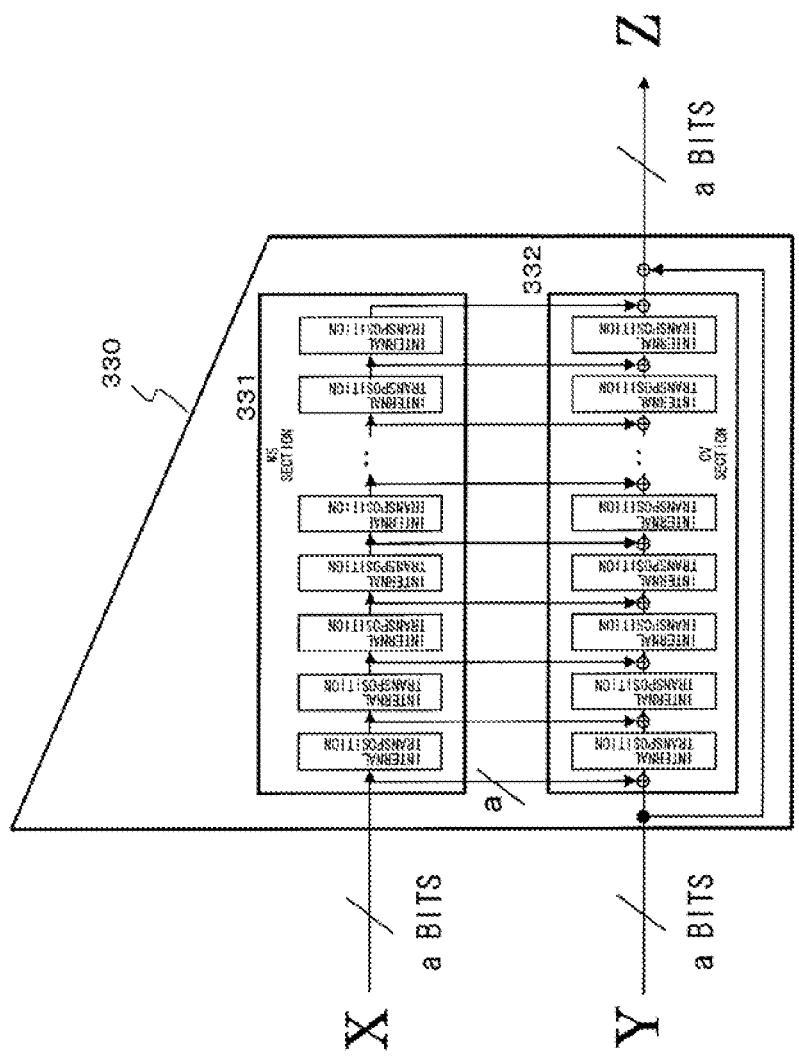
FIG. 23 is an illustration describing a construction example of a compression function using an existing transposition function.

FIG. 23 illustrates a construction example of a compression function 330 using the existing transposition function. The compression function 330 illustrated in FIG. 23 has a construction in which a message scheduling section (MS section) 331 is provided as an a-bit transposition function with an intermediate output, and the intermediate output is connected to an additional input of an a-bit transposition function with an additional input used for a chaining variable (CV) processing section 332.

In the construction illustrated in FIG. 23, to simplify the description, the a-bit transposition functions are used in both of the message scheduling section (MS section) 331 and the chaining variable (CV) processing section 332; however, the transposition sizes of the message scheduling section (MS section) 331 and the chaining variable (CV) processing section 332 are not necessarily equal to each other. In the case where the lengths of the message scheduling section (MS section) 331 and the chaining variable (CV) processing section 332 are different from each other, the lengths may be adjusted by appropriately performing extension and compression operations. Moreover, unlike the case illustrated in FIG. 23, all intermediate outputs are not necessarily connected between the message scheduling section (MS section) 331 and the chaining variable (CV) processing section 332, and a process such as appropriately reducing the intermediate outputs may be executed in consideration of security properties or processing efficiency to select intermediate data connected between the message scheduling section (MS section) 331 and the chaining variable (CV) processing section 332.

[11. Method of Extending Size of MS Section]

Figure 24:
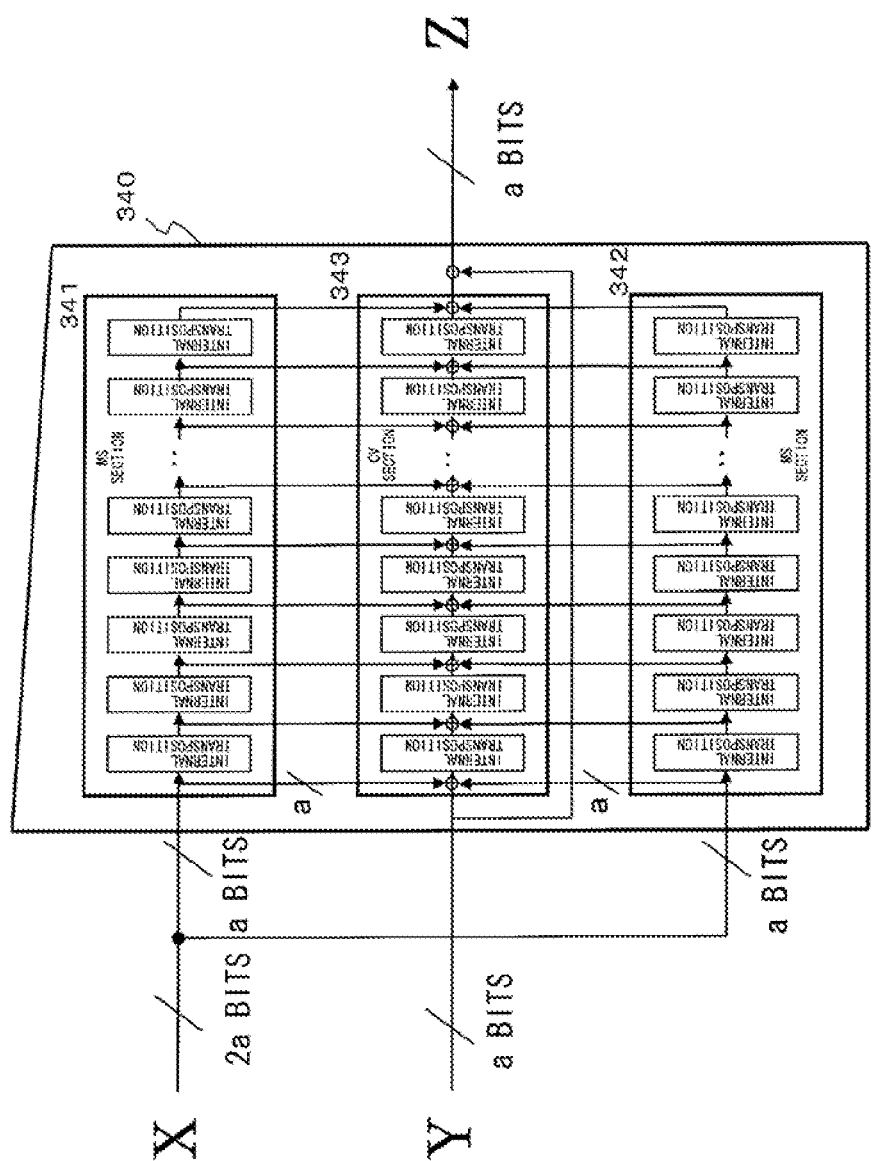
FIG. 24 is an illustration describing a construction example of a compression function in which the size of data applied to the compression function is extended.

FIG. 24 illustrates a construction example of a compression function in which a data size to be applied to the compression function is extended. A compression function 340 illustrated in FIG. 24 is a compression function in which an input bit length is extended to 3a bits. The compression function 340 illustrated in FIG. 24 has the same construction as that described above referring to FIG. 18, and includes two message scheduling section (MS sections) 341 and 342 and one chaining variable (CV) processing section 343 receiving results of exclusive-OR operations of outputs from the two message scheduling sections (MS sections) 341 and 342.

Two message scheduling sections (MS sections) 341 and 342 each are configured of a transposition function with an intermediate output. One chaining variable (CV) processing section 343 is configured of a transposition function with an additional input.

The transposition function 340 illustrated in FIG. 24 has a construction in which a 2a-bit input X is divided into a-bit blocks and the a-bit blocks are applied to two message scheduling sections (MS sections) 341 and 342, respectively, and intermediate outputs from the two message scheduling sections (MS sections) 341 and 342 are applied to one chaining variable (CV) processing section 343. When the transposition function with an additional input and the transposition function with an intermediate output are used in such a manner, an input length is allowed to be increased easily.

Moreover, in the construction of the transposition function 340 illustrated in FIG. 24, two transposition functions used as the message scheduling sections (MS sections) are not allowed to be the same as each other, because in the case where the transposition functions are the same as each other, when the same a-bit data block is applied to both of the transposition functions, corresponding intermediate outputs are the same as each other and a result of an exclusive-OR operation (XOR) is cancelled. Therefore, it is necessary to prepare different transposition functions for the message scheduling sections (MS sections). This is achievable by using different constructions of internal transpositions.

The length of the input X is allowed to be extended to 3a bits or over by generalizing the construction of the compression function illustrated in FIG. 24. For example, this is achievable by adding the message scheduling section (MS section).

In the construction illustrated in FIG. 24, a method of reducing a throughput to achieve speedup. In a compression function with a multistage construction configuring a hash function, for example, as described referring to FIGS. 4, 5 and the like, values to be applied to the compression function are a message as data [X] and an intermediate value as data Y, that is, a chaining variable (CV).

At this time, the number of repetitions of a transposition for message processing is not necessarily equal to the number of repetitions of a transposition for a chaining variable (CV) sequence. For example, the case where the number of repetitions of the transposition for message processing is reduced by half within a range not impairing security properties will be considered below.

Figure 25:
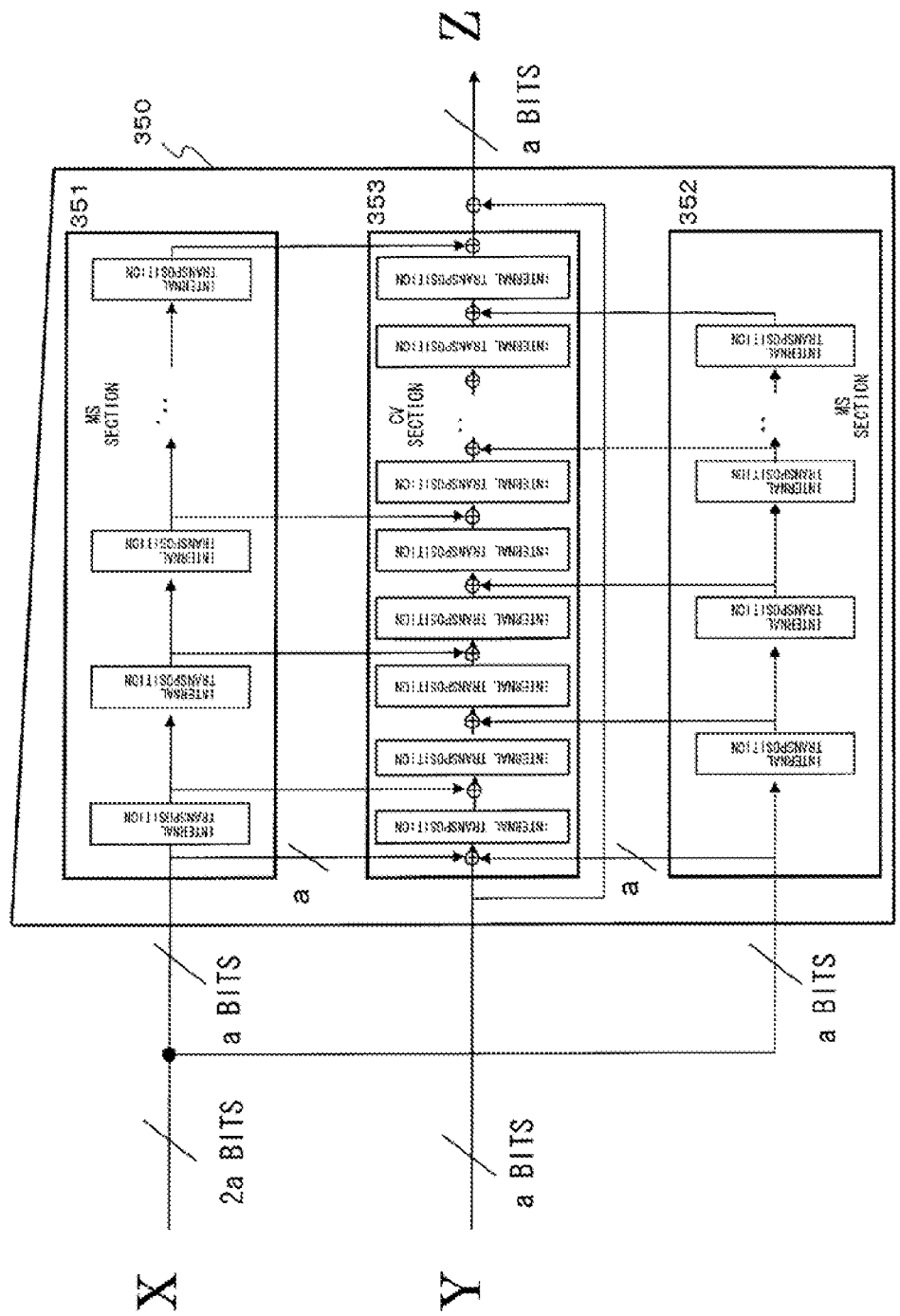
FIG. 25 is an illustration describing a construction example of a compression function in which an input bit length is extended to 3a bits.

FIG. 25 illustrates a compression function 350 in which the input bit length is extended to 3a bits as in the case illustrated in FIG. 24. A 2a-bit input X for the compression function 350 is divided into a-bit blocks, and the a-bit blocks are applied to two message scheduling sections (MS sections) 351 and 352, respectively, and intermediate outputs of the two message scheduling sections (MS sections) 351 and 352 are applied to one chaining variable (CV) processing section 353.

The number of repetitions of the internal transposition in each of the two message scheduling sections (MS sections) 351 and 352 illustrated in FIG. 25 is set to be equal to half the number of repetitions of the internal transposition in the chaining variable (CV) processing section 353.

In the message scheduling section (MS section) 351, even-numbered transpositions are removed, and in the message scheduling section (MS section) 352, odd-numbered transpositions are removed; therefore, the number of repetitions of the internal transposition in each of the two message scheduling sections (MS sections) 351 and 352 are reduced by half. Operations necessary for message processing are allowed to be reduced by half by this construction.

In the compression function 350 illustrated in FIG. 25, compared to the construction of the compression function 340 illustrated in FIG. 24, processes are reduced; therefore, an improvement in software processing is expected. When functions are alternately removed in the message scheduling sections (MS sections) 351 and 352, as a merit, the number of transpositions allowed to be performed simultaneously at the time of hardware implementation is allowed to be set to two to achieve processing with a small circuit scale, that is, downsizing of hardware is achievable.

Figure 26:
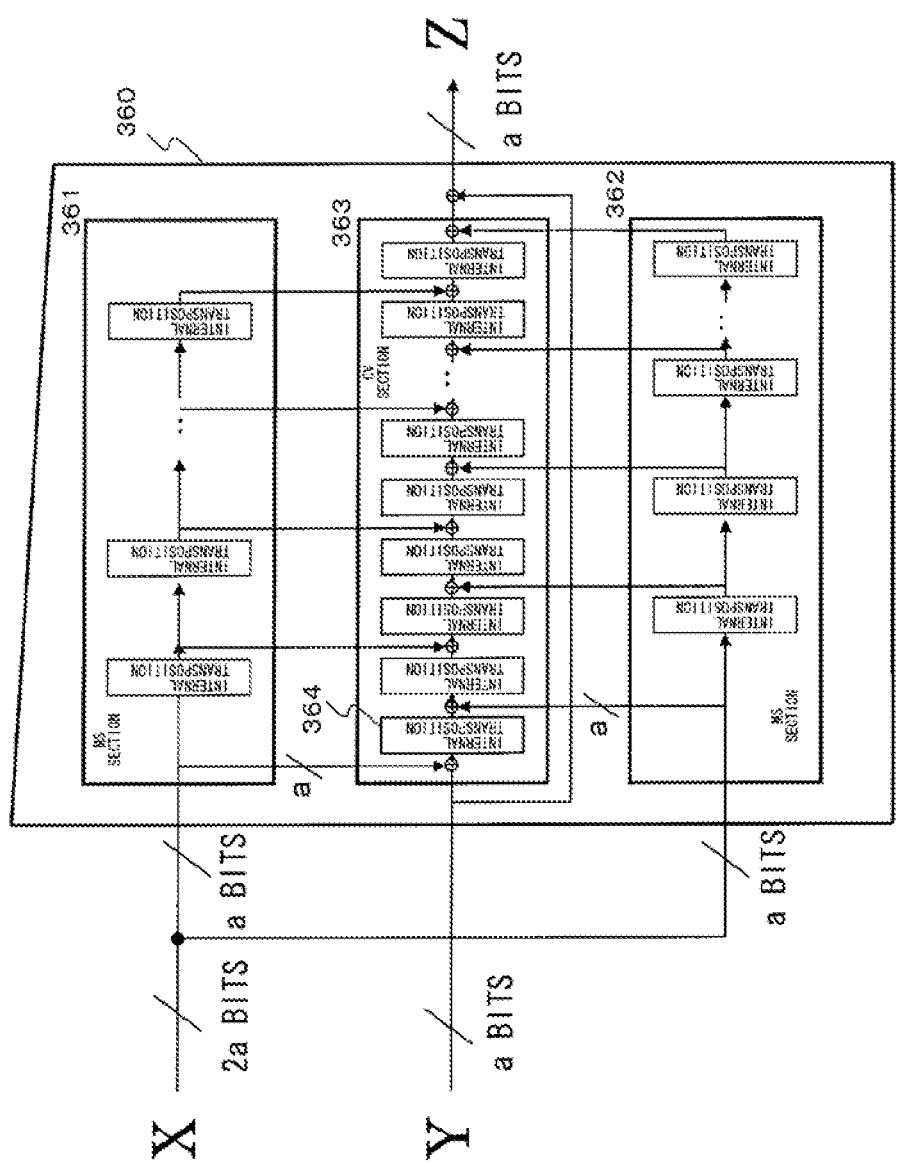
FIG. 26 is an illustration describing a construction example of a compression function in which an input bit length is extended to 3a bits.

Moreover, as in the case illustrated in FIG. 25, a compression function 360 illustrated in FIG. 26 is a compression function 360 in which the input bit length is extended to 3a bits. A 2a-bit input X for the compression function 360 is divided into a-bit blocks, and the a-bit blocks are applied to two message scheduling sections (MS sections) 361 and 362, respectively, and intermediate outputs of the two message scheduling sections (MS sections) 361 and 362 are applied to one chaining variable (CV) processing section 363.

The chaining variable (CV) processing section 363 in the compression function 360 illustrated in FIG. 26 has a construction in which one internal transposition section 364 is added in front of the chaining variable (CV) processing section 353 in the compression function 350 illustrated in FIG. 25, and the number of repetitions of the internal transposition is increased by 1.

In the compression function 360 illustrated in FIG. 26, one internal transposition is added in front of a total transposition for the chaining variable (CV) processing section 363. According to this change, the compression function 360 has a construction in which an input value of the upper message scheduling section (MS section) 361 is exclusive-ORed with an input value of the chaining variable (CV) processing section 363.

As a characteristic of this construction, when attention is given to one of the message scheduling sections (MS sections), intermediate data applied to the chaining variable (CV) processing section 363 is applied every two transposition functions of the chaining variable (CV) processing section 363 without exception. By this construction, influences of the message scheduling sections (MS sections) 361 and 362 arranged one above the other are equally exerted on a sequence of the chaining variable (CV) processing section 363 so as to achieve balanced scrambling. As a result, there is a merit that security evaluation is easier.

[12. Method of Extending Size of CV Processing Section]

Figure 27:
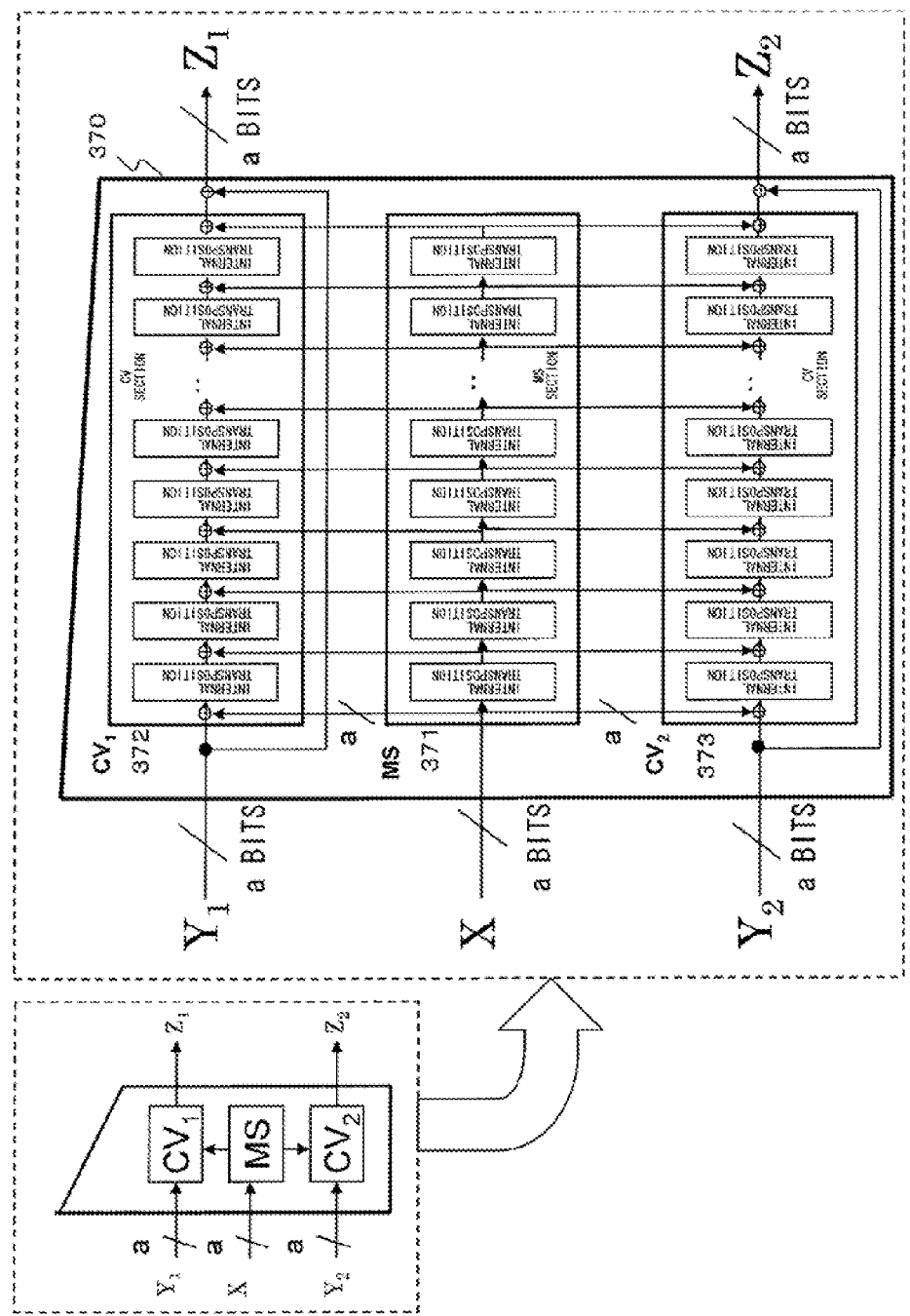
FIG. 27 is an illustration describing a construction example in which two compression functions in a sequence commonly use a message scheduling section.

A compression function 370 illustrated in FIG. 27 shows a construction in which two compression functions forming a sequence described above referring to FIG. 15 commonly use the message scheduling section. When the domain extension method presented in FIG. 15 is applied to the case of b=a, the size of the chaining variable (CV) processing section is extended.

In the compression function 370 illustrated in FIG. 27, an input of a bits which are constituent bits of a message [X] are applied to a message scheduling section (MS section) 371, and inputs of a bits as two chaining variables (CV) which are intermediate values are applied to chaining variable (CV) processing sections 372 and 373, respectively.

The message scheduling section (MS section) 371 is configured of a transposition function with an intermediate output. Two chaining variable (CV) processing sections 372 and 373 each are configured of a transposition function with an additional input. The intermediate output of the message scheduling section (MS section) 371 is set as the additional inputs of two chaining variable (CV) processing sections 372 and 373. The intermediate output of the message scheduling section (MS section) 371 is excluve-ORed with an input or the intermediate value in each of the two chaining variable (CV) processing sections 372 and 373 to be applied to an internal transposition section. Alternatively, the intermediate input is used to generate an output value.

[13. Method of Extending Sizes of CV Processing Section and MS Section]

Figure 28:
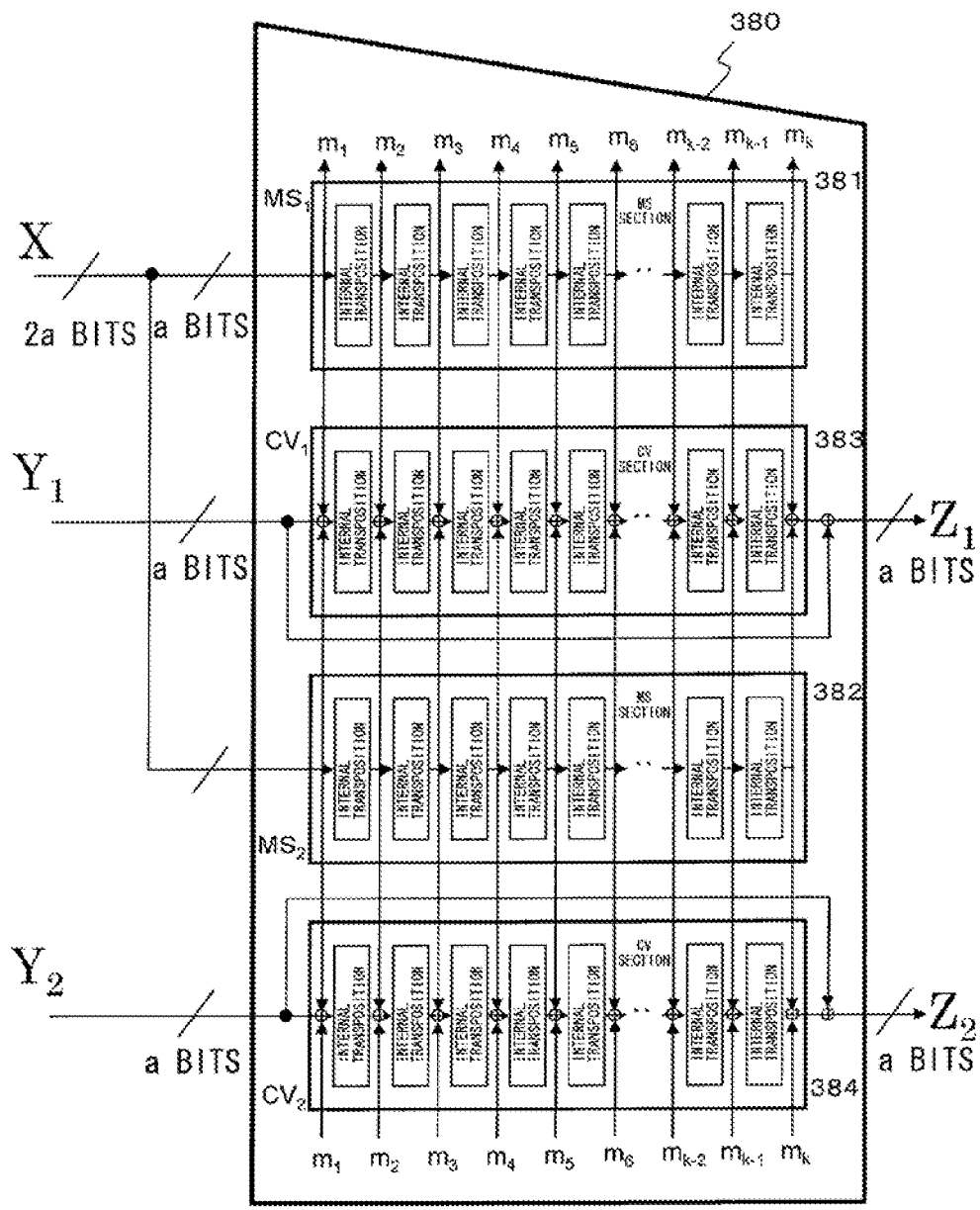
FIG. 28 is an illustration describing a construction example of a compression function in which the size of data applied to the compression function is extended.

A compression function 380 illustrated in FIG. 28 is a modification example of the compression function 370 illustrated in FIG. 27, and is a construction example of a compression function in which a data size to be applied to a compression function is extended by the same technique as that of the compression function 340 described above referring to FIG. 24. The compression function 380 illustrated in FIG. 28 is a compression function in which the input bit length is extended to 3a bits. The compression function 380 illustrated in FIG. 28 includes two message scheduling sections (MS sections) 381 and 382 and two chaining variable (CV) processing sections 383 and 384 receiving results of exclusive-OR (XOR) operations of outputs of the two message scheduling sections (MS sections) 381 and 382.

The two message scheduling sections (MS sections) 381 and 382 each are configured of a transposition function with an intermediate output. Two chaining variable (CV) processing sections 383 and 384 each are configured of a transposition function with an additional input. The intermediate output of the message scheduling section (MS section) 381 is provided as the additional input of the chaining variable (CV) processing section 383. The intermediate output of the message scheduling section (MS section) 382 is provided as the additional input of the chaining variable (CV) processing section 384. The two chaining variable (CV) processing sections 383 and 384 uses the additional input to be exclusive-ORed with an input or an intermediate value and then be applied to an internal transposition section, or to generate an output value.

[14. Method of Constructing Scrambling Function F for Domain Extension Method]

Figure 29:
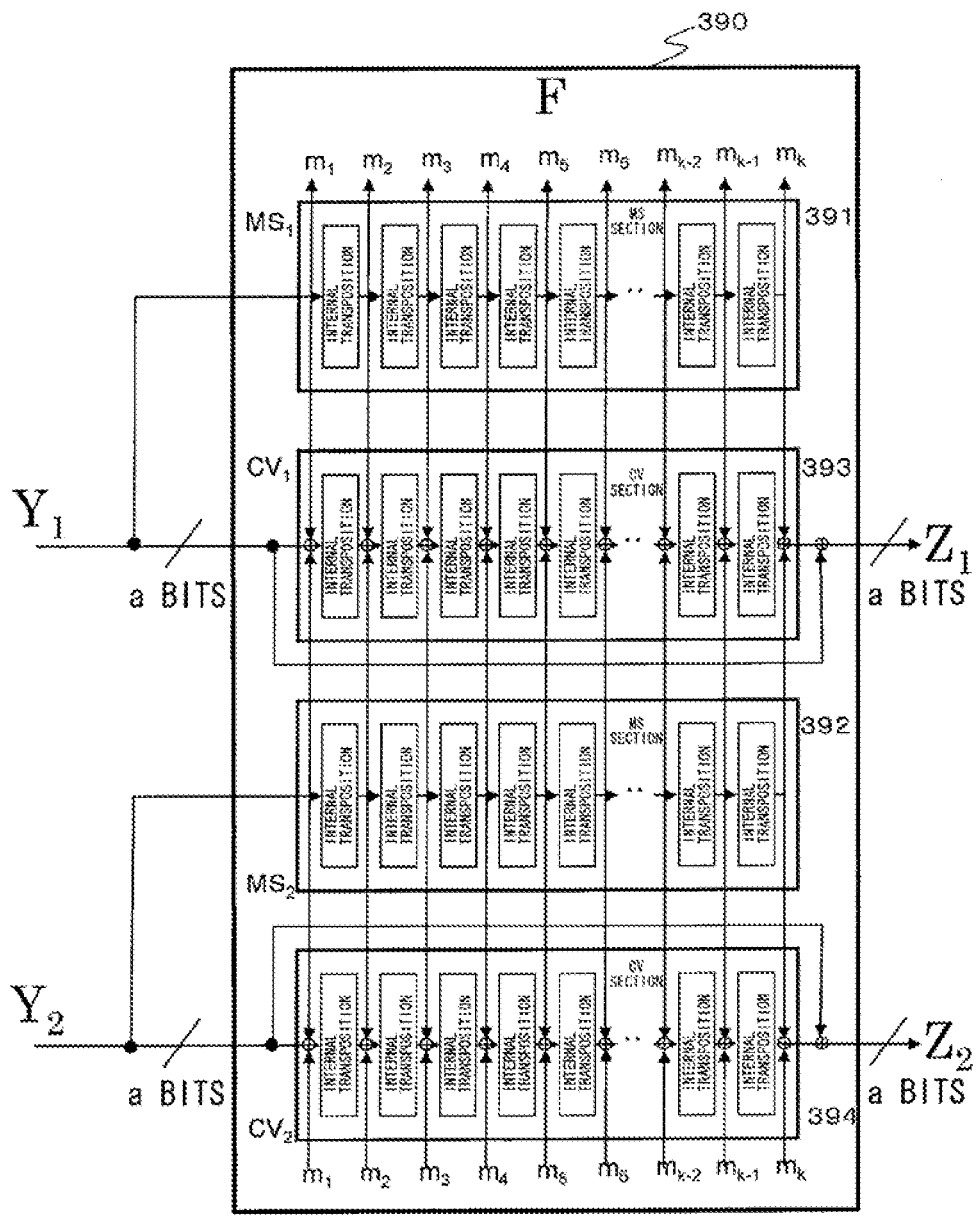
FIG. 29 is an illustration describing a construction example of a scrambling function F configured of a combination of two transposition functions with an intermediate output and two transposition functions with an additional input.

The scrambling function F may be configured of a combination of a transposition function with an intermediate output and a transposition function with an additional input. FIG. 29 is a construction example of a scrambling function F390 configured of a combination of two transposition functions with an intermediate output and two transposition function with an additional input.

The scrambling function F390 includes two message scheduling sections (MS sections) 391 and 392 and one chaining variable (CV) processing section 393 and 394 receiving results of exclusive-OR operations (XOR) of outputs from the two message scheduling sections (MS sections) 391 and 392.

The two message scheduling sections (MS sections) 391 and 392 each are configured of a transposition function with an intermediate output. The two chaining variable (CV) processing sections 393 and 394 each are configured of a transposition function with an additional input.

The intermediate output of the message scheduling section (MS section) 391 is provided as an additional input of the chaining variable (CV) processing section 393. The intermediate output of the message scheduling section (MS section) 392 is provided as an additional input of the chaining variable (CV) processing section 394. Two chaining variable (CV) processing sections 393 and 394 uses the additional input to be exclusive-ORed with an input or an intermediate value and then be applied to an internal transposition section, or to generate an output value.

The scrambling function F390 receives 2a bits as an input [Y] and generates a 2a-bit output [Z]. Note that a transposition in the data converter of the invention may have a construction in which some parts are removed as in the case of the above-described constructions in FIGS. 25 and 26.

[15. Method of Achieving Transposition Process with High Diffusion Capability]

A transposition function applied to the message scheduling section (MS section) or the chaining variable (CV) processing section is achievable by repeatedly applying an internal transposition as a relatively simple transposition function as described above. When such a relatively simple transposition function is repeatedly applied, a transposition function with enhanced scrambling capability is allowed to be constructed.

Figure 30:
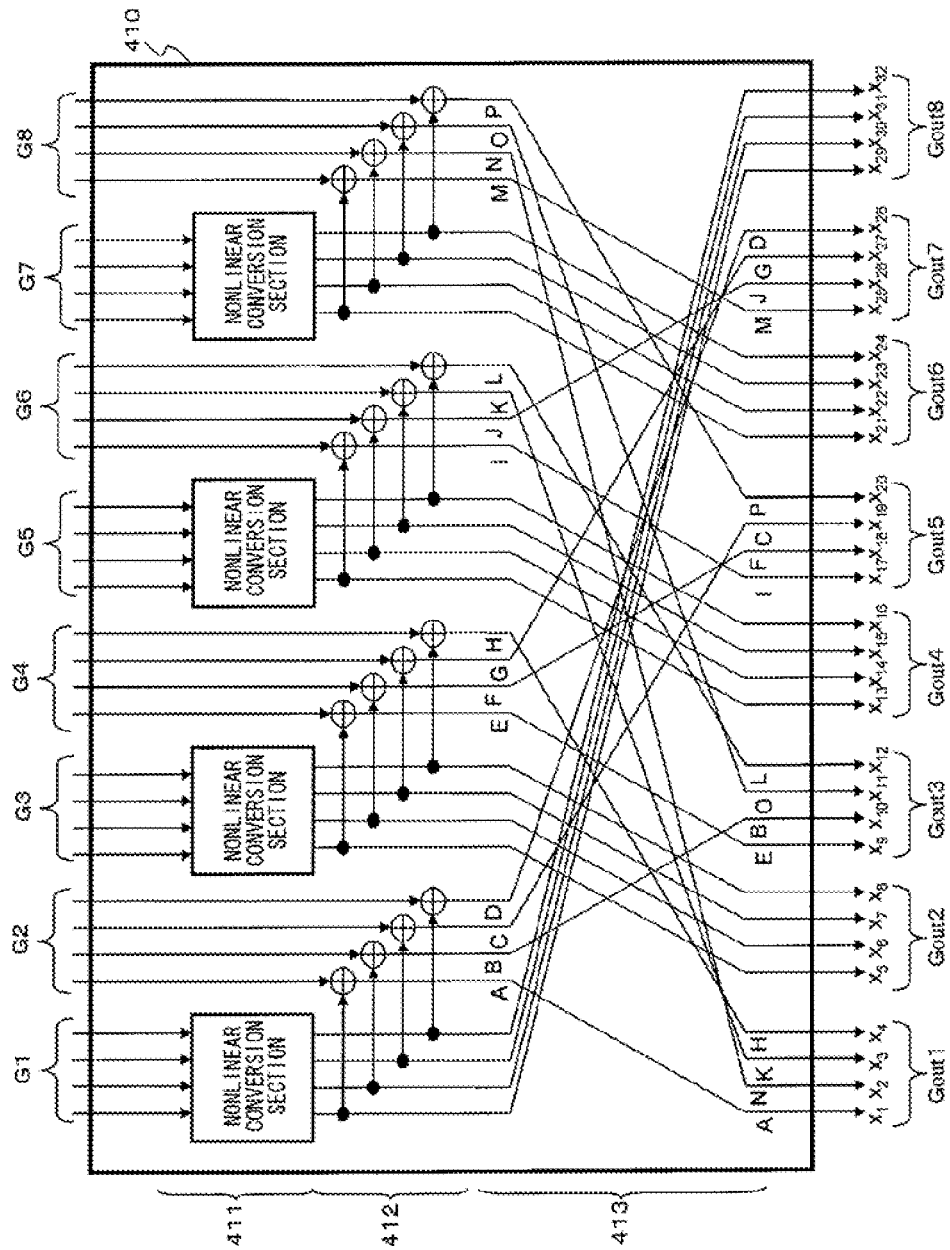
FIG. 30 is an illustration describing a specific construction example of a transposition function allowed to be used as an internal transposition.

A specific construction example of a transposition function applicable as an internal transposition will be described below referring to FIG. 30. FIG. 30 is a construction example of a transposition function as an internal transposition used in a transposition function executing a total transposition for constructing a repeat type transposition function with high scrambling capability. The total transposition is configured by repeatedly and sequentially applying the internal transposition. An internal transposition section (transposition function) 410 in FIG. 30 has a construction in which a 256-bit input/output transposition is performed.

256-bit data applied to the internal transposition section (transposition function) 410 are represented by 32-byte data. Each byte corresponds to one input data line illustrated in the drawing.

First, data is divided into 4-byte (32-bit) data blocks, that is, eight groups (G1 to G8) from the left. A nonlinear conversion process is performed on data of 4 bytes included in odd-numbered groups (G1, G3, G5 and G7) from the left in respective corresponding nonlinear conversion sections 411.

When 4-byte (32-bit) data in each of the four groups (G1, G3, G5 and G7) is generated from the nonlinear conversion section 411, an exclusive-OR (XOR) operation section 412 executes an exclusive-OR operation of the 4-byte (32-bit) data with 4-byte data in a group on the right side thereof to update the 4-byte (32-bit) data in each of four even-numbered groups (G2, G4, G6 and G8).

In other words, 4-byte (32-bit) data in each of four even-numbered groups (G2, G4, G6 and G8) is updated by the following processes:

an exclusive-OR operation between data of a result of nonlinear conversion on 4-byte data in the group (G1) and input data in the group (G2) is executed, an exclusive-OR operation between data of a result of nonlinear conversion on 4-byte data in the group (G3) and input data in the group (G4) is executed, an exclusive-OR operation between data of a result of nonlinear conversion on 4-byte data in the group (G5) and input data in the group (G6) is executed, and an exclusive-OR operation between data of a result of nonlinear conversion on 4-byte data in the group (G7) and input data in the group (G8) is executed.

Next, in an interchanging section 413, an interchanging process on each 1-byte data is performed. Four groups (G1, G3, G5 and G7) including data generated from the nonlinear conversion sections 411 are moved so that a leftmost group is moved to the position of a rightmost group and other groups are moved to positions of groups on the immediate left thereof, respectively.

In other words, an interchanging process is executed in the following manner to generate data:

the group (G1) is applied to the position of an output group (Gout8), the group (G3) is applied to the position of an output group (Gout2), the group (G5) is applied to the position of an output group (Gout4), and the group (G7) is applied to the position of an output group (Gout6).

On the other hand, in the exclusive OR (XOR) operation section 412 performs an interchanging process of dividing 4-byte (32-bit) data in each of four even-numbered groups (G2, G4, G6 and G8) updated by execution of the exclusive-OR operation into 1-byte data blocks and moving the 1-byte data blocks to different groups, respectively.

The following interchanging process is performed on 4-byte data in the group (G2). The 4-byte data of Group (G2) is divided into 1-byte data blocks represented by A, B, C and D from a first 1-byte data block.

An interchanging process is executed in the following manner to generate data:

the first 1-byte data block A in the group (G2) is generated as a first 1-byte data block in the output group (Gout 1), a second 1-byte data block B in the group (G2) is generated as a second 1-byte data block in the output group (Gout3), a third 1-byte data block C in the group (G2) is generated as a third 1-byte data block in the output group (Gout5), and a fourth 1-byte data block D in the group (G2) is generated as a fourth 1-byte data block in the output group (Gout7).

The following interchanging process is performed on 4-byte data in the group (G4).

The 4-byte data of Group (G4) is divided into 1-byte data blocks represented by E, F, G and H from a first 1-byte data block.

An interchanging process is executed in the following manner to generate data:

the first 1-byte data block E in the group (G4) is generated as a first 1-byte data block in the output group (Gout3), a second 1-byte data block F in the group (G4) is generated as a second 1-byte data block in the output group (Gout5), a third 1-byte data block G in the group (G4) is generated as a third 1-byte data block in the output group (Gout7), and a fourth 1-byte data block H in the group (G4) is generated as a fourth 1-byte data block in the output group (Gout 1).

The following interchanging process is performed on 4-byte data of the group (G6).

The 4-byte data of Group (G6) is divided into 1-byte data blocks represented by I, J, K and L from a first 1-byte data block.

An interchanging process is executed in the following manner to generate data:

the first 1-byte data block I in the group (G6) is generated as a first 1-byte data block in the output group (Gout5), a second 1-byte data block J in the group (G6) is generated as a second 1-byte data block in the output group (Gout7), a third 1-byte data block K in the group (G6) is generated as a third 1-byte data block in the output group (Gout1), and a fourth 1-byte data block L in the group (G6) is generated as a fourth 1-byte data block in the output group (Gout3).

The following interchanging process is performed on 4-byte data of the group (G8).

The 4-byte data of Group (G8) is divided into 1-byte data blocks represented by M, N, O and P from a first 1-byte data block.

An interchanging process is executed in the following manner to generate data:

the first 1-byte data block M in the group (G8) is generated as a first 1-byte data block in the output group (Gout7), a second 1-byte data block N in the group (G8) is generated as a second 1-byte data block in the output group (Gout1), a third 1-byte data block O in the group (G8) is generated as a third 1-byte data block in the output group (Gout3), and a fourth 1-byte data block P in the group (G8) is generated as a fourth 1-byte data block in the output group (Gout5).

Note that in an internal transposition section (transposition function) in a following round, output groups (Gout1, Gout3, Gout5 and Gout7) are applied to nonlinear conversion.

Thus, when the interchanging process of interchanging inputs and outputs is executed, it is assured that conversion processes of different kinds on each byte data are executed in each round.

As illustrated in an output section of the internal transposition section (transposition function) 410 in FIG. 30, 32 byte outputs are represented by x1 to x32, respectively. For example, an intermediate output in a transposition function with an intermediate output illustrated in FIG. 22 corresponds to these outputs. In other words, the message scheduling section (MS section) in each of the constructions of the compression function and the scrambling function F described referring to FIGS. 23 to 27 is configured of a transposition function with an intermediate output, and these outputs correspond to the intermediate output generated from the message scheduling section (MS section).

The intermediate output is applied as an additional input in a transposition function with an additional input illustrated in FIG. 21. For example, the chaining variable (CV) processing section in each of the constructions of the compression function and the scrambling function F described referring to FIGS. 23 to 27 is configured of a transposition function with an additional input, and 32 byte outputs x1 to x32 from the output section of the internal transposition section (transposition function) 410 illustrated in FIG. 30 are applied as the additional input of the chaining variable (CV) processing section.

Note that a large number of the constructions of the internal transposition sections (transposition functions) 410 illustrated in FIG. 30 are provided to the inside of the compression function or the scrambling function F as described referring to FIGS. 23 to 27. All output values x1 to x32 of intermediate data generated by the internal transposition section (transposition function) may be used or only some of the output values x1 to x32 may be used.

For example, in the construction of the internal transposition section (transposition function) 410 illustrated in FIG. 30, only output values x5 to x8, x13 to 16, x21 to x24 and x29 to x32 from the nonlinear conversion section 411 may be used as intermediate outputs. Alternatively, only output values x to x4, x9 to x12, x17 to x20 and x25 to x28 to be applied to nonlinear conversion sections in a following transposition function may be used as intermediate values.

Next, an example of an internal construction of the nonlinear conversion section 411 in the internal transposition section (transposition function) 410 described referring to FIG. 30 will be described below referring to FIG. 31. The nonlinear conversion section 411 is allowed to be constructed as a transposition function receiving 4-byte data and generating 4-byte data.

Figure 31:
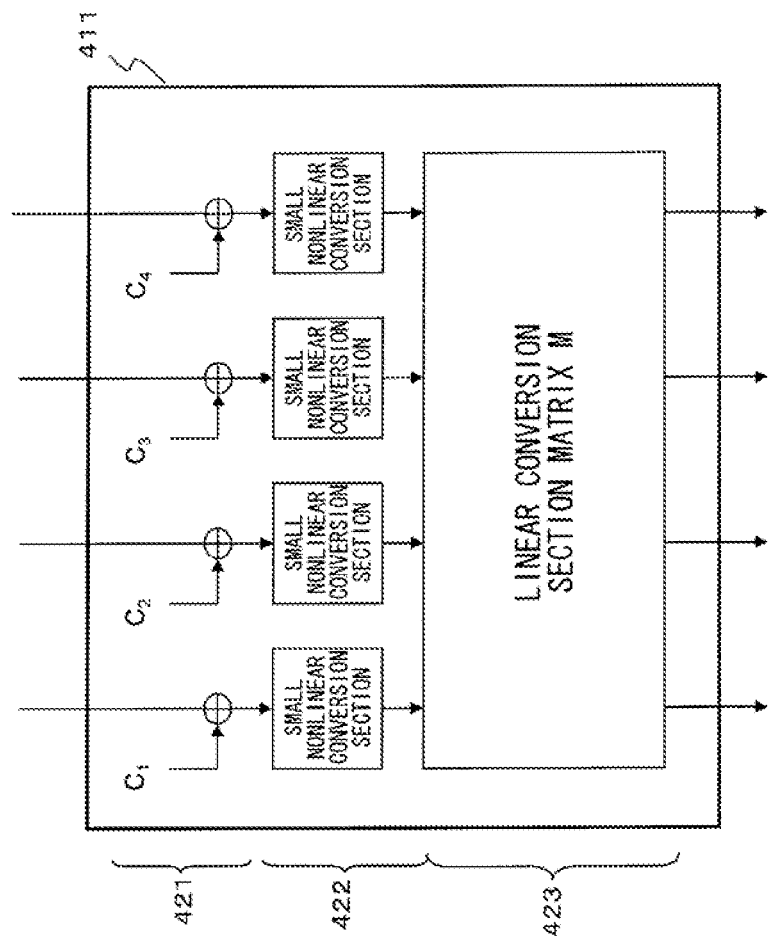
FIG. 31 is an illustration describing an example of an internal construction of a nonlinear conversion section configured in an internal transposition section (a transposition function).

The nonlinear conversion section 411 illustrated in FIG. 31 receives 4-byte data. One line illustrated in FIG. 31 corresponds to a 1-byte data block. In an exclusive-OR (XOR) operation section 421, the received data are exclusive-ORed with four constant values (constants) C1, C2, C3 and C4 predetermined in the nonlinear conversion sections 411, respectively. Note that four nonlinear conversion sections 411 are included in the internal transposition section (transposition function) 410 described referring to FIG. 30, and these four nonlinear conversion sections have different constant values (constants). A process of setting the constant values (constants) will be described later.

Next, small nonlinear conversion sections 422 execute a 1-byte input/output nonlinear conversion process on data exclusive-ORed with four constant values (constants) C1, C2, C3 and C4, which are predetermined in the nonlinear conversion sections 411, in exclusive-OR (XOR) operation sections 421, respectively.

Outputs of the small nonlinear conversion sections 422 are applied to a linear conversion section 423, and linear conversion is performed on the outputs to generate outputs. Note that the small nonlinear conversion sections 422 described herein are sometimes called S-boxes, and may be represented as conversion tables for 256 pieces of 1-byte data. Moreover, the linear conversion section 423 is executed as a process of computing output data by a conversion process with use of a linear conversion matrix (M) on input data. The linear conversion matrix (M) is also called diffusion matrix, and is sometimes represented as a 4×4 matrix having elements of $GF(2^8)$.

In the transposition function, it is desirable to, while exerting the influence of a certain data on as many data as possible, prevent the total of nonzero elements included in an input/output from reaching a low level wherever possible. This is effective to improve analysis resistance and eliminate vulnerability. More specifically, this is a measure against a differential attack or a linear attack.

As described referring to FIGS. 23 to 27, a large number of the construction of the internal transposition sections (transposition functions) 410 illustrated in FIG. 30 are provided for the compression function or the scrambling function F. In other words, a process of repeating the international transposition section (transposition function) 410 illustrated in FIG. 30 a plurality of rounds.

A large number of encryption algorithms have a construction executing a round operation in which the same transposition process is repeated a plurality of rounds, and it is known that as a measure against vulnerability, it is effective to use a so-called DSM (Diffusion Switching Mechanism) in which a plurality of different matrices, for example, two matrices [M1] and [M2] are used instead of one fixed matrix as the linear conversion matrix [M] applied in every round. Note that an encryption algorithm using the DSM is described in, for example, Japanese Unexamined Patent Application Publication No. 2007-199156 of the applicant of the present invention.

It is considered that an effect of overcoming vulnerability by the DSM is also effective in a hash function. In other words, when a plurality of different matrices are used instead of one fixed matrix as the linear conversion matrix [M] applied to all rounds, the hash function is more indistinguishable from a random function, and difficulty in various analysis processes is allowed to be enhanced.

Figure 32:
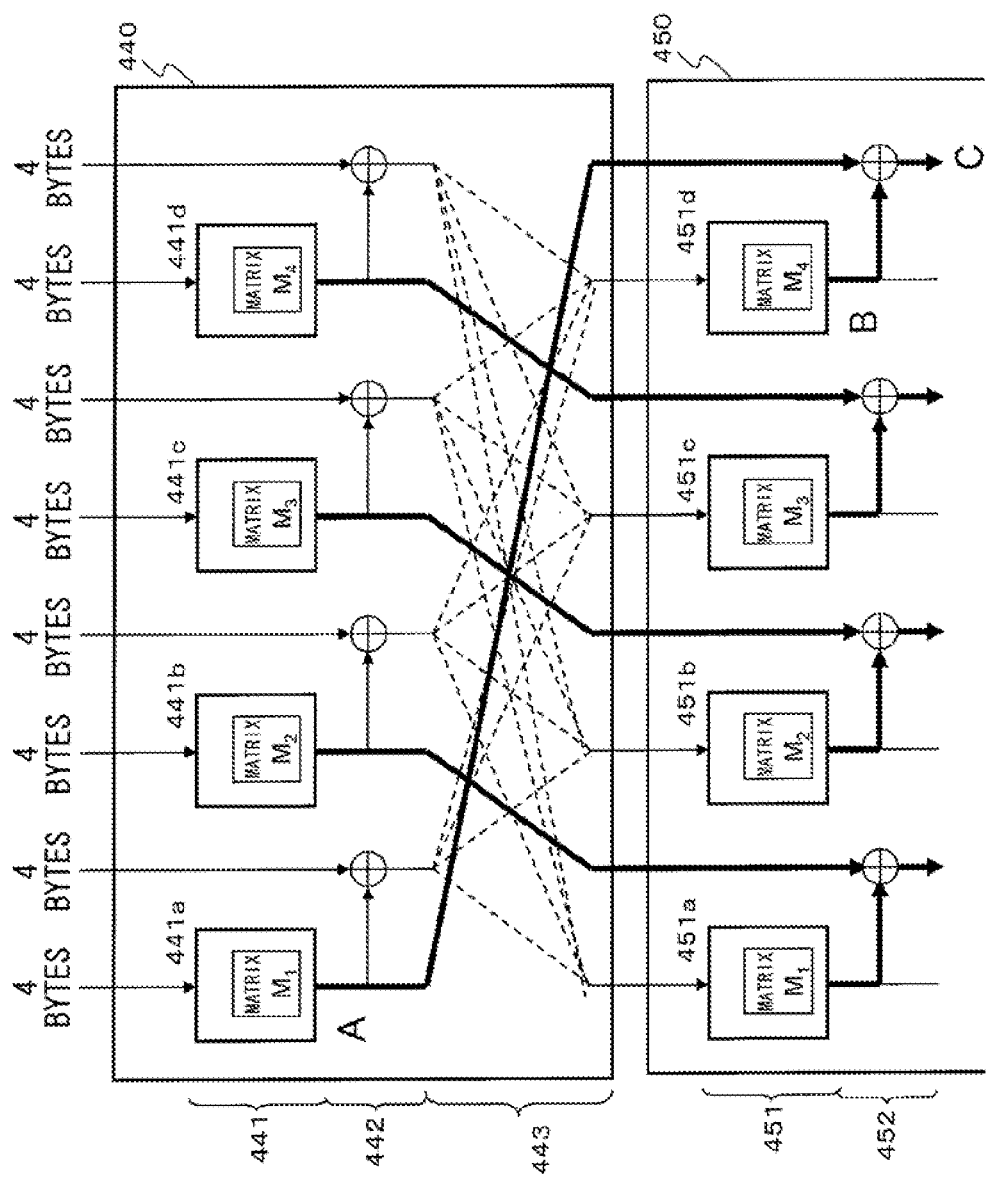
FIG. 32 is an illustration describing a construction example of repeated rounds of an internal transposition section set so as to use a plurality of different matrices as a linear conversion matrix [M] used in the nonlinear conversion section of the internal transposition section (transposition function).

FIG. 32 illustrates a construction example of repeated rounds of an internal transposition section set so as to use a plurality of different matrices as the linear conversion matrix [M] used in the nonlinear conversion section 411 of the internal transposition section (transposition function) 410 illustrated in FIG. 30 which is plurally provided for the compression function or the scrambling function F.

FIG. 32 is a simplified illustration of a combined construction of two rounds of the internal transposition section (transposition function) illustrated in FIG. 30 which is plurally provided for the compression function or the scrambling function F. An internal transposition section (transposition function) 440 has the same construction as the internal transposition section (transposition function) 410 illustrated in FIG. 30. An internal transposition section (transposition function) 450 indicates a round executing a following internal transposition. Each input line corresponds to 4-byte data.

As in the case of the internal transposition section (transposition function) 410 illustrated in FIG. 30, the internal transposition section (transposition function) 440 includes a nonlinear conversion section 441, an exclusive-OR operation (XOR) section 442 and an interchanging section 443. The nonlinear conversion section 441 has a construction described referring to FIG. 31.

As described referring to FIG. 31, the nonlinear conversion section 441 includes exclusive-OR operation sections, small nonlinear conversion sections and a linear conversion section. The linear conversion section executes a linear conversion process with use of the linear conversion matrix M.

In FIG. 32, four nonlinear conversion processing sections for 4-byte data provided as the nonlinear conversion sections 441 are illustrated, and each have a construction described referring to FIG. 31. In FIG. 32, linear conversion matrices M used in the linear conversion sections of the four nonlinear conversion sections are represented by M1 M2, M3 and M4 from the left side, respectively. The linear conversion matrices M1, M2, M3 and M4 are different from one another.

The internal transposition sections (transposition functions) 440 and 450 in the rounds have the same construction. In other words, in both of the internal transposition sections (transposition functions) 440 and 450, the linear conversion matrices M used in the linear conversion sections of four nonlinear conversion sections are M1, M2, M3 and M4 from the left side. Thus, the same matrices are used in the same positions in the internal transpositions.

It is understood from lines (heavy lines) connecting between the rounds illustrated in FIG. 32 that an output of the nonlinear conversion in the internal transposition section (transposition function) 440 in an upper round is exclusive-ORed with an output of one nonlinear conversion of the transposition section (transposition function) 450 in a lower round.

For example, an output (an output A in the drawing) from a nonlinear conversion section 441a having the linear conversion matrix M1 on the far left in the nonlinear conversion section 441 of the internal transposition section (transposition function) 440 in the upper round is exclusive-ORed, in an exclusive-OR operation section 452, with an output (an output B in the drawing) from a nonlinear conversion section 451d having the linear conversion matrix M4 on the far right in the nonlinear conversion section 451 of the internal transposition section (transposition function) 450 in the lower round. An output of the result is an output C illustrated in the drawing.

Each of outputs from four nonlinear conversion sections of the nonlinear conversion section 441 in the internal transposition section (transposition function) 440 in the upper round is exclusive-ORed with one of outputs from four nonlinear conversion sections of the nonlinear conversion section 451 in the internal transposition section (transposition function) 450 in the lower round.

Combinations of outputs from the nonlinear conversion sections 441 in the upper round and outputs from the nonlinear conversion sections 451 in the lower round which are exclusive-ORed are illustrated as follows as combinations of the linear conversion matrices [M] in each nonlinear conversion section.

(1) M1 and M4 (nonlinear conversion sections 441*a* and 451*d*)

(2) M2 and M1 (nonlinear conversion sections 441*b* and 451*a*)

(3) M3 and M2 (nonlinear conversion sections 441*c* and 451*b*)

(4) M4 and M3 (nonlinear conversion sections 441*d* and 451*c*)

When results of execution of the linear conversion processes using different linear conversion matrices interact with one another, a construction using the above-described DSM (Diffusion Switching Mechanism) is achievable so as to increase analysis resistance.

Note that a connection of two matrices is represented by a symbol "|", and when matrices set to increase the branch numbers (to, for example, 3 or over) are selected and used as the above-described matrix pairs (1) to (4), i.e., M1|M4, M2|M1, M3|M2 and M4|M3, analysis resistance is allowed to be further increased. Alternatively, a construction in which the branch numbers of matrices $'M1^{-1}|'M4^{-1}$, $'M2^{-1}|'M1^{-1}$, $'M3^{-1}|'M2^{-1}$ and $'M4^{-1}|'M3^{-1}$ which are obtained by aligning matrices obtained by inverting inverse matrices thereof are 3 or over is used.

Such a construction increasing the branch numbers is allowed to improve resistance to a differential attack or a linear attack.

Thus, the linear conversion matrix provided for the nonlinear conversion section in the internal transposition section (transposition function) executed as repeated round operations preferably has a construction using different matrices with use of a DSM construction. Moreover, matrices to be used are preferably set so that the branch number of a combined matrix including a pair of matrices interacting with each other is increased.

Figure 33:
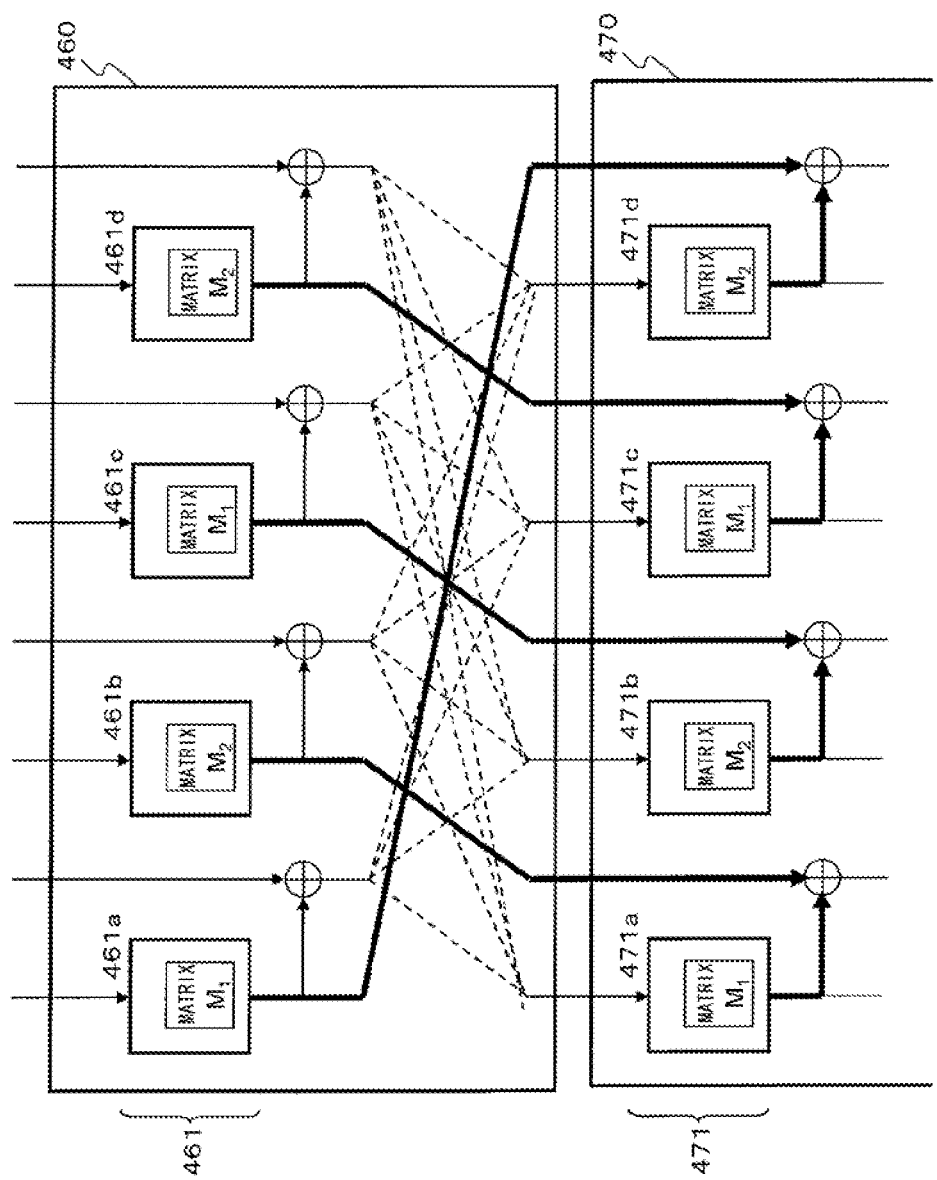
FIG. 33 is an illustration describing a construction example of repeated rounds of an internal transposition section set so as to use a plurality of different matrices as the linear conversion matrix [M].

In the description referring to FIG. 32, four matrices are used; however, the same condition for the branch number may be satisfied with two matrices. For example, as illustrated in FIG. 33, a construction in which matrices are arranged so that the branch number of M1|M2 is 3 or over, or the branch number of a matrix $'M1^{-1}|'M2^{-1}$ obtained by aligning matrices which are obtained by inverting inverse matrices is 3 or over may be used.

In the construction illustrated in FIG. 33, combinations of outputs from the nonlinear conversion sections 441 in the upper round and outputs from the nonlinear conversion sections 451 in the lower round which are exclusive-ORed are illustrated as follows as combinations of the linear conversion matrices [M] in each nonlinear conversion section.

(1) M1 and M2 (nonlinear conversion sections 461*a* and 471*d*)

(2) M2 and M1 (nonlinear conversion sections 461*b* and 471*a*)

(3) M1 and M2 (nonlinear conversion sections 461*c* and 471*b*)

(4) M2 and M1 (nonlinear conversion sections 461*d* and 471*c*)

The construction illustrated in FIG. 33 is considered as a more preferable construction in terms of implementation, because hardware circuits necessary for matrices and a table size on a memory are allowed to be reduced.

When results of execution of the linear conversion processes using different linear conversion matrices interact with one another, a construction using the above-described DSM (Diffusion Switching Mechanism) is achievable, and analysis resistance is allowed to be increased.

A construction example of an internal transposition for achieving a total function with enhanced scrambling capability is described above. The above-described process example is described as an example in which a 256-bit input is used; however, this is only an example, and the data size may be variously set, and a construction according to the data size may be provided. In this case, the construction is set to perform a process according to an input/output size of the small nonlinear conversion section and the size of the linear conversion section.

[16. Method of Generating Transposition Function with Highly Independent Output]

In the above-described process example, the internal transposition process construction which is plurally provided for the compression function or the scrambling function F is described as a process example in which the internal transposition process construction illustrated in FIG. 30 is used and is set to be repeated a plurality of times. Analysis resistance is allowed to be increased, for example, by constructing a linear conversion process matrix in the nonlinear conversion section of the internal transposition process in the above-described manner.

In a construction needing a plurality of total transposition functions, in some cases, analysis resistance is increased by using a plurality of total transpositions which act independently. In this case, there is a method of achieving the construction by using different internal transpositions included in the total transpositions. The construction example will be described below.

To achieve a plurality of different total transposition processes, a technique of changing parts included in the internal transpositions in the total transpositions is effective. However, in terms of implementation efficiency or ease of a security evaluation process, it is not necessarily desirable to use a large number of different parts. It is preferable to achieve various processes with use of as few parts as possible.

As a construction for performing different internal transposition processes on total transpositions, respectively, for example, the following construction is considered.

Transpose constant values to be used (used in the exclusive-OR operation section 421 in FIG. 31) with different constant values from one total transposition to another.

S-boxes (the small nonlinear conversion sections 422 in FIG. 31) or linear conversion matrices (the linear conversion section 423 in FIG. 31) which are parts of the internal transposition process included in the total transposition differ from one total transposition to another, and repeatedly use them to achieve a total transposition.

Note that the constant values are constants supplied to the exclusive-OR (XOR) operation section 421 of the nonlinear conversion section 411 of the internal transposition section 410 described referring to FIGS. 30 and 31.

However, to thoroughly change the constant values from one total transposition to another or change the S-boxes or the matrices, the supply of different data or different part constructions are necessary, so it is necessary to increase circuits or a memory capacity. Such an increase in circuits or the memory capacity causes issues such as a demerit in implementation and an increase in cost for security re-evaluation.

Therefore, in the invention, the internal transposition process constructions for total transpositions are set to be different from one another according to the following construction.

(a) In the case where a plurality of different small nonlinear operations (S-boxes) (small nonlinear conversion sections 422 in FIG. 31) are used, change the small nonlinear operations (S-boxes) of the internal transpositions from one total transposition to another.

(b) Set matrices used in a linear conversion section (the linear conversion section 423 in FIG. 31) to a plurality of different matrices generated from one matrix, and set matrices of the internal transpositions to matrices differing from one total transposition to another. For example, a plurality of different matrices are generated from one matrix by transposing rows or columns.

(c) In the case where a plurality of kinds of matrices are used as matrices used in the linear conversion section (the linear conversion section 423 in FIG. 31), transpose the matrices of the internal transposition from one total transposition to another. (For example, in the case where the above-described DSM is used, change within a range not departing from the conditions of the DSM)

(d) A combination of two or more of the above-described constructions (a) to (c).

The transposition process construction in the internal transposition process which is set to any of the above-described constructions and is repeatedly executed is allowed to be efficiently changed. In other words, different transposition processes are allowed to be executed without increasing a circuit scale or a memory capacity.

In particular, different total transpositions are efficiently achievable by a combination of the above-described constructions (c) and (b). In other words, in the case where two or more kinds of linear conversion matrices are stored in a memory with use of the above-described DSM construction, rows and columns of these matrices are transposed to generate and use new matrices as linear conversion matrices. In such a construction, different linear conversion processes are allowed to be performed efficiently based on fewer data.

In a construction using the DSM and including a plurality of different linear conversion matrices, security evaluation in the case where rows and columns of the matrices are transposed is an issue, but it is known that when a matrix having predetermined rules, for example, a circulant matrix or a Hadamard-matrix is used, the use of a matrix generated by transposing rows and columns does not affect security evaluation. Therefore, it is considered that security evaluation is easy and the construction is an effective means for generating a different transposition function by a simple change.

[17. Process of Generating Constant Applied to Transposition Function]

As described above, as one technique of changing the transposition process construction from round to round, a technique of transposing the constants ([C] used in the exclusive-OR operation section 421 in FIG. 31) to different constants every round or every two or more rounds is effective.

However, a large memory capacity is necessary to maintain constants corresponding to a large number of rounds. A construction example in which a large number of different constants are allowed to be efficiently generated from a small number of constants and be used in transposition functions will be described below.

First, a constant necessary for the transposition function is defined. Herein, 4 bytes is collectively called 1 word. For example, the internal transposition section (transposition function) 410 illustrated in FIG. 30 includes four nonlinear conversion sections, and each nonlinear conversion section has a construction illustrated in FIG. 31. As illustrated in FIG. 31, four constants are used for one nonlinear conversion section 411. Each constant is used for an exclusive-OR operation with 1-byte input data, so one constant Cn is 1-byte data.

One nonlinear conversion section 411 uses four constants, so a 1-word constant per nonlinear conversion is necessary.

The internal transposition section (transposition function) 410 illustrated in FIG. 30 includes four nonlinear conversion sections, so a 4-word constant is necessary for one internal transposition process. In the case where a total transposition is constructed by repeating this basic transposition k times, a 4 k-word constant in total is necessary.

In a number k of internal transpositions, a j-th constant value included in an i-th internal transposition from an input side is represented by $C_{i,j}$. Therefore, constants necessary for one total transposition are allowed to be represented as follows.

(Examples of groups of constants necessary for one total transposition)

First internal transposition: $C_{1,1}, C_{1,2}, C_{1,3}, C_{1,4}$
Second internal transposition: $C_{2,1}, C_{2,2}, C_{2,3}, C_{2,4}$
Third internal transposition: $C_{3,1}, C_{3,2}, C_{3,3}, C_{3,4}$
Fourth internal transposition: $C_{4,1}, C_{4,2}, C_{4,3}, C_{4,4}$
k−1-th internal transposition: $C_{k-1,1}, C_{k-1,2}, C_{k-1,3}, C_{k-1,4}$
k-th internal transposition: $C_{k,1}, C_{k,2}, C_{k,3}, C_{k,4}$ As a related art disclosing a technique of generating a constant, there is a technique described in, for example, Japanese Unexamined Patent Application Publication No. 2008-58827. In this related art, as a method of generating a 64-bit constant, values stored in a 8-bit variable are used 8 times to generate the constant, and a following constant is generated by performing an x or $x^{-1}$ times multiplication of the values in the variable considered as elements of $GF(2^8)$ to sequentially increase kinds of data. Note that x used herein is a variable x when an irreducible polynomial defining a finite field $GF(2^n)$ to be used is represented by a polynominal f(x).

A method of generating some of constants based on a series obtained by an x times multiplication on data for generating a constant, and generating the rest of the constants based on a series obtained by an $x^{-1}$ times multiplication x will be described below as a constant generation process construction. A simple relationship between constants is allowed to be locally disturbed without increasing an effort to generate constants by this method. As a result, randomness of constants is allowed to be increased. This example will be described with use of an example in which 64 bits corresponding to two words are generated from one 16-bit value.

A constant generation process according to the invention will be described compared to a constant generation process disclosed in the above-described related art (Japanese Unexamined Patent Application Publication No. 2008-58827).

First, steps of generating constants in related art will be described below. The steps of generating constants in related art is as follows.

[1] Store initial values in a 16-bit variable S.
[2] Perform the following process on i=1 . . . k.
(2.1) $C_{i,1}$=(S xor $Mask_1$)<<<$Rot_1$|(S xor $Mask_2$)<<<$Rot_2$
$C_{i,2}$=(S xor $Mask_3$)<<<$Rot_3$|(S xor $Mask_4$)<<<$Rot_4$
$C_{i,3}$=(S xor $Mask_5$)<<<$Rot_5$|(S xor $Mask_6$)<<<$Rot_6$
$C_{i,4}$=(S xor $Mask_7$)<<<$Rot_7$|(S xor $Mask_8$)<<<$Rot_8$
[2.2] S←S·x Note that $Mask_n$ and $Rot_n$ are constants separately determined. Herein, a symbol "|" represents a connection of bits. (A xor B) represents an exclusive-OR operation (XOR) process of A and B.

In some cases, four constants ($C_{i,1}$ to $C_{i,4}$) generated in such a manner look like random numbers; however, the constants are changed only by a mask operation and a rotation shift operation, so the constants have a characteristic that even if S is any value, the constants consistently maintain a relationship represented by a specific linear operation. It is obvious from block encryption as an example that it is often insufficient to increase randomness only by linear conversion, and it is desirable for the constants to have as nonlinear a property as possible.

Next, a technique of generating constants according to the invention by introducing a nonlinear relationship between constants without increasing implementation cost and reducing performance will be described below.

[1] Store initial values in each of 16-bit variables S and T.
[2] Perform the following process on i=1 . . . k.
(2.1) $C_{i,1}$=(S xor $Mask_1$)<<<$Rot_1$|(S xor $Mask_2$)<<<$Rot_2$
$C_{i,2}$=(S xor $Mask_3$)<<<$Rot_3$|(S xor $Mask_4$)<<<$Rot_4$
$C_{i,3}$=(T xor $Mask_5$)<<<$Rot_5$|(T xor $Mask_6$)<<<$Rot_6$
$C_{i,4}$=(T xor $Mask_7$)<<<$Rot_7$|(T xor $Mask_8$)<<<$Rot_8$
[2.2] S←S·$x^{-1}$ When four constants ($C_{i,1}$ to $C_{i,4}$) are generated with use of 16-bit variables S and T according to the above-described process, a half of the four constants included in each internal transposition belongs to an x-times multiplication series and the other half belongs to a $x^{-1}$-times multiplication series.

By such a construction, a fixed linear relationship between a constant generated from S and a constant configured of T is not maintained, and an effect of improving independence is obtained.

When the above-described constant generation process is generally described, the constant generation process is a process of updating initial values S and T with use of values with different exponents such as $X^a$ and $X^b$. When a plurality of constants are generated with use of such variables S and T, a half of the generated constants belongs to an $x^a$-times multiplication series and the other half belongs to an $x^b$-times multiplication series.

Note that in addition to two series based on S and T, when it is acceptable to increase the number of the initial values, a construction of generating constants with use of three or more series may be used.

[18. Method of Generating Constant for a Plurality of Total Transpositions]

The compression function includes a plurality of total transpositions, and it is necessary to prepare a group of constant values configured of a plurality of constants for respective total transpositions. When the number of total transpositions is m, the total transpositions are represented by P1, P2, . . . , Pm, respectively. When the above-described technique of generating a constant is used, a method of changing a number m of groups of initial values from one total transposition to another according to the number m of total transpositions to generate constant values applied to internal transpositions in the total transpositions is applicable. However, such a technique is used, an effort to generate the constant values are increased by m times, so it is not efficient.

A technique of simplifying a process of generating constants groups for applying a plurality of total transpositions will be described below. For example, in the case where the number m of total transpositions are included in the compression function, constants necessary for a first total transposition are generated by the above-described method of using a plurality of initial values S and T, and constants to be applied to second and later total transpositions are generated by a simple operation on the constants generated for the first total transposition.

In one data conversion process construction, for example, a construction in which the number m of total transpositions are provided for the compression function, a j-th constant value (word) included in an i-th internal transposition from an input side of an x-th total transposition is represented by $C_{i,j}$(x). A constant $C_{i,j}$(1) for the first total transposition is generated by the above-described method of using a plurality of initial values S and T.

At this time, constants $C_{i,j}$(2), $C_{i,j}$(3), . . . , $C_{i,j}$(m) for second and later total transpositions are generated. A technique of generating the constants $C_{i,j}$(2), $C_{i,j}$(3), . . . , $C_{i,j}$(m) for the second and later total transpositions will be described below referring to FIG. 34.

Figure 34:
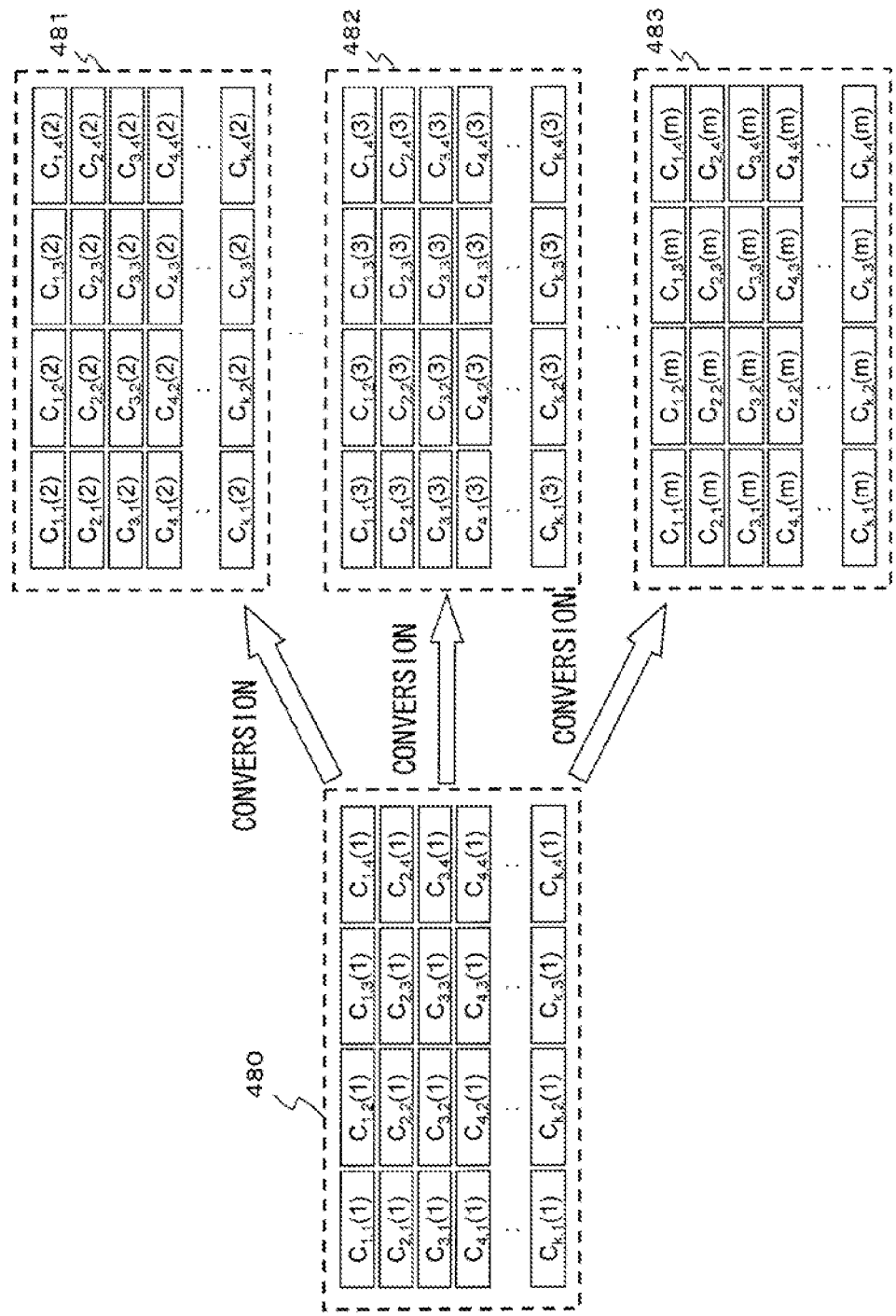
FIG. 34 is an illustration describing a technique of generating constants $C_{ij}(2)$, $C_{ij}(3)$, $C_{ij}(m)$ for a total transposition.

FIG. 34 illustrates, as the constants groups necessary for the number m of total transpositions, a first constants group 480 generated by the above-described method of using a plurality of initial values S and T, and a second constants group 481, a third constants group 482 and an m-th constants group 483 generated by a conversion process on the first constants group 480.

All of the number m of total transpositions are set to an example in which a number k of internal transpositions are included in each of the total transpositions and four constant words are necessary for each of the internal transpositions.

The second to m-th constants groups are generated by the conversion process on the first constants group 480. A specific example of the conversion process will be described below.

As the conversion process, any of the following three kinds of conversion processes are applicable.

Conversion Process Example 1

A constant is generated as $C_{i,j}$(x)=$C_{i,j}$<<<Rx where a different rotation amount determined in each total transposition is Rx. $C_{i,j}$(1) is a constant as an element of the first constants group 480 generated by the above-described method of using a plurality of initial values S and T. Moreover, x is the identifying number of a constants group, and has a value of 2 to m.

Conversion Process Example 2

A constant is generated as $C_{i,j}$(x)=$C_{i,j}$(1) xor Mx where a different mask value (word) determined in each total transposition is Mx. $C_{i,j}$(1) is a constant as an element of the first constants group 480 generated by the above-described method of using a plurality of initial values S and T. Moreover, x is the indentifying number of a constants group, and has a value of 2 to m.

Conversion Process Example 3

Method by a combination of the above-described conversion process examples 1 and 2.

A constant is generated as $C_{i,j}$(x)=($C_{i,j}$(1)<<<Rx) xor Mx or $C_{i,j}$(x)=($C_{i,j}$(1) xor Mx)<<<Rx. $C_{i,j}$(1) is a constant as an element of the first constants group 480 generated by the above-described method of using a plurality of initial values S and T. Moreover, x is the indentifying number of a constants group, and has a value of 2 to m.

A plurality of different constants groups are allowed to be generated from one constants group with use of any of the above-described conversion process examples 1 to 3, and the constants groups are set as constants applied to respective total transpositions.

Note that in the case of the above-described conversion process example 1, it is assurable that unless otherwise $C_{i,j}$(0) has a special bit pattern, a result of an exclusive-OR operation between $C_{i,j}$(X) and $C_{i,j}$(y) for arbitrary x and y is not 0; therefore, different total transpositions are allowed to be constructed. Moreover, also in the case of the above-described conversion process example 2, it is assurable that a result of the exclusive-OR operation is not 0; therefore, the process example is also suitable to generate different total transpositions.

In addition, the rotation amount and the mask value indicated in the above-described conversion process examples use values determined in each total transposition; however, in a construction in which a plurality of values are provided for and used as the rotation amount and the mask value to generate a plurality of constant values necessary for one total transposition, the same effects are expected.

When a group of constant values for a first transposition function is provided, by use of these schemes, a group of constant values for a different transposition function is allowed to be generated with small process cost; therefore, a faster process is expected.

In particular, in the case where a program execution function, that is, software is installed in the data converter, a programming mode in which groups of constant values for all total transpositions are dynamically generated when necessary without being temporarily decompressed on a memory is applicable, so an improvement in memory use efficiency is expected.

In the above-described examples, an example in which a rotation operation is performed from one word to another is described; however, the rotation operation may be modified to be performed every two or more words, and the same effects as those described above are expected.

[19. Technique of Reducing Output Value of Hash Function]

Next, an configuration example of a data converter in which in a hash value generation process construction, a function for generating an n-bit hash value is prepared and the bit number of an output is reduced by k bits so that an n−k-bit hash value is allowed to be generated will be described below.

For example, a hash function with a 256-bit output is prepared, and the bit number of the output is reduced by 32 bits to generate a 224-bit hash function.

Figure 35:
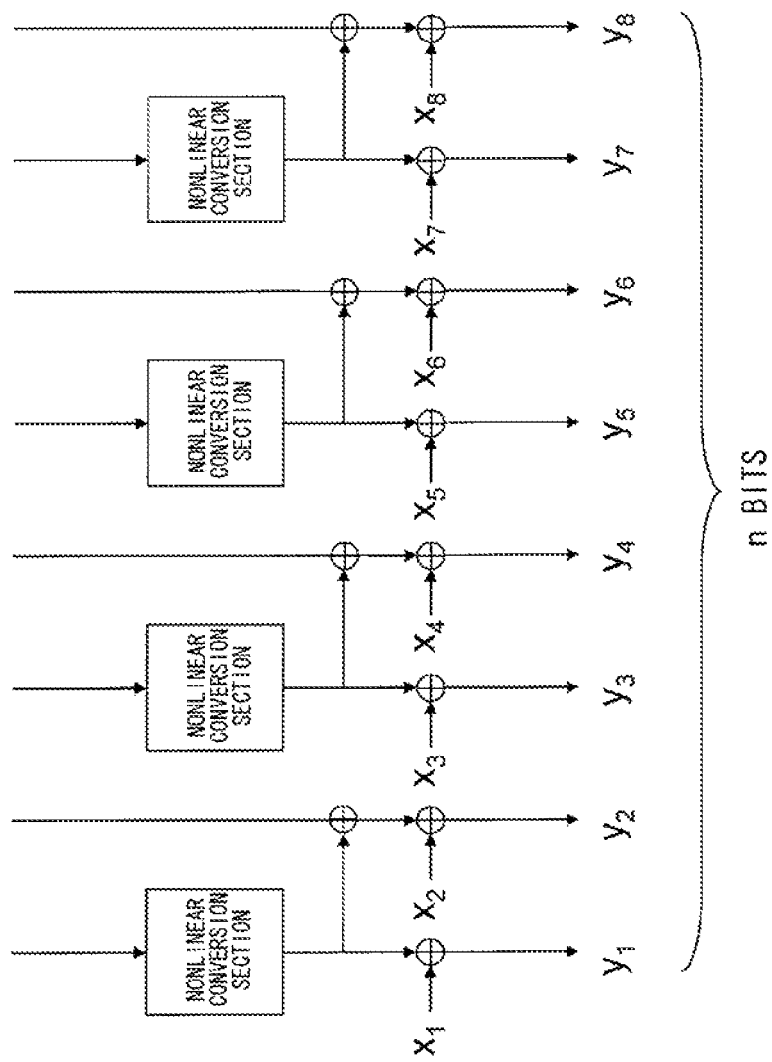
FIG. 35 is an illustration describing an example of a technique of reducing the output bit length of a hash function.

FIG. 35 illustrates the same construction as that of the internal transposition section (transposition function) 410 illustrated in FIG. 30, and illustrates an internal transposition process construction in a final stage of the total transposition. Outputs $y_1$ to $y_8$ are outputs from the total transposition and represent hash values as outputs of the hash function. In FIG. 35, a 1-word (4-byte) data line is simplified and illustrated as one data line. All of the outputs $y_1$ to $y_8$ add up to an output of 4×8=32 bytes=256 bits.

To simplify description, a process of transposing data after an exclusive-OR operation is not performed immediately before output. Moreover, data Xi to be exclusive-ORed with a data series immediately before output represents data which is fed forward and is configured of a chaining variable or a message as an intermediate value applied to the compression function.

A method of deleting data of k bits as deleted data from data of n bits as an output to reduce the length of output data is considered. It is necessary to select, from output series $y_1$ to $y_8$ in the drawing, a data series of which the bit length is to be reduced. As one method, there is a scheme of reducing the bit length by k bits sequentially from the left. In this case, the following issue is considered. In the case where k bits exceeds the total of the sizes of two data lines from the left, when output data which is a result of reducing the length is checked, a result of a nonlinear conversion process on the far left has no influence on any bit of remaining outputs. This indicates that a calculation on this part is unnecessary.

As techniques of not heavily reducing the length of a specific data series for the sake of eliminating such an unnecessary process, the following two process techniques will be described below.

(Data Length Reduction Technique 1)

The number of output-data series is m and the number of bits to be reduced (the number of deleted bits) is k. To divide k bits into m as uniformly as possible, parameters a and b are calculated by the following mathematical expression.

$a = m - (k - m \times \lfloor k/m \rfloor)$ $b = k - m \times \lfloor k/m \rfloor$ where $\lfloor k/m \rfloor$ indicates an integer part of (k/m).

Hereinafter $\lfloor k/m \rfloor$ is represented by f(k/m).      [Mathematical Expression 1]

By the above expression, a and b are calculated, where a+b=m.

Figure 36:
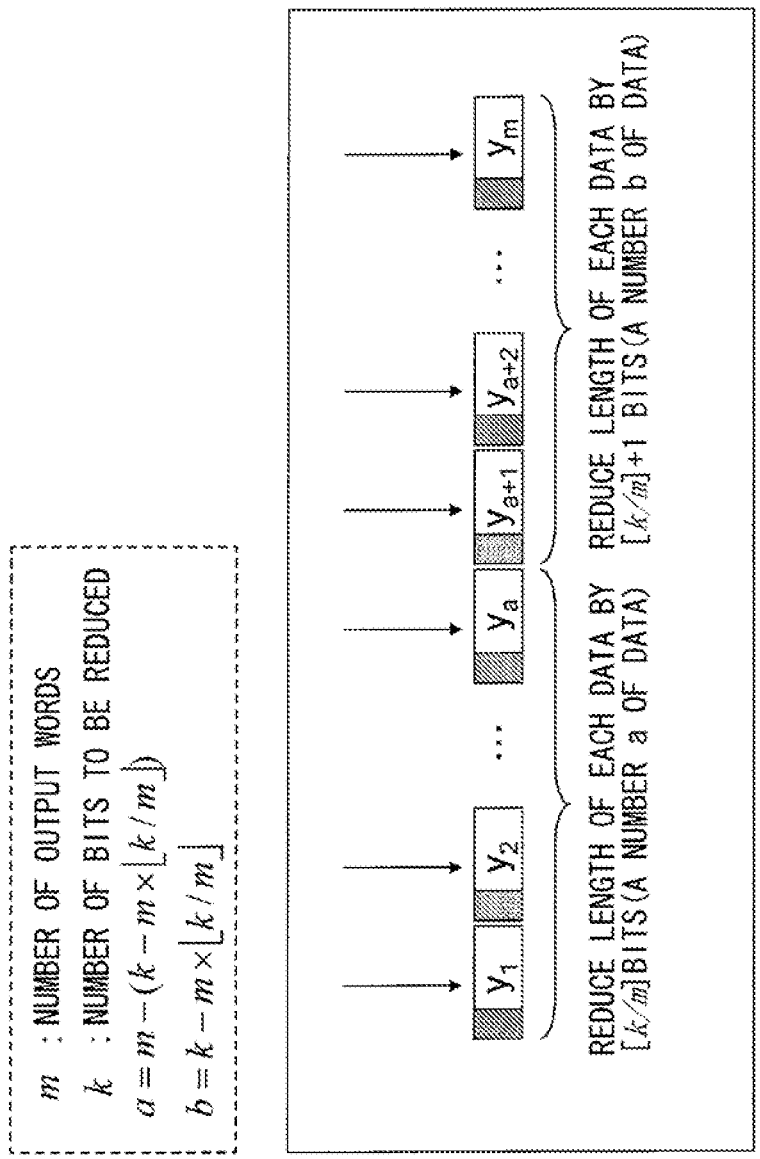
FIG. 36 is an illustration describing an example of a technique of reducing the output bit length of a hash function.

The length of each of output data of a number a of output series from the number m of series y1 to ym obtained as outputs is reduced by f(k/m) bits. Moreover, the length of each of output data of a number b of remaining output series is reduced by f(k/m)+1 bits. In other words, as illustrated in FIG. 36, a process of reducing the length of data is executed on each output series.

It is assurable that in the case where a transposition is used, all nonlinear conversion results have an influence on any of outputs by deleting bits from each bit strings rather than deleting continuous bit strings, so an unnecessary process is not included in an output value generation process.

In the above-described process of reducing the bit length of an output, the process is performed on all output-data series as targets to be subjected to data length reduction, but the data length reduction process may be executed only on some selected output series.

For example, in the internal transposition process construction illustrated in FIG. 33, an output of the same nonlinear conversion has an influence on every two lines of output data from the left, so, for example, only odd-numbered (or even-numbered) data series from the left may be selected as targets to be subjected to data length reduction. Even if such a process is performed, the same effect of not including an unnecessary process is expected, and an effort to perform the process is allowed to be reduced by reducing the number of series to be subjected to data length reduction. Note that this series selection construction is applicable to the case where a bit length to be reduced does not exceed n/2, where the number of output series is n.

(Data Length Reduction Technique 2)

The number of output-data series is m and the number of bits to be reduced (the number of deleted bits) is k. To divide k bits into m as uniformly as possible, parameters a and b are calculated by the following mathematical expression.

$a = (m/2) - (k - (m/2) \times \lfloor 2k/m \rfloor)$ $b = k - (m/2) \times \lfloor k/m \rfloor$ where $\lfloor 2k/m \rfloor$ indicates an integer part of (2k/m).

Hereinafter $\lfloor k/m \rfloor$ is represented by f(k/m).      [Mathematical Expression 2]

By the above expression, a and b are calculated, where a+b=m/2.

The lengths of output data of a number a of output series from a number m/2 of odd-numbered output series $y_1$, $y_3$, $y_5$, ..., $y_{2m-1}$ of a number m of output series $y_1$ to $y_m$ obtained as outputs each are reduced by f(2k/m) bits. Moreover, the lengths of output data of a number b of remaining output series from the number m/2 of odd-numbered output series each are reduced by f(2k/m)+1 bits.

Thus, the data length reduction process may be executed by selecting only some output series. In this process example, an effort to perform the process is allowed to be reduced by reducing the number of series to be subjected to data length reduction.

[20. Configuration Example of Data Converter]

Figure 37:
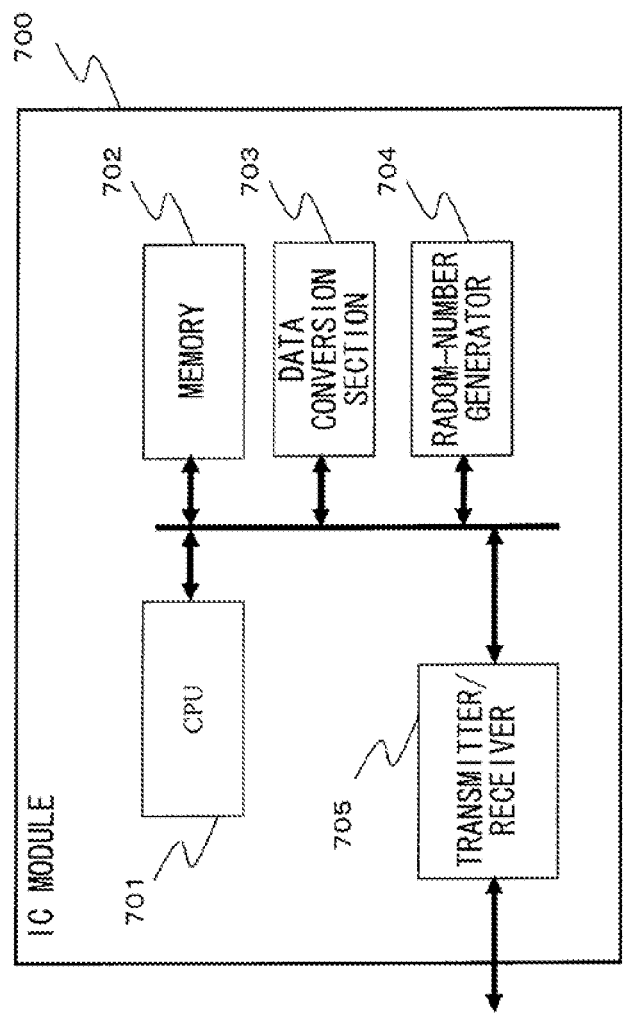
FIG. 37 is an illustration of a configuration example of an IC module as a data converter executing processes according to the invention.

Finally, a configuration example of an IC module 700 as a device executing processes according to the above-described exemplary embodiment is illustrated in FIG. 37. The above-described processes are allowed to be executed by, for example, a PC, an IC card, a reader/writer, or any other information processing device. Moreover, each process is allowed to be executed by a hardware circuit forming a logic circuit or a program, or both of them. An example of executing the processes is the IC module 700 illustrated in FIG. 37, and such an IC module 700 is allowed to be incorporated in various devices.

A CPU (central processing unit) 701 illustrated in FIG. 37 is a processor for executing start and stop of a data conversion process such as an encryption process or a hashing process, control of data transmission/reception, data transfer between the components, and any other various programs. A memory 702 is configured of a ROM (Read-Only-Memory) storing a program executed by the CPU 701 or fixed data such as an operation parameter, a RAM (Random Access Memory) used as a storage area or a work region for a program executed in a process of the CPU 701 and a parameter changed as necessary in a program process. Moreover, the memory 702 is allowed to be used as a storage area for key data necessary for the data conversion process such as the encryption process or the hashing process, a conversion table (a transposition table) used in the data conversion process, or data used in a conversion matrix. Note that the data storage area is preferably configured as a memory having a tamper-resistant configuration.

A data conversion section 703 executes, for example, the above-described various processes, that is, a data conversion process responding to each function such as a hash function, a compression function, a transposition function or a scrambling function, constant calculation and an output data length reduction process. In the execution of each function, linear conversion, nonlinear conversion, an exclusive-OR operation and the like specified in the execution of each function are executed according to a predetermined sequence. These processes are achieved by hardware or software, or a combination thereof.

Herein, an example in which the data conversion section is an individual module is illustrated; however, for example, an encryption process or a hashing process program is stored in an ROM, and the CPU 701 may read and execute a program stored in the ROM. The CPU 701 may execute various processes such as execution of each function, constant calculation and the output data length reduction process according to a program.

A random-number generator 704 executes a necessary random number generation process for generation of keys or parameters which are necessary for the encryption process or the hashing process.

A transmitter/receiver 705 is a data communications processing section executing data communications with an external device, and executes data communications with an IC module such as a reader/writer and executes output of a cipher text generated in the IC module or data input from an external device such as a reader/writer.

The present invention has been described in detail with respect to the specific exemplary embodiment. However, it is obvious that persons skilled in the art may make modifications or alterations to the exemplary embodiment without departing from the scope of the present invention. In other words, the present invention has been disclosed in the form of illustrative example and is not to be construed in a limited sense. The claims should be referenced to determine the scope of the present invention.

Moreover, the processes described in the description may be executed by hardware or software, or a combined configuration thereof. In the case where the processes are executed by software, a program on which a processing sequence is recorded is allowed to be installed into a memory in a computer incorporated in dedicated hardware and executed, or the program is allowed to be installed onto a general-purpose computer capable of executing various processes and executed. For example, the program may be recorded in advance on a recording medium. In addition of installing the program in a computer from the recording medium, the program may be received through a network such as a LAN (local area network) or the Internet and be installed in a recording medium such as a built-in hard disk.

In addition, various processes described in the description not only may be executed in a time series according to the description but also may be executed in parallel or individually according to the processing performance of a device executing the processes or when necessary. Further, in this description, "system" refers to a logical set configuration of a plurality of devices regardless of whether the individual constituent devices are contained in one enclosure.

Industrial Applicability

As described above, the exemplary embodiment of the invention has a construction in which a data conversion process with use of a plurality of compression-function execution sections and through a plurality of respective process sequences in which a plurality of divided data blocks configuring message data are processed in parallel is executed. Each of the plurality of compression-function execution sections performs a process with use of a message scheduling section, which receives a corresponding divided data block of the message data to perform a message scheduling process, and a process with use of a chaining variable processing section, which receives both of an output from the message scheduling section and an intermediate value as an output from a preceding processing section to generate output data whose number of bits is same as that of the intermediate value through compression of received data. The plurality of compression-function execution sections, respectively performing parallel processing in the plurality of process sequences, commonly use one or both of the message scheduling section and the chaining variable processing section, and allow a single message scheduling section or a single chaining variable processing section to be utilized. Downsizing of a hardware configuration and simplification of processing steps are achieved by such a construction.

The invention claimed is:

1. A data converter, comprising:
a receiver which receives message data; and
a processor, which executes a data conversion process to generate a hash value, the data conversion process including a plurality of compression-function execution sections and a plurality of respective process sequences in which a plurality of divided data blocks constituting the message data are processed in parallel, wherein each compression-function execution section performs:
- a message scheduling process, using a message scheduling section, which receives a corresponding divided data block of the message data, the message scheduling section including a first transposition-function executing section, which repeatedly executes a transposition process to output a first intermediate value; and
- a chaining variable process, using a chaining variable processing section including a second transposition-function executing section, which:
  - receives the first intermediate value and a second intermediate value having a first number of bits, the second intermediate value being an output from a preceding processing section, and
  - generates output data having a second number of bits, which is the same as the first number of bits, wherein the compression-function execution sections, respectively performing parallel processing in the process sequences, are configured to commonly use one or both of the message scheduling section and the chaining variable processing section, and to allow a single message scheduling section or a single chaining variable processing section to be utilized, and wherein:
- the compression-function execution sections include a single common chaining variable processing section which is commonly used by the compression-function execution sections,
- the message scheduling sections in the compression-function execution sections receive the same divided data block and provide an output to the common chaining variable processing section, and
- the common chaining variable processing section receives both of the output and a third intermediate value as an output from a preceding compression-function execution section.

2. The data converter according to claim 1, wherein
the compression-function execution sections include a single common message scheduling section, which is commonly used by the compression-function execution sections,
the common message scheduling section receives the divided data blocks, performs the message scheduling process on the divided data blocks, and provides output data to the chaining variable processing sections, and
plurality of chaining variable processing sections executing processes in parallel, in each of which the corresponding chaining variable processing section receives both of an output from the common message scheduling section and the second intermediate value.

3. The data converter according to claim 1, wherein
the message scheduling sections generate the output by performing an exclusive-OR operation of outputs from the message scheduling sections.

4. The data converter according to claim 1, wherein
the chaining variable processing section includes a third transposition-function executing section, which uses an XOR result as input, the XOR result being a logical value of an exclusive-OR operation between the first intermediate value and an output from the second transposition-function executing section.

5. The data converter according to claim 1, wherein the first transposition-function executing section and the second transposition-function executing section include:
- a nonlinear conversion process performed on part or a whole of input data, and
- a swap process which is a data interchanging process.

6. The data converter according to claim 5, wherein the nonlinear conversion process is a process including an exclusive-OR operation using a constant, a nonlinear conversion, and a linear conversion using a linear conversion matrix.

7. The data converter according to claim 5, wherein the first transposition-function executing section and the second transposition-function executing section include a linear conversion process, which is a process executed according to a DSM (Diffusion Switching Mechanism) with use of a plurality of different matrices.

8. The data converter according to claim 1, wherein
the transposition processes executed by the first and second transposition-function executing sections are configured to perform data processes, using a plurality of constants groups different from one another, which are generated through data conversion processes performed on a fundamental group, the fundamental group being defined as a constants group to be used in at least one of the transposition processes.

9. The data converter according to claim 8, wherein
the constants group to be utilized as the fundamental group is configured of a plurality of constants generated through application of a conversion rule to a plurality of initial values S and T which are different from each other, and
the conversion rule is configured to include an update process performed on the initial values, the update process being represented by the following expression;

$$S \leftarrow S \cdot x^a, T \leftarrow Tx$$

where $a \neq b$.

10. The data converter according to claim 8, wherein
the data conversion process performed on the fundamental group is a process which allows a bit rotation operation on each of constants constituting the fundamental group, or a process which allows a logical operation between each of constants constituting the fundamental group and predetermined mask data.

11. The data converter according to claim 1, wherein
the processor performs a reduction process which allows an ultimately outputted hash value to be reduced in number of bits, and
the number of bits to be reduced is calculated according to a predetermined expression for calculation, and then the reduction process is executed according to a result of the calculation.

12. The data converter according to claim 1, wherein
the data conversion process further includes a scramble-process section executing a data scramble process on input data,
the compression-function execution sections include multi-stage compression sections, which receive all the divided data blocks,
a first set of multi-stage compression sections are configured to receive both of an output of the scramble-process section and the divided data blocks,
a second set of multi-stage compression sections are configured to receive both of an output of a preceding-stage compression section and the divided data blocks, and
a compression section located in a final stage of the multi-stage compression sections outputs a hash value of the message data.

13. A data conversion method executed by a data converter, the data conversion method comprising:
  receiving message data using a receiver;
  executing, using a processor, a data conversion process to generate a hash value, the data conversion process including a plurality of compression-function execution sections and a plurality of respective process sequences in which a plurality of divided data blocks constituting the message data are processed in parallel,
  wherein each compression-function execution section performs:
    a message scheduling process, using a message scheduling section, which receives a corresponding divided data block of the message data the message scheduling section including a first transposition-function executing section, which repeatedly executes a transposition process to output a first intermediate value; and
    a chaining variable process, using a chaining variable processing section, which
      receives the first intermediate value and a second intermediate value having a first number of bits, the second intermediate value being an output from a preceding processing section, and
      generates output data having a second number of bits, which is the same as the first number of bits,
  wherein the compression-function execution sections, respectively performing parallel processing in the plurality of process sequences, commonly use one or both of the message scheduling section and the chaining variable processing section, and perform a process with use of a single message scheduling section or a single chaining variable processing section, and
  wherein:
    the compression-function execution sections include a single common chaining variable processing section which is commonly used by the compression-function execution sections
    the message scheduling sections in the compression-function execution sections receive the same divided data block and provide an output to the common chaining variable processing section, and
    the common chaining variable processing section receives both of the output and a third intermediate value as an output from a preceding compression-function execution section.

14. A non-transitory computer-readable medium storing instructions for causing a computer to execute a control process, the process comprising:
  receiving message data using a receiver;
  executing, using a processor, a data conversion process to generate a hash value, the data conversion process including a plurality of compression-function execution sections and a plurality of respective process sequences in which a plurality of divided data blocks constituting the message data are processed in parallel,
  wherein each compression-function execution section performs:
    a message scheduling process, using a message scheduling section, which receives a corresponding divided data block of the message data the message scheduling section including a first transposition-function executing section, which repeatedly executes a transposition process to output a first intermediate value; and
    a chaining variable process, using a chaining variable processing section, which
      receives the first intermediate value and a second intermediate value having a first number of bits, the second intermediate value being an output from a preceding processing section, and
      generates output data having a second number of bits, which is the same as the first number of bits,
  wherein the plurality of compression-function execution sections, respectively performing parallel processing in the plurality of process sequences, commonly use one or both of the message scheduling section and the chaining variable processing section, and perform a process with use of a single message scheduling section or a single chaining variable processing section, and
  wherein:
    the compression-function execution sections include a single common chaining variable processing section which is commonly used by the compression-function execution sections,
    the message scheduling sections in the compression-function execution sections receive the same divided data block and provide an output to the common chaining variable processing section, and
    the common chaining variable processing section receives both of the output and a third intermediate value as an output from a preceding compression-function execution section.

\* \* \* \* \*